United States Patent
Saito et al.

(10) Patent No.: US 12,278,366 B2
(45) Date of Patent: Apr. 15, 2025

(54) LITHIUM COBALT ALUMINUM OXIDE POSITIVE ELECTRODE ACTIVE MATERIAL INCLUDING ALUMINUM-CONTAINING COATING FILM AND SECONDARY BATTERY

(71) Applicant: SEMICONDUCTOR ENERGY LABORATORY CO., LTD., Atsugi (JP)

(72) Inventors: Jyo Saito, Kanagawa (JP); Mayumi Mikami, Kanagawa (JP); Yohei Momma, Kanagawa (JP); Teruaki Ochiai, Kanagawa (JP); Tatsuyoshi Takahashi, Kanagawa (JP); Kazuhei Narita, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 698 days.

(21) Appl. No.: 17/413,160

(22) PCT Filed: Dec. 4, 2019

(86) PCT No.: PCT/IB2019/060418
§ 371 (c)(1),
(2) Date: Jun. 11, 2021

(87) PCT Pub. No.: WO2020/128699
PCT Pub. Date: Jun. 25, 2020

(65) Prior Publication Data
US 2022/0052335 A1  Feb. 17, 2022

(30) Foreign Application Priority Data

Dec. 17, 2018  (JP) .................................. 2018-235792
Dec. 17, 2018  (JP) .................................. 2018-235801

(51) Int. Cl.
*H01M 4/525* (2010.01)
*H01M 4/02* (2006.01)
(Continued)

(52) U.S. Cl.
CPC ........... *H01M 4/525* (2013.01); *H01M 4/366* (2013.01); *H01M 10/0525* (2013.01);
(Continued)

(58) Field of Classification Search
CPC .. H01M 4/525; H01M 4/366; H01M 10/0525; H01M 10/0569
(Continued)

(56) References Cited

U.S. PATENT DOCUMENTS

| | | |
|---|---|---|
| 4,302,518 A | 11/1981 | Goodenough et al. |
| 4,668,595 A | 5/1987 | Yoshino et al. |

(Continued)

FOREIGN PATENT DOCUMENTS

| | | |
|---|---|---|
| CN | 001434527 A | 8/2003 |
| CN | 100426570 C | 10/2008 |

(Continued)

OTHER PUBLICATIONS

Taiwanese Office Action (Application No. 108144515) dated Aug. 30, 2023.
(Continued)

*Primary Examiner* — Sean P Cullen
(74) *Attorney, Agent, or Firm* — Fish & Richardson P.C.

(57) ABSTRACT

A positive electrode active material that has high capacity and excellent charge and discharge cycle performance for a secondary battery is provided. A positive electrode active material that inhibits a decrease in capacity in charge and discharge cycles is provided. A high-capacity secondary battery is provided. A secondary battery with excellent charge and discharge characteristics is provided. A highly
(Continued)

safe or reliable secondary battery is provided. A positive electrode active material contains lithium, cobalt, oxygen, and aluminum and has a crystal structure belonging to a space group R-3m when Rietveld analysis is performed on a pattern obtained by powder X-ray diffraction. In analysis by X-ray photoelectron spectroscopy, the number of aluminum atoms is less than or equal to 0.2 times the number of cobalt atoms.

8 Claims, 48 Drawing Sheets

(51) Int. Cl.
*H01M 4/36* (2006.01)
*H01M 10/0525* (2010.01)
*H01M 10/0569* (2010.01)

(52) U.S. Cl.
CPC .. *H01M 10/0569* (2013.01); *H01M 2004/021* (2013.01); *H01M 2004/028* (2013.01)

(58) Field of Classification Search
USPC ............................. 429/231.95, 231.3, 231.6
See application file for complete search history.

(56) References Cited

U.S. PATENT DOCUMENTS

| | | | |
|---|---|---|---|
| 5,783,333 | A | 7/1998 | Mayer |
| 5,871,866 | A | 2/1999 | Barker et al. |
| 5,910,382 | A | 6/1999 | Goodenough et al. |
| 6,085,015 | A | 7/2000 | Armand et al. |
| 6,514,640 | B1 | 2/2003 | Armand et al. |
| 6,737,195 | B2 | 5/2004 | Kweon et al. |
| 6,974,601 | B2 | 12/2005 | Kweon et al. |
| 7,309,546 | B2 | 12/2007 | Kweon et al. |
| RE43,276 | E | 3/2012 | Kweon et al. |
| 9,184,439 | B2 | 11/2015 | Miyoshi et al. |
| 9,899,664 | B2 | 2/2018 | Yamaki et al. |
| 2001/0010807 | A1 | 8/2001 | Matsubara |
| 2002/0055042 | A1 | 5/2002 | Kweon et al. |
| 2002/0110736 | A1 | 8/2002 | Kweon et al. |
| 2002/0195591 | A1 | 12/2002 | Ravet et al. |
| 2003/0104279 | A1 | 6/2003 | Miyazaki et al. |
| 2003/0138699 | A1 | 7/2003 | Kweon et al. |
| 2004/0142241 | A1 | 7/2004 | Nagayama |
| 2005/0271944 | A1* | 12/2005 | Suhara ............... H01M 4/485 429/231.95 |
| 2006/0051671 | A1 | 3/2006 | Thackeray et al. |
| 2006/0263690 | A1 | 11/2006 | Suhara et al. |
| 2007/0117014 | A1 | 5/2007 | Saito et al. |
| 2007/0190421 | A1* | 8/2007 | Sato ..................... H01M 4/525 252/182.1 |
| 2008/0241693 | A1 | 10/2008 | Fukuchi et al. |
| 2009/0087362 | A1 | 4/2009 | Sun et al. |
| 2009/0104532 | A1 | 4/2009 | Hosoya |
| 2010/0086854 | A1 | 4/2010 | Kumar et al. |
| 2010/0247986 | A1 | 9/2010 | Toyama et al. |
| 2011/0227000 | A1 | 9/2011 | Ruoff et al. |
| 2012/0258370 | A1 | 10/2012 | Miyoshi et al. |
| 2012/0315550 | A1 | 12/2012 | Liu et al. |
| 2013/0052534 | A1 | 2/2013 | Fujiki et al. |
| 2013/0323596 | A1 | 12/2013 | Morita et al. |
| 2014/0377659 | A1* | 12/2014 | Oljaca ................. H01M 4/525 429/231.95 |
| 2015/0357641 | A1 | 12/2015 | Sugie et al. |
| 2016/0006032 | A1* | 1/2016 | Paulsen ................ H01M 4/525 429/231 |
| 2016/0013478 | A1 | 1/2016 | Satow et al. |
| 2016/0276659 | A1 | 9/2016 | Choi et al. |
| 2017/0040594 | A1 | 2/2017 | Yamaki et al. |
| 2018/0013130 | A1 | 1/2018 | Ochiai et al. |
| 2018/0145317 | A1 | 5/2018 | Momma et al. |
| 2018/0145368 | A1 | 5/2018 | Ochiai et al. |
| 2020/0176770 | A1 | 6/2020 | Takahashi et al. |
| 2021/0083281 | A1 | 3/2021 | Mikami et al. |

FOREIGN PATENT DOCUMENTS

| | | | |
|---|---|---|---|
| CN | 101562248 | A | 10/2009 |
| CN | 105655554 | A | 6/2016 |
| CN | 106450272 | A | 2/2017 |
| EP | 3503252 | A1 * | 6/2019 |
| JP | 08-037007 | A | 2/1996 |
| JP | 2000-203842 | A | 7/2000 |
| JP | 2001-291518 | A | 10/2001 |
| JP | 2002-216760 | A | 8/2002 |
| JP | 2003-217572 | A | 7/2003 |
| JP | 2006-261132 | A | 9/2006 |
| JP | 2010-080407 | A | 4/2010 |
| JP | 2015-069958 | A | 4/2015 |
| JP | 2015-099722 | A | 5/2015 |
| JP | 2016-091633 | A | 5/2016 |
| JP | 2017-033817 | A | 2/2017 |
| KR | 2001-0091887 | A | 10/2001 |
| KR | 2003-0063930 | A | 7/2003 |
| KR | 2013-0124610 | A | 11/2013 |
| KR | 2014-0073048 | A | 6/2014 |
| KR | 2017-0016782 | A | 2/2017 |
| KR | 2018-0089698 | A | 8/2018 |
| WO | WO-2011/077654 | | 6/2011 |
| WO | WO-2011/141486 | | 11/2011 |
| WO | WO-2017046723 | A1 * | 3/2017 ............ C01G 51/42 |

OTHER PUBLICATIONS

International Search Report (Application No. PCT/IB2019/060418) dated Feb. 18, 2020.

Written Opinion (Application No. PCT/IB2019/060418) dated Feb. 18, 2020.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system $LixCoO2$ ($0.0 \leq x \leq 1.0$)", Phys. Rev. B (Physical Review. B), Oct. 9, 2009, vol. 80, No. 16, pp. 165114-1-165114-9.

Chen.Z et al., "Staging Phase Transitions in $LixCoO2$", J. Electrochem. Soc. (Journal of The Electrochemical Society), 2002, vol. 149, No. 12, pp. A1604-A1609.

Counts. W et al., "Fluoride Model Systems: II, The Binary Systems $CaF2$—$BeF2$, $MgF2$—$BeF2$, and $LiF$—$MgF2$", J. Am. Ceram. Soc. (Journal of The American Ceramic Society), 1953, vol. 36, No. 1, pp. 12-17.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Dudarev.S et al., "Electron-energy-loss spectra and the structural stability of nickel oxide: An LSDA+U study", Phys. Rev. B (Physical Review. B), Jan. 15, 1998, vol. 57, No. 3, pp. 1505-1509.

Zhou.F et al., "First-principles prediction of redox potentials in transition-metal compounds with LDA+U", Phys. Rev. B (Physical Review. B), Dec. 15, 2004, vol. 70, No. 23, pp. 235121-1-235121-8.

Todoriki.H et al., "High performance lithium ion battery using Graphene Net electrode", 222nd ECS Meeting Abstract, Oct. 7, 2012, p. 1014, ECS.

Dreyer.D et al., "The Chemistry of Graphene Oxide", Chemical Society Reviews, Nov. 3, 2009, vol. 39, No. 1, pp. 228-240.

Nitta.N et al., "Li-ion battery materials: present and future", Materials Today, Jun. 1, 2015, vol. 18, No. 5, pp. 252-264.

Hong.L et al., "Research on Advanced Materials for Li-ion Batteries", Adv. Mater. (Advanced Materials), Dec. 3, 2009, vol. 21, No. 45, pp. 4593-4607.

Wang. Y et al., "Developments in Nanostructured Cathode Materials for High-Performance Lithium-Ion Batteries", Adv. Mater.

(56) References Cited

OTHER PUBLICATIONS (Advanced Materials), Jun. 18, 2008, vol. 20, No. 12, pp. 2251-2269.

* cited by examiner

101

101

LITHIUM COBALT ALUMINUM OXIDE POSITIVE ELECTRODE ACTIVE MATERIAL INCLUDING ALUMINUM-CONTAINING COATING FILM AND SECONDARY BATTERY

CROSS REFERENCE TO RELATED APPLICATIONS

This application is a U.S. National Phase Application under 35 U.S.C. § 371 of International Application PCT/IB2019/060418, filed on Dec. 4, 2019, which is incorporated by reference and claims the benefit of foreign priority applications filed in Japan on Dec. 17, 2018, as Application No. 2018-235792 and Application No. 2018-235801.

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used for a secondary battery, a secondary battery, and an electronic device including a secondary battery.

Note that in this specification, a power storage device refers to every element and device having a function of storing power. Examples of the power storage device include a storage battery (also referred to as a secondary battery) such as a lithium-ion secondary battery, a lithium-ion capacitor, and an electric double layer capacitor.

In addition, electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles (hybrid electric vehicles (HEVs), electric vehicles (EVs), plug-in hybrid electric vehicles (PHEVs), and the like); and the like. The lithium-ion secondary batteries are essential as rechargeable energy supply sources for today's information society.

The performance required for lithium-ion secondary batteries includes much higher energy density, improved cycle performance, safety under a variety of operation environments, improved long-term reliability, and the like.

Thus, improvement of a positive electrode active material has been studied to improve the cycle performance and increase the capacity of lithium-ion secondary batteries (Patent Document 1 and Patent Document 2). In addition, a crystal structure of a positive electrode active material also has been studied (Non-Patent Document 1 to Non-Patent Document 3).

X-ray diffraction (XRD) is one of methods used for analysis of a crystal structure of a positive electrode active material. With the use of the ICSD (Inorganic Crystal Structure Database) described in Non-Patent Document 5, XRD data can be analyzed.

Moreover, as disclosed in Non-Patent Document 6 and Non-Patent Document 7, energy depending on the crystal structure, composition, or the like of a compound can be calculated with use of first principles calculation.

Patent Document 3 discloses an example in which the interatomic distance of $LiNi_{1-x}M_xO_2$ is calculated utilizing the first principles calculation. Furthermore, Patent Document 4 describes generation energy of a silicon oxide compound, which is obtained by the first principles calculation.

REFERENCE

Patent Document

[Patent Document 1] Japanese Published Patent Application No. 2002-216760
[Patent Document 2] Japanese Published Patent Application No. 2006-261132
[Patent Document 3] Japanese Published Patent Application No. 2016-91633
[Patent Document 4] PCT International Publication No. WO2011/077654

Non-Patent Document

[Non-Patent Document 1] Toyoki Okumura et al., "Correlation of lithium ion distribution and X-ray absorption near-edge structure in O3- and O2-lithium cobalt oxides from first-principle calculation", *Journal of Materials Chemistry*, 2012, 22, pp. 17340-17348.
[Non-Patent Document 2] Motohashi, T. et al., "Electronic phase diagram of the layered cobalt oxide system $Li_xCoO_2$ (0.0≤x≤1.0)", *Physical Review B*, 80 (16), 2009, 165114.
[Non-Patent Document 3] Zhaohui Chen et al., "Staging Phase Transitions in $Li_xCoO_2$", *Journal of The Electrochemical Society*, 2002, 149 (12) A1604-A1609.
[Non-Patent Document 4] W. E. Counts et al., *Journal of the American Ceramic Society*, 1953, 36 [1] 12-17. Fig. 01471.
[Non-Patent Document 5] Belsky, A. et al., "New developments in the Inorganic Crystal Structure Database (ICSD): accessibility in support of materials research and design", *Acta Cryst.*, 2002, B58, 364-369.
[Non-Patent Document 6] Dudarev, S. L. et al., "Electron-energy-loss spectra and the structural stability of nickel oxide: An LSDA1U study", *Physical Review B*, 1998, 57 (3) 1505.
[Non-Patent Document 7] Zhou, F. et al., "First-principles prediction of redox potentials in transition-metal compounds with LDA+U", *Physical Review B*, 2004, 70 235121.

SUMMARY OF THE INVENTION

Problems to be Solved by the Invention

An object of one embodiment of the present invention is to provide a positive electrode active material that has high capacity and excellent charge and discharge cycle performance for a secondary battery. Alternatively, an object is to provide a manufacturing method of a positive electrode active material with high productivity. Alternatively, an object of one embodiment of the present invention is to provide a positive electrode active material that suppresses a decrease in capacity in charge and discharge cycles when used for a secondary battery. Alternatively, an object of one embodiment of the present invention is to provide a high-capacity secondary battery. Alternatively, an object of one embodiment of the present invention is to provide a secondary battery with excellent charge and discharge characteristics. Alternatively, an object of one embodiment of the present invention is to provide a highly safe or reliable secondary battery.

Alternatively, an object of one embodiment of the present invention is to provide a novel material, novel active material particles, a novel power storage device, or a manufacturing method thereof.

Note that the description of these objects does not preclude the existence of other objects. One embodiment of the present invention does not have to achieve all these objects. Note that other objects can be taken from the description of the specification, the drawings, and the claims.

Means for Solving the Problems

One embodiment of the present invention is a positive electrode active material containing lithium, cobalt, oxygen, and aluminum and having a crystal structure belonging to a space group R-3m when Rietveld analysis is performed on a pattern obtained by powder X-ray diffraction using a CuKα1 ray. In analysis by X-ray photoelectron spectroscopy, the number of aluminum atoms is less than or equal to 0.2 times the number of cobalt atoms.

In the above structure, an extraction angle in the X-ray photoelectron spectroscopy is preferably greater than or equal to 40° and less than or equal to 50°.

In the above structure, a particle is preferably included; when a cross section of the particle is analyzed by TEM-EDX, in a first region where a distance from a surface of the particle is greater than or equal to 20 nm and less than or equal to 200 nm, the number of aluminum atoms analyzed by the TEM-EDX is preferably greater than or equal to 0.04 times and less than 1.6 times the number of cobalt atoms; and in a second region where a distance from the surface of the particle is greater than or equal to 1 μm and less than or equal to 3 μm, the number of aluminum atoms analyzed by the TEM-EDX is preferably less than 0.03 times the number of cobalt atoms.

In the above structure, the cross section of the particle is preferably exposed by processing with a focused ion beam system.

In the above structure, the positive electrode active material preferably includes a coating film in contact with the surface of the particle; the coating film preferably contains carbon; and the number of cobalt atoms in the coating film is preferably less than 0.05 times the number of carbon atoms in the coating film.

In the above structure, magnesium is preferably contained and, in the X-ray photoelectron spectroscopy, the number of magnesium atoms is preferably greater than or equal to 0.4 times and less than or equal to 1.5 times the number of cobalt atoms.

One embodiment of the present invention is a positive electrode active material containing lithium, cobalt, oxygen, nickel, and aluminum and having a crystal structure belonging to a space group R-3m when Rietveld analysis is performed on a pattern obtained by powder X-ray diffraction using a CuKα1 ray. In analysis by X-ray photoelectron spectroscopy, the number of aluminum atoms is less than the number of cobalt atoms and greater than the number of nickel atoms.

In the above structure, an extraction angle in the X-ray photoelectron spectroscopy is preferably greater than or equal to 40° and less than or equal to 50°.

In the above structure, a particle is preferably included; when a cross section of the particle is analyzed by TEM-EDX, in a first region where a distance from a surface of the particle is greater than or equal to 20 nm and less than or equal to 200 nm, the number of aluminum atoms analyzed by the TEM-EDX is preferably greater than or equal to 0.04 times and less than 1.6 times the number of cobalt atoms; and in a second region where a distance from the surface of the particle is greater than or equal to 1 μm and less than or equal to 3 μm, the number of aluminum atoms analyzed by the TEM-EDX is preferably less than 0.03 times the number of cobalt atoms.

In the above structure, the number of nickel atoms analyzed by the TEM-EDX is preferably less than 0.5 times the number of aluminum atoms in the first region.

In the above structure, the cross section of the particle is preferably exposed by processing with a focused ion beam system.

In the above structure, the positive electrode active material preferably includes a coating film in contact with the surface of the particle; the coating film preferably contains carbon; and the number of cobalt atoms in the coating film is preferably less than 0.05 times the number of carbon atoms in the coating film.

In the above structure, the concentration of sulfur measured by glow discharge mass spectroscopy is preferably greater than or equal to 150 ppm wt and less than or equal to 2000 ppm wt.

In the above structure, the concentration of titanium measured by glow discharge mass spectroscopy is preferably less than or equal to 300 ppm wt.

Another embodiment of the present invention is a positive electrode active material that is a group of particles, including a first particle group and a second particle group; lithium, cobalt, oxygen, and aluminum; and a crystal structure belonging to a space group R-3m when Rietveld analysis is performed on a pattern obtained by powder X-ray diffraction using a CuKα1 ray. In ICP-MS, GD-MS, or elementary analysis of atomic absorption, the number of magnesium atoms is Mg1 and the number of cobalt atoms is Co1; Mg1/Co1 is greater than or equal to 0.001 and less than or equal to 0.06; a particle size distribution of the first particle group has a first local maximum peak and a particle size distribution of the second particle group has a second local maximum peak; the first local maximum peak has a local maximum value at greater than or equal to 9 μm and less than or equal to 25 μm; and the second local maximum peak has a local maximum value at greater than or equal to 0.1 μm and less than 9 μm.

In the above structure, the intensity of the local maximum value of the first local maximum peak is preferably I1; the intensity of the local maximum value of the second local maximum peak is preferably I2; and I1/I2 is preferably greater than or equal to 0.01 and less than or equal to 0.6.

In the above structure, magnesium is preferably contained and, in X-ray photoelectron spectroscopy, the number of magnesium atoms is preferably greater than or equal to 0.4 times and less than or equal to 1.5 times the number of cobalt atoms in the group of particles.

In the above structure, the particle size distribution is preferably measured with a laser diffraction particle size distribution measurement tool.

In the above structure, an extraction angle in the X-ray photoelectron spectroscopy is preferably greater than or equal to 40° and less than or equal to 50°.

Another embodiment of the present invention is a secondary battery including a positive electrode containing the positive electrode active material described in any of the above, a negative electrode, and an electrolyte solution. Charge and discharge are performed once and first discharge capacity is obtained by the discharge, and then charge and discharge are alternately performed 50 times and second discharge capacity is obtained by the last discharge, and the second discharge capacity is greater than or equal to 90% the first discharge capacity.

In the above structure, the charge is preferably performed under CCCV condition; a CC charging current is preferably higher than or equal to 0.01 C and lower than or equal to 1.0 C; upper limit voltage of the CC charge is preferably higher than or equal to 4.55 V with reference to Li/Li$^+$; a termination current of the CV charge is preferably higher than or equal to 0.001 C; the discharge is preferably performed under CC condition; a CC discharging current is preferably higher than or equal to 0.05 C and lower than or equal to 2.0 C; and measurement temperature is preferably higher than or equal to 15° C. and lower than or equal to 55° C.

Another embodiment of the present invention is a secondary battery including a positive electrode containing the positive electrode active material described in any of the above, and a lithium metal is used for a counter electrode. Charge and discharge are performed once and first discharge capacity is obtained by the discharge, and then charge and discharge are alternately performed 50 times and second discharge capacity is obtained by the last discharge, and the second discharge capacity is greater than or equal to 90% the first discharge capacity; the charge is performed under CCCV condition; a CC charging current is higher than or equal to 0.01 C and lower than or equal to 1.0 C; upper limit voltage of the CC charge is higher than or equal to 4.55 V with reference to Li/Li$^+$; a termination current of the CV charge is higher than or equal to 0.001 C; the discharge is performed under CC condition; a CC discharging current is higher than or equal to 0.05 C and lower than or equal to 2.0 C; and measurement temperature is higher than or equal to 15° C. and lower than or equal to 55° C.

Another embodiment of the present invention is a method for manufacturing a positive electrode active material, including a first step of mixing a composite oxide containing lithium and cobalt and aluminum to form a first mixture and a second step of heating the first mixture. The atomic ratio of aluminum contained in the first mixture and cobalt contained in the composite oxide in the first step is represented by aluminum:cobalt=$C\_a$:1, and $C\_a$ is greater than or equal to 0.0005 and less than or equal to 0.02.

In the above structure, the heating temperature in the second step is preferably higher than or equal to 700° C. and lower than or equal to 920° C.

Another embodiment of the present invention is a method for manufacturing a positive electrode active material, including a first step of mixing a composite oxide containing lithium and cobalt, magnesium, and fluorine to form a first mixture, a second step of heating the first mixture to form a second mixture, a third step of mixing the second mixture and aluminum to form a third mixture, and a fourth step of heating the third mixture. The atomic ratio of aluminum contained in the third mixture in the third step and cobalt contained in the composite oxide in the first step is represented by aluminum:cobalt=$C\_a$:1, and $C\_a$ is greater than or equal to 0.0005 and less than or equal to 0.02.

In the above structure, the atomic ratio of magnesium contained in the first mixture and cobalt contained in the composite oxide in the first step is preferably represented by magnesium:cobalt=$C\_m$:1, and $Cm$ is preferably greater than or equal to 0.001 and less than or equal to 0.06.

In the above structure, the heating temperature in the fourth step is preferably higher than or equal to 700° C. and lower than or equal to 920° C.

Another embodiment of the present invention is a method for manufacturing a positive electrode active material, including a first step of mixing a composite oxide containing lithium and cobalt, magnesium, and fluorine to form a first mixture, a second step of heating the first mixture to form a second mixture, a third step of mixing the second mixture, aluminum, and nickel to form a third mixture, and a fourth step of heating the third mixture. The atomic ratio of aluminum contained in the third mixture in the third step and cobalt contained in the composite oxide in the first step is represented by aluminum:cobalt=$C\_a$:1, and $C\_a$ is greater than or equal to 0.0005 and less than or equal to 0.02, and the atomic ratio of nickel contained in the third mixture in the third step and cobalt contained in the composite oxide in the first step is represented by nickel:cobalt=$C\_n$:1, and $C\_n$ is greater than or equal to 0.0005 and less than or equal to 0.02.

In the above structure, the atomic ratio of magnesium contained in the first mixture and cobalt contained in the composite oxide in the first step is preferably represented by magnesium:cobalt=$C\_m$:1, and $C\_m$ is preferably greater than or equal to 0.001 and less than or equal to 0.06.

In the above structure, the heating temperature in the fourth step is preferably higher than or equal to 700° C. and lower than or equal to 920° C.

Effect of the Invention

According to one embodiment of the present invention, a positive electrode active material that has high capacity and excellent charge and discharge cycle performance for a secondary battery, and a manufacturing method thereof can be provided. In addition, a manufacturing method of a positive electrode active material with high productivity can be provided. In addition, a positive electrode active material that suppresses a decrease in capacity in charge and discharge cycles when used for a secondary battery can be provided. In addition, a high-capacity secondary battery can be provided. In addition, a secondary battery with excellent charge and discharge characteristics can be provided. In addition, a highly safe or reliable secondary battery can be provided. In addition, a novel material, novel active material particles, a novel power storage device, or a manufacturing method thereof can be provided.

MODE FOR CARRYING OUT THE INVENTION

Figure 1A:
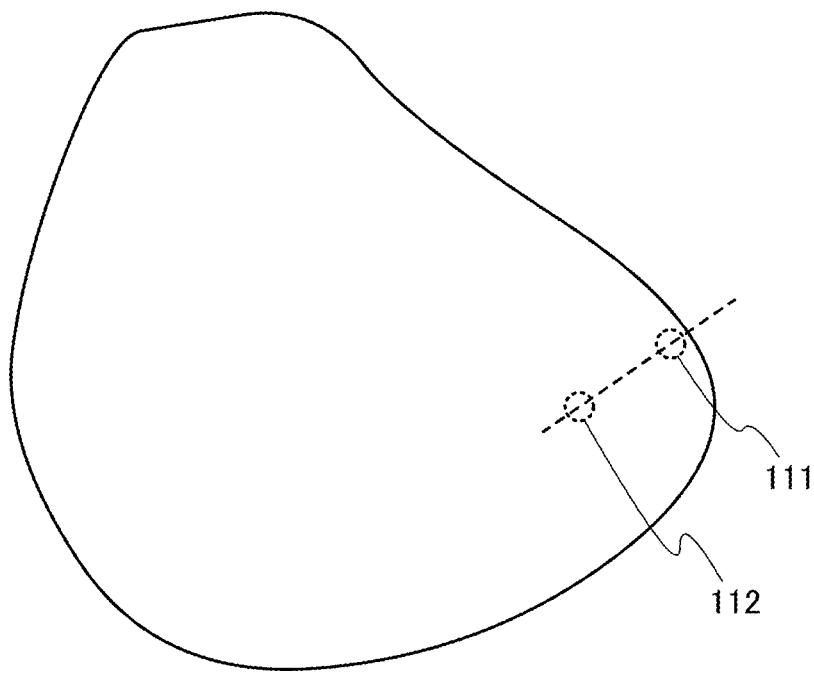
FIG. 1A and FIG. 1B are diagrams showing an example of a cross section of a positive electrode active material of one embodiment of the present invention.

Hereinafter, embodiments are described with reference to the drawings. Note that the embodiments can be implemented with many different modes, and it will be readily understood by those skilled in the art that modes and details thereof can be changed in various ways without departing from the spirit and scope thereof. Thus, the present invention should not be construed as being limited to the following description of the embodiments.

Note that ordinal numbers such as "first", "second", and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or claims. Moreover, in this specification and the like, for example, a "first" component in one embodiment can be omitted in other embodiments or claims.

Note that in the drawings, the same elements, elements having similar functions, elements formed of the same material, elements formed at the same time, or the like are sometimes denoted by the same reference numerals, and repeated description thereof is omitted in some cases.

In addition, in this specification and the like, crystal planes and orientations are indicated by the Miller index. In the crystallography, a bar is placed over a number in the expression of crystal planes and orientations; however, in this specification and the like, crystal planes and orientations are in some cases expressed by placing a minus sign (−) at the front of a number instead of placing the bar over the number because of patent expression limitations. Furthermore, an individual direction which shows an orientation in a crystal is denoted by "[ ]", a set direction which shows all of the equivalent orientations is denoted by "< >", an individual plane which shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from a surface to a depth of approximately 10 nm. A plane generated by a crack may also be referred to as a surface. In addition, a region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and the transition metal and lithium are regularly arranged to form a two-dimensional plane, so that lithium can be two-dimensionally diffused. Note that a defect such as a cation or anion vacancy may exist. Moreover, in the layered rock-salt crystal structure, strictly, a lattice of a rock-salt crystal is distorted in some cases.

In addition, in this specification and the like, a rock-salt crystal structure refers to a structure in which cations and anions are alternately arranged. Note that a cation or anion vacancy may exist.

In addition, in this specification and the like, a pseudo-spinel crystal structure of a composite oxide containing lithium and a transition metal refers to a space group R-3m, which is not a spinel crystal structure but a crystal structure in which oxygen is hexacoordinated to ions such as cobalt and magnesium, and the cation arrangement has symmetry similar to that of the spinel crystal structure. Note that in the pseudo-spinel crystal structure, oxygen is tetracoordinated to a light element such as lithium in some cases. Also in that case, the ion arrangement has symmetry similar to that of the spinel crystal structure.

The pseudo-spinel crystal structure can also be regarded as a crystal structure that contains Li between layers at random but is similar to a $CdCl_2$ type crystal structure. The crystal structure similar to the $CdCl_2$ type crystal structure is close to a crystal structure of lithium nickel oxide when charged up to a charge depth of 0.94 ($Li_{0.06}NiO_2$); however, pure lithium cobalt oxide or a layered rock-salt positive electrode active material containing a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

Whether the crystal orientations in two regions are substantially aligned can be judged from a TEM (transmission electron microscope) image, a STEM (scanning transmission electron microscope) image, a HAADF-STEM (high-angle annular dark field scanning transmission electron microscope) image, an ABF-STEM (annular bright-field scanning transmission electron microscope) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures in the layered rock-salt crystal and the rock-salt crystal are aligned, a state where an angle made by the repetition of bright lines and dark lines in the layered rock-salt crystal and the rock-salt crystal is less than or equal to 5°, further preferably less than or equal to 2.5° can be observed. Note that in the TEM image and the like, a light element typified by oxygen or fluorine cannot be clearly observed in some cases; however, in such a case, alignment of orientations can be judged by arrangement of metal elements.

In addition, in this specification and the like, theoretical capacity of a positive electrode active material refers to the amount of electricity obtained when all lithium that can be inserted and extracted and is contained in the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In addition, in this specification and the like, charge depth obtained when all lithium that can be inserted and extracted is inserted is 0, and charge depth obtained when all lithium that can be inserted and extracted and is contained in a positive electrode active material is extracted is 1.

In addition, in this specification and the like, charge refers to transfer of lithium ions from a positive electrode to a negative electrode in a battery and transfer of electrons from a negative electrode to a positive electrode in an external circuit. For a positive electrode active material, extraction of lithium ions is called charge. Moreover, a positive electrode active material with a charge depth of greater than or equal to 0.74 and less than or equal to 0.9, more specifically, a charge depth of greater than or equal to 0.8 and less than or equal to 0.83 is referred to as a high-voltage charged positive electrode active material. Thus, for example, $LiCoO_2$ charged to 219.2 mAh/g is a high-voltage charged positive electrode active material. In addition, $LiCoO_2$ that is subjected to constant current charging in an environment at 25° C. and charging voltage of higher than or equal to 4.525 V and lower than or equal to 4.65 V (in the case of a lithium counter electrode), and then subjected to constant voltage charging until the current value becomes 0.01 C or approximately 1/5 to 1/100 of the current value at the time of the constant current charging is also referred to as a high-voltage charged positive electrode active material.

Similarly, discharge refers to transfer of lithium ions from a negative electrode to a positive electrode in a battery and transfer of electrons from a positive electrode to a negative electrode in an external circuit. Discharge of a positive electrode active material refers to insertion of lithium ions. Furthermore, a positive electrode active material with a charge depth of less than or equal to 0.06 or a positive electrode active material from which more than or equal to 90% of the charge capacity is discharged from a state where the positive electrode active material is charged with high voltage is referred to as a sufficiently discharged positive electrode active material. For example, $LiCoO_2$ with a charge capacity of 219.2 mAh/g is in a state of being charged with high voltage, and a positive electrode active material from which more than or equal to 197.3 mAh/g, which is 90% of the charge capacity, is discharged is a sufficiently discharged positive electrode active material. In addition, $LiCoO_2$ that is subjected to constant current discharging in an environment at 25° C. until the battery voltage becomes lower than or equal to 3 V (in the case of a lithium counter electrode) is also referred to as a sufficiently discharged positive electrode active material.

In addition, in this specification and the like, an unbalanced phase change refers to a phenomenon that causes a nonlinear change in physical quantity. For example, an unbalanced phase change might occur before and after peaks in a dQ/dV curve obtained by differentiating capacitance (Q) with voltage (V) (dQ/dV), which can largely change the crystal structure.

Embodiment 1

In this embodiment, a positive electrode active material or the like of one embodiment of the present invention is described.

[Positive Electrode Active Material]

An increase in the charging voltage of a secondary battery can increase discharge capacity. In the case where a positive electrode active material has a crystal structure, an increase in charging voltage may change the crystal structure.

In the case where a change in a crystal structure due to charge is irreversible, the crystal structure of a positive electrode active material might be broken due to repeated charge and discharge and discharge capacity might be decreased.

The voltage of a positive electrode generally increases with increasing charging voltage of a secondary battery. The positive electrode active material of one embodiment of the present invention has a stable crystal structure also at high voltage. The stable crystal structure of the positive electrode active material in charge can suppress a capacity decrease due to repeated charge and discharge.

A short circuit of a secondary battery might cause not only a malfunction in charge operation and discharge operation of the secondary battery but also heat generation and firing. In order to obtain a safe secondary battery, a short-circuit current is preferably inhibited even at a high charging voltage. In the positive electrode active material of one embodiment of the present invention, a short-circuit current is inhibited even at a high charging voltage; thus, both high capacity and a high level of safety can be achieved.

It is preferable that a secondary battery using the positive electrode active material of one embodiment of the present invention have high capacity, excellent charge and discharge cycle performance, and safety simultaneously.

Positive electrode active materials having a layered structure, which are typified by lithium cobalt oxide, lithium nickel-cobalt-manganese oxide, lithium nickel-cobalt-aluminum oxide, and the like, each contain an extremely large amount of lithium, which is inserted and extracted in charge and discharge of a secondary battery, per volume and per weight of the positive electrode active material. Thus, a secondary battery using any of those positive electrode active materials has an advantage of high capacity.

In contrast, as charging voltage increases, a metal serving as a carrier ion, specifically, for example, lithium is released from a positive electrode active material having a layered structure; accordingly, a lattice constant changes or a deviation in the layers occurs, which may easily break the crystal structure. In the case where a metal serving as a carrier ion is positioned between the layers, a change in a lattice constant may obviously occur in the direction vertical to the layer due to the release of the metal.

The positive electrode active material of one embodiment of the present invention preferably contains magnesium in addition to a first metal (hereinafter, a metal A), a second metal (hereinafter, a metal M), and oxygen. The metal A is a metal serving as a carrier ion, for example. The metal M is one or more metals that preferably include a metal taking part in an oxidation-reduction reaction. The present inventors have found that adding aluminum to the positive electrode active material containing magnesium further inhibits a short circuit of a secondary battery at high voltage compared to the case of adding another element.

Although inhibiting a short circuit is preferable for safety, inhibiting a short circuit decreases discharge capacity in some cases. For example, although aluminum is effective in inhibiting a short-circuit current, too high concentration thereof might decrease capacity. The present inventors have found that further adding nickel to the positive electrode active material containing magnesium and aluminum more effectively inhibits a decrease in discharge capacity of a secondary battery compared to the case of adding another element.

Here, in the case where the positive electrode active material of one embodiment of the present invention includes a particle, magnesium, aluminum, and nickel in the particle each preferably have a concentration gradient, and for example, concentration in the vicinity of a surface is preferably high. Meanwhile, nickel may have a higher concentration than magnesium and aluminum when taken into the particle. In other words, the concentration gradients of magnesium and aluminum are inclined toward the surface side and have steeper profiles compared to that of nickel in some cases.

Here, a high charging voltage is, for example, higher than or equal to 4.55 V (vs $Li/Li^+$), preferably higher than or equal to 4.6 V (vs $Li/Li^+$), further preferably higher than or equal to 4.65 V (vs $Li/Li^+$).

As the metal A, for example, alkaline metals such as lithium, sodium, and potassium and Group 2 elements such as calcium, beryllium, and magnesium can be used, and lithium is preferably used as the metal A. The metal M is one or more elements selected from cobalt, manganese, and iron, for example, and cobalt is preferably contained as the metal M. In addition to those elements, one or more elements selected from nickel and manganese may be contained as the metal M.

Examples of the crystal structure of the positive electrode active material include a layered rock-salt crystal structure, a spinel crystal structure, and an olivine crystal structure. In particular, the positive electrode active material of one embodiment of the present invention preferably has a layered rock-salt crystal structure. The layered rock-salt crystal structure is expressed by a space group R-3m in some cases.

A case where the positive electrode active material 100 includes a particle 101 is considered. The particle 101 contains the metal A, the metal M, and oxygen. The particle 101 preferably contains magnesium and aluminum. In the particle 101, magnesium and aluminum each preferably have a concentration gradient, and for example, concentration in the vicinity of a surface of the particle 101 is preferably high. Alternatively, the concentration of a surface portion of the particle 101 is preferably high.

In the particle 101, for example, the concentrations of magnesium and aluminum measured by XPS or the like are preferably higher than the concentrations measured by ICP-MS (inductively coupled plasma mass spectrometry), GD-MS (glow discharge mass spectrometry), or the like.

In the particle 101, for example, when a cross section is exposed by processing to be analyzed by TEM-EDX, the concentrations of magnesium and aluminum in the surface portion are preferably higher than the concentrations in a region whose position is deeper than that of the surface portion. The processing can be performed by FIB, for example.

The particle 101 preferably contains nickel. In the particle 101, nickel preferably has a concentration gradient, and for example, concentration in the vicinity of the surface of the particle 101 is high in some cases. Alternatively, the concentration of the surface portion of the particle 101 is high in some cases.

In the particle 101, for example, the nickel concentration measured by ICP-MS, GD-MS, or the like is higher than the concentration measured by XPS or the like in some cases.

In the particle 101, for example, when a cross section is exposed by processing to be analyzed by TEM-EDX, the nickel concentration in the surface portion is higher than the concentrations in a region whose position is deeper than that of the surface portion in some cases.

Parts of magnesium, aluminum, and nickel contained in the positive electrode active material 100 are not taken into the crystal structure in some cases. "Taken into the crystal structure" means that the positive electrode active material 100 has a crystal structure containing the metal A, the metal M, and oxygen and one or more of magnesium, aluminum, and nickel are substituted for part of the elements contained in the crystal structure. Alternatively, one or more of magnesium, aluminum, and nickel may be positioned in the lattice of the crystal structure. It is also possible that parts of magnesium, aluminum, and nickel contained in the positive electrode active material 100 are not taken into the crystal structure. The positive electrode active material 100 may include, for example, a particle 102 containing one or more of magnesium, aluminum, and nickel as a main component. In addition, the particle 102 may be in contact with the surface of the particle 101, for example.

In the particle 102, the concentration of at least one of magnesium, aluminum, and nickel is higher than the concentration of the second metal, for example.

FIG. 1A shows an example of a cross section of the particle 101 included in the positive electrode active material 100. The particle 101 includes a region 111 and a region 112.

Figure 1B:
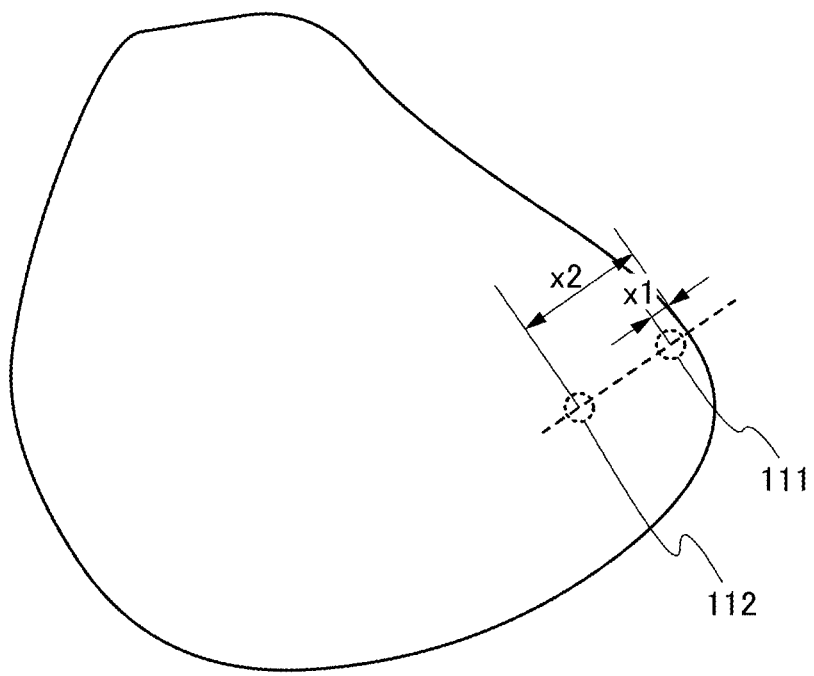

As illustrated in FIG. 1B, a distance x1 from the surface of the particle 101 to the region 111 is smaller than a distance x2 from the surface of the particle 101 to the region 112.

As the distance from the surface of the particle, for example, a distance in a direction perpendicular to a tangent to the surface of the cross section of the particle can be used. Alternatively, a distance in a direction indicated by a line drawn from the surface of the cross section of the particle to the center or centroid of the cross section of the particle can be used.

Figure 2A:
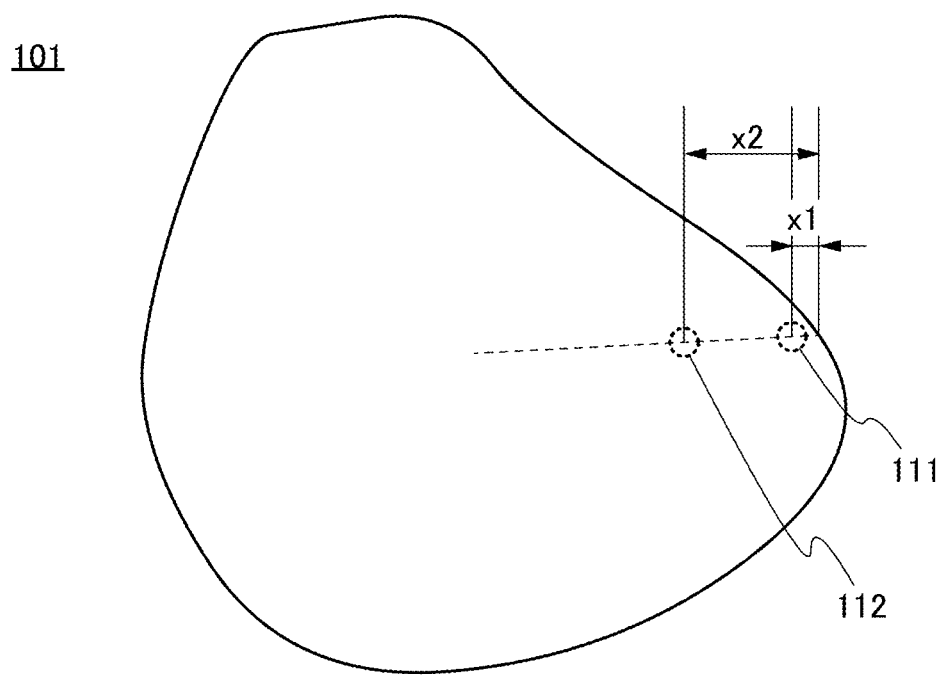
FIG. 2A and FIG. 2B are diagrams showing an example of a cross section of a positive electrode active material of one embodiment of the present invention.

FIG. 2A shows an example in which a distance in a direction different from that in FIG. 1B is used.

Figure 2B:
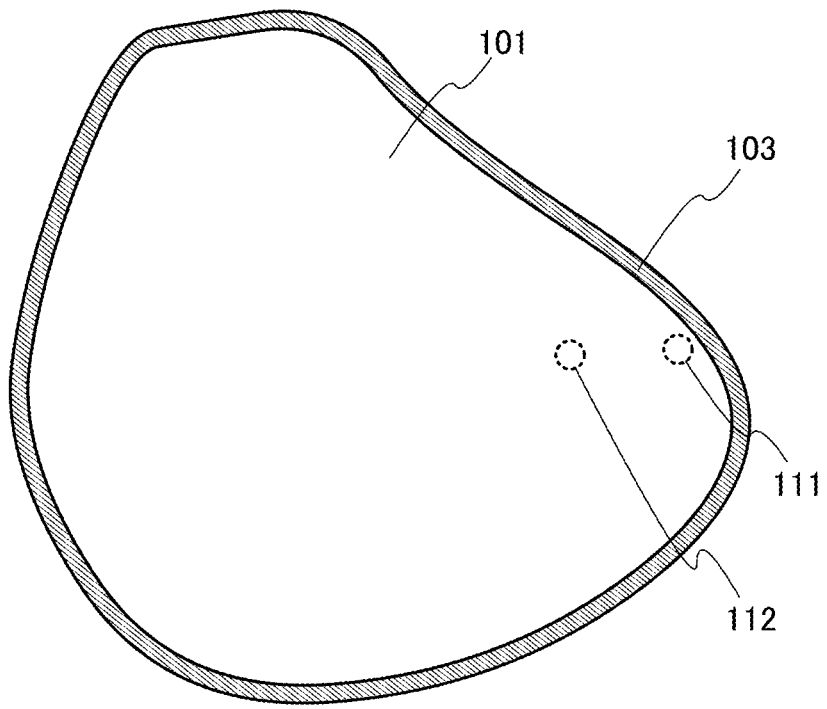

In the case where a secondary battery includes a positive electrode, a negative electrode, and an electrolyte solution, the electrolyte solution is decomposed in charge and discharge of the secondary battery, and the decomposition product may be deposited as a coating film 103 on a surface of the component of the electrode such as the particle 101 or the particle 102 included in the active material, for example. FIG. 2B shows an example in which the coating film 103 is deposited on the surface of the particle 101.

Figure 3:
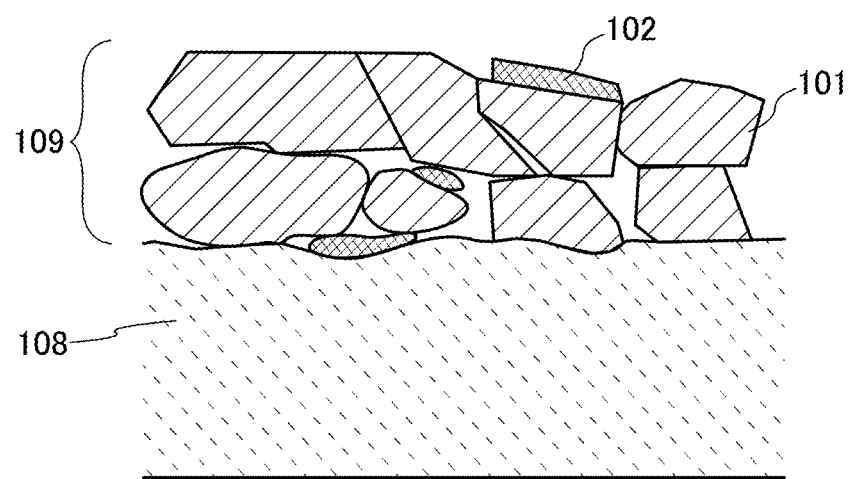
FIG. 3 is a diagram showing an example of a cross section of a positive electrode of one embodiment of the present invention.

FIG. 3 shows an example of the cross section of the positive electrode. FIG. 3 shows an example in which a positive electrode active material layer 109 including the particle 101 and the particle 102 is formed over a current collector 108. The positive electrode active material layer and the current collector are described in detail later.

When the number of cobalt atoms included in the positive electrode active material 100 is 1, the relative value of the number of magnesium atoms is preferably greater than or equal to 0.001 and less than or equal to 0.06, further preferably greater than or equal to 0.003 and less than or equal to 0.03. In addition, when the number of cobalt atoms is 1, the relative value of the number of aluminum atoms is preferably greater than or equal to 0.0005 and less than or equal to 0.02, further preferably greater than or equal to 0.001 and less than or equal to 0.015, still further preferably greater than or equal to 0.001 and less than or equal to 0.009. When the number of cobalt atoms is 1, the relative value of the number of nickel atoms is preferably greater than or equal to 0.0005 and less than or equal to 0.02, further preferably greater than or equal to 0.001 and less than or equal to 0.015, still further preferably greater than or equal to 0.001 and less than or equal to 0.009. The number of cobalt atoms, the number of magnesium atoms, and the number of nickel atoms can be evaluated by ICP-MS, for example.

The particle size distribution of the positive electrode active material 100 preferably has a local maximum peak in the range of 9 μm to 25 μm. Alternatively, in the particle size distribution of the positive electrode active material of one embodiment of the present invention, the average particle diameter (D50) is preferably greater than or equal to 9 μm and less than or equal to 25 μm.

The diameter of the particle included in the positive electrode active material 100 can be evaluated by surface observation with a SEM, cross-sectional observation with a TEM, or the like. The particle size of the particle included in the positive electrode active material 100 can be evaluated from the particle size distribution. The particle size distribution of the positive electrode active material 100 can be measured with a laser diffraction particle size distribution measurement tool, for example.

In the case where the particle size distribution of the positive electrode active material 100 has a local maximum peak in the range of 9 μm to 25 μm and the number of cobalt atoms included in the positive electrode active material 100 is 1, the relative value of the number of magnesium atoms is preferably greater than or equal to 0.001 and less than or equal to 0.06, further preferably greater than or equal to 0.003 and less than or equal to 0.03, still further preferably greater than or equal to 0.007 and less than or equal to 0.025, for example. The number of cobalt atoms and the number of magnesium atoms can be evaluated by ICP-MS, for example.

The positive electrode active material 100 preferably contains halogen such as fluorine.

The number of titanium atoms in the positive electrode active material 100 is, for example, less than or equal to 300 ppm wt.

The positive electrode active material 100 may contain sulfur at greater than or equal to 150 ppm wt and less than or equal to 2000 ppm wt.

The number of titanium atoms and the number of sulfur atoms in the positive electrode active material 100 can be measured by GD-MS, for example.

The positive electrode active material 100 is preferably a group of a plurality of particle groups having different particle size distributions. For each of the particles, the description of the particle 101 and the particle 102 described above can be referred to, for example.

In the case where the positive electrode active material 100 is a group of a plurality of particle groups having different particle size distributions, the particle size distribution preferably has a first local maximum peak and a second local maximum peak. The value of the first local maximum peak is preferably greater than or equal to 9 μm and less than or equal to 25 μm. The value of the second local maximum peak is preferably greater than or equal to 0.1 μm and less than 9 μm. Alternatively, the positive electrode active material 100 includes a first particle group and a second particle group; in the particle size distribution of the first particle group, the average particle diameter (D50) is preferably greater than or equal to 9 μm and less than or equal to 25 μm, and in the particle size distribution of the second particle group, the average particle diameter (D50) is preferably greater than or equal to 0.1 μm and less than 9 μm.

In the case where the first local maximum peak and the second local maximum peak overlap with each other, peak separation may be performed using a function to analyze the peak intensity, half width, or the like of each peak.

When the positive electrode active material 100 includes a plurality of particle groups having different particle size distributions, the density of a positive electrode active material layer using the positive electrode active material 100 may be increased. The increase in the density of the positive electrode active material layer can increase the amount of active material per volume in a secondary battery. Therefore, the capacity per volume of the secondary battery can be increased in some cases. Meanwhile, in the case where the density of a positive electrode active material is high, an electrolyte solution might be less likely to enter a space between particles included in an active material layer. In such a case, for example, the output characteristics of a secondary battery might be reduced, for example.

The positive electrode active material of one embodiment of the present invention is stable also at a high charging voltage and thus charge capacity can be increased; as a result, discharge capacity of a secondary battery can be increased. Therefore, the capacity per volume of a secondary battery is sufficiently high in some cases without excessively increasing the density of a positive electrode active material.

When the proportion of a material other than the positive electrode active material, such as a conductive additive or a binder, is decreased in the positive electrode active material layer, the density of the positive electrode active material layer can be increased.

The thickness of the positive electrode active material layer is larger than or equal to 10 μm and smaller than or equal to 200 μm, for example. Alternatively, the thickness is greater than or equal to 50 μm and less than or equal to 150 μm. In the case where the positive electrode active material contains a material having a layered rock-salt crystal structure containing cobalt, the carried amount of the positive electrode active material layer is greater than or equal to 1 mg/cm$^2$ and less than or equal to 50 mg/cm$^2$, for example. Alternatively, the carried amount is greater than or equal to 5 mg/cm$^2$ and less than or equal to 30 mg/cm$^2$. In the case where the positive electrode active material contains a material having a layered rock-salt crystal structure containing cobalt, the density of the positive electrode active material layer is greater than or equal to 2.2 g/cm$^3$ and less than or equal to 4.9 g/cm$^3$, for example. Alternatively, the density is greater than or equal to 3.8 g/cm$^3$ and less than or equal to 4.5 g/cm$^3$. Here, the carried amount refers to a value of the positive electrode active material layer on one surface of the current collector, for example.

<XPS>

A region from the surface to a depth of approximately 2 to 8 nm (normally, approximately 5 nm) can be analyzed by X-ray photoelectron spectroscopy (XPS); thus, the concentration of each element in approximately half of the surface portion can be quantitatively analyzed. In addition, the bonding states of the elements can be analyzed by narrow scanning analysis. Note that the quantitative accuracy of XPS is approximately ±1 atomic % in many cases. The lower detection limit depends on the element but is approximately 1 atomic %. The unit of the concentration of XPS is, for example, atomic %.

In the case where the positive electrode active material 100 includes the first particle group and the second particle group, the number of magnesium atoms in the first particle group is sometimes higher than the number of magnesium atoms in the second particle group.

When ICP-MS, GD-MS, or elementary analysis of atomic absorption is performed on the positive electrode active material 100 and the number of cobalt atoms (Co1) is 1, the relative value of the number of magnesium atoms (Mg1) is preferably greater than or equal to 0.4 and less than or equal to 1.5, further preferably greater than or equal to 0.5 and less than or equal to 1.1. In other words, Mg1/Co1 is preferably greater than or equal to 0.001 and less than or equal to 0.06.

Furthermore, the relative value of the number of halogen atoms such as fluorine is preferably greater than or equal to 0.05 and less than or equal to 1.5, further preferably greater than or equal to 0.3 and less than or equal to 1.00.

In addition, when the positive electrode active material 100 is analyzed by XPS, a peak indicating the bonding energy of fluorine with another element is preferably higher than or equal to 682 eV and lower than 685 eV, further preferably approximately 684.8 eV. This value is different from the bonding energy of magnesium fluoride, which is 686 eV. That is, when the positive electrode active material 100 contains fluorine, bonding other than bonding of magnesium fluoride is preferable.

Furthermore, when the positive electrode active material 100 is analyzed by XPS, a peak indicating the bonding energy of magnesium with another element is preferably higher than or equal to 1302 eV and lower than 1304 eV, further preferably approximately 1303 eV. This value is different from the bonding energy of magnesium fluoride, which is 1305 eV, and is close to the bonding energy of magnesium oxide. That is, when the positive electrode active material 100 contains magnesium, bonding other than bonding of magnesium fluoride is preferable.

In the positive electrode active material 100, the number of aluminum atoms evaluated by XPS may be less than that of magnesium atoms and greater than that of nickel atoms. Moreover, in the positive electrode active material 100, when the number of cobalt atoms detected by XPS is 1, the relative value of the number of aluminum atoms is less than or equal to 0.2 or less than or equal to 0.15, for example. Nickel is not detected by XPS in some cases after heat treatment is performed in a manufacturing method described later.

The positive electrode active material of one embodiment of the present invention on which the manufacturing method described later is performed may have a smaller number of bonds containing carbonic acid than a composite oxide used in Step S24.

<EDX>

In the EDX measurement, to measure a region while scanning the region and evaluate two-dimensionally is referred to as EDX area analysis in some cases. In addition, to extract data of a linear region from EDX area analysis and evaluate the atomic concentration distribution in a positive electrode active material particle is referred to as linear analysis in some cases.

The concentrations of magnesium and fluorine in the inner portion, the surface portion, and the vicinity of the crystal grain boundary can be quantitatively analyzed by the EDX area analysis (e.g., element mapping). In addition, peaks of the concentrations of magnesium and fluorine can be analyzed by the EDX linear analysis. The unit of the concentration of EDX is, for example, atomic %.

When EDX line analysis is performed on the particle 101 included in the positive electrode active material 100, in a first region where the distance from the surface of the particle 101 is larger than or equal to 20 nm and smaller than or equal to 200 nm, the number of aluminum atoms in the EDX analysis is preferably more than or equal to 0.04 times and less than 1.6 times the number of cobalt atoms. In a second region where the distance from the surface of the particle 101 is larger than or equal to 1 μm and smaller than or equal to 3 μm, the number of aluminum atoms in the EDX analysis is preferably less than 0.03 times the number of cobalt atoms.

Specific examples of a method for the EDX analysis include a method in which a cross section of a particle is exposed by processing using FIB and then analyzed by TEM-EDX analysis.

[Structure Example of Positive Electrode Active Material]

Figure 4:
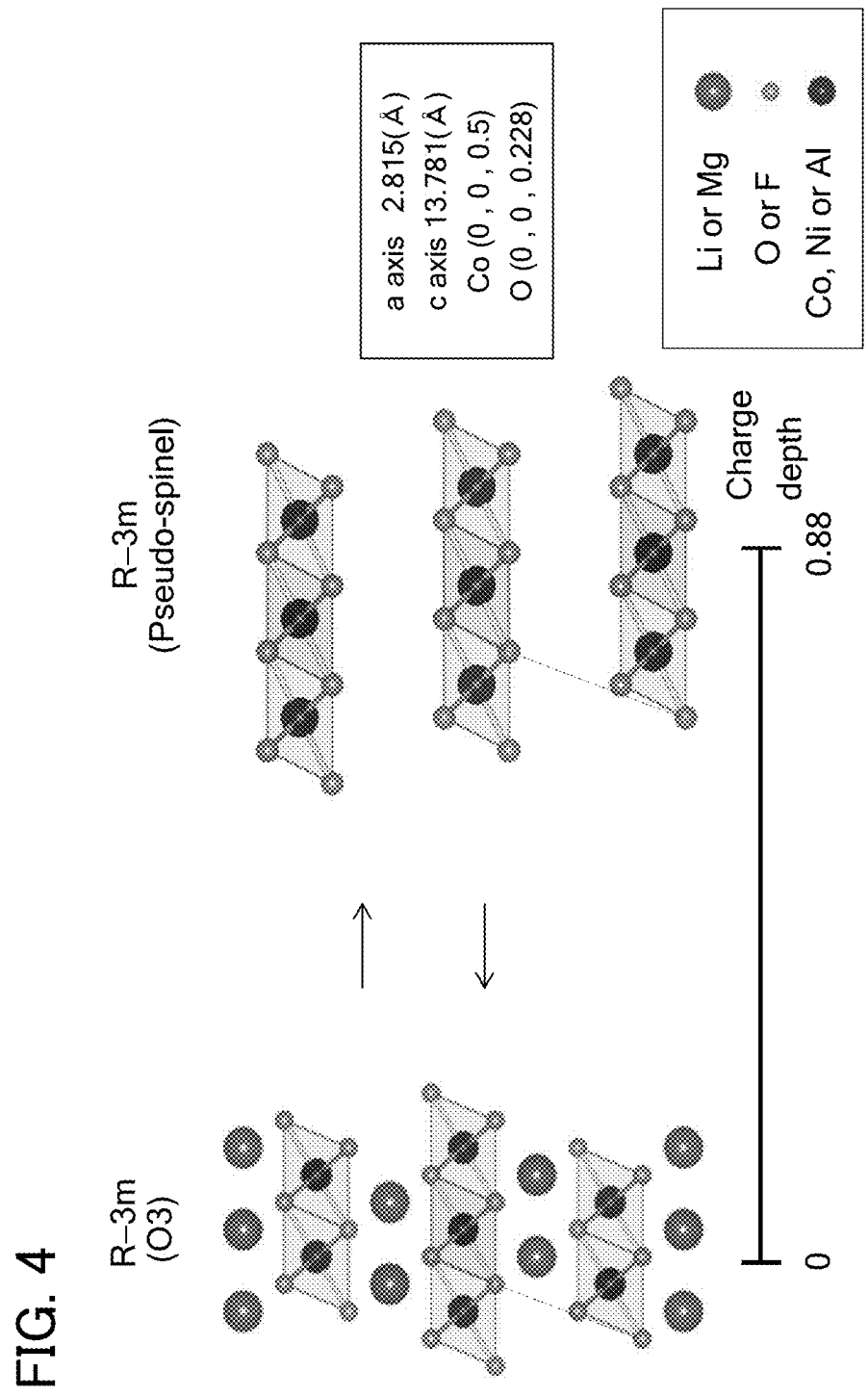
FIG. 4 is a diagram illustrating the charge depth and crystal structures of a positive electrode active material of one embodiment of the present invention.
Figure 5:
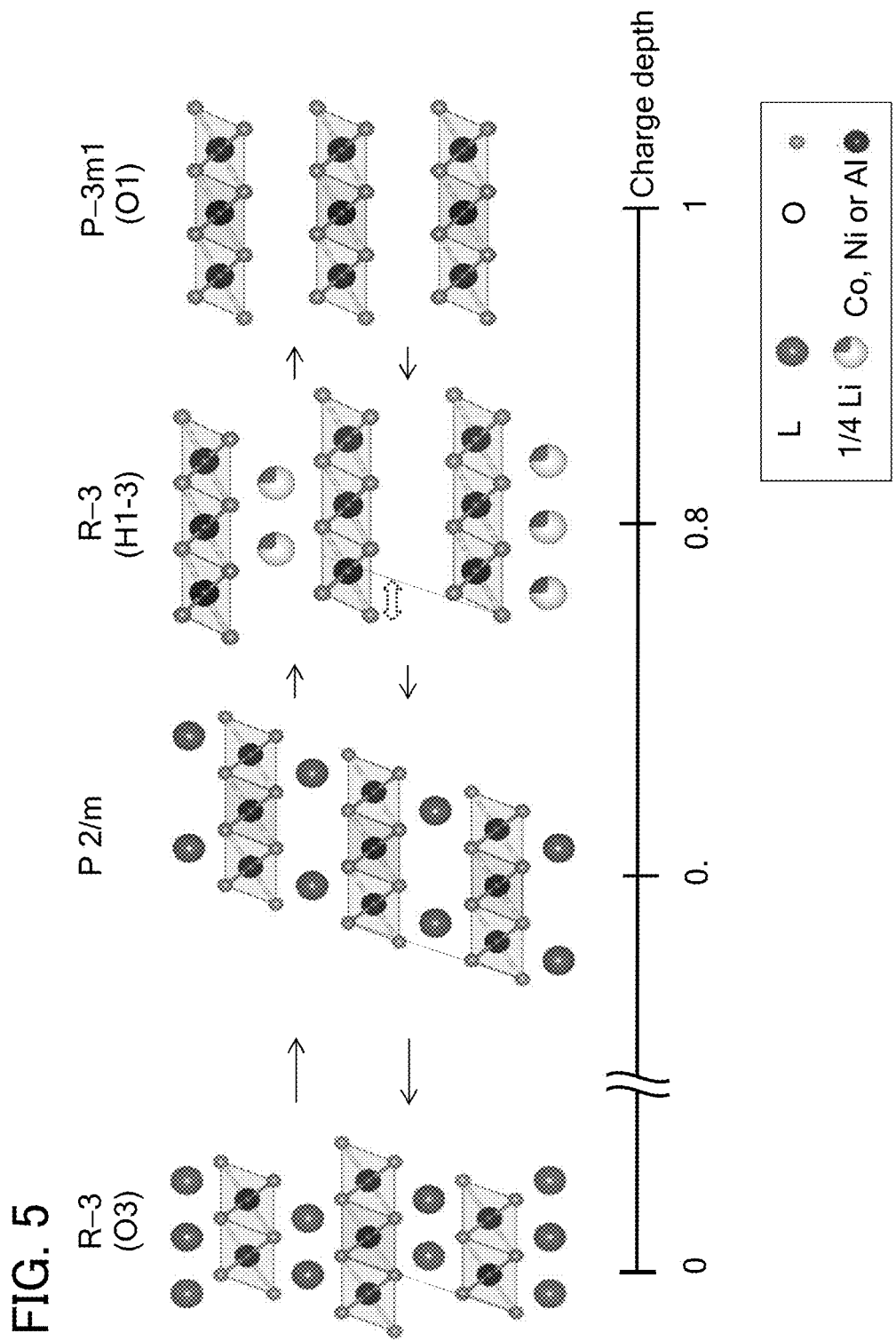
FIG. 5 is a diagram illustrating the charge depth and crystal structures of a conventional positive electrode active material.

Positive electrode active materials are described with reference to FIG. 4 and FIG. 5. In FIG. 4 and FIG. 5, the case where cobalt is used as a transition metal contained in the positive electrode active material is described.

A positive electrode active material shown in FIG. 5 is lithium cobalt oxide ($LiCoO_2$) to which halogen and magnesium are not added in a manufacturing method described later. As described in Non-Patent Document 1, Non-Patent Document 2, and the like, the crystal structure of lithium cobalt oxide shown in FIG. 5 changes depending on the charge depth.

As illustrated in FIG. 5, lithium cobalt oxide with a charge depth of 0 (the discharged state) includes a region having the crystal structure of the space group R-3m, and includes three $CoO_2$ layers in a unit cell. Thus, this crystal structure is referred to as an O3-type crystal structure in some cases. Note that the $CoO_2$ layer has a structure in which octahedral geometry with oxygen atoms hexacoordinated to cobalt continues on a plane in the edge-sharing state.

Furthermore, when the charge depth is 1, $LiCoO_2$ has the crystal structure of the space group P-3m1, and one $CoO_2$ layer exists in a unit cell. Thus, this crystal structure is referred to as an O1-type crystal structure in some cases.

Moreover, lithium cobalt oxide when the charge depth is approximately 0.88 has the crystal structure of the space group R-3m. This structure can also be regarded as a structure in which $CoO_2$ structures such as P-3m1(O1) and $LiCoO_2$ structures such as R-3m (O3) are alternately stacked. Thus, this crystal structure is referred to as an H1-3 type crystal structure in some cases. Note that the number of cobalt atoms per unit cell in the actual H1-3 type crystal structure is twice as large as that of cobalt atoms per unit cell in other structures. However, in this specification including FIG. 5, the c-axis of the H1-3 type crystal structure is described half that of the unit cell for easy comparison with the other structures.

For the H1-3 type crystal structure, as disclosed in Non-Patent Document 3, the coordinates of cobalt and oxygen in the unit cell can be expressed as follows, for example: Co (0, 0, 0.42150±0.00016), $O_1$ (0, 0, 0.27671±0.00045), and $O_2$ (0, 0, 0.11535±0.00045). Note that $O_1$ and $O_2$ are each an oxygen atom. In this manner, the H1-3 type crystal structure is represented by a unit cell including one cobalt and two oxygen. Meanwhile, the pseudo-spinel crystal structure of one embodiment of the present invention is preferably represented by a unit cell including one cobalt and one oxygen, as described later. This means that the symmetry of cobalt and oxygen differs between the pseudo-spinel structure and the H1-3 type structure, and the amount of change from the O3 structure is smaller in the pseudo-spinel structure than in the H1-3 type structure. A preferred unit cell for representing a crystal structure in a positive electrode active material is selected such that the value of GOF (good of fitness) is smaller in Rietveld analysis of XRD patterns, for example.

When charge with a high voltage of 4.6 V or higher based on the redox potential of a lithium metal or charge with a large charge depth of 0.8 or more and discharge are repeated, the crystal structure of lithium cobalt oxide changes (i.e., an unbalanced phase change occurs) repeatedly between the H1-3 type crystal structure and the R-3m (O3) structure in a discharged state.

However, there is a large deviation in the position of the $CoO_2$ layer between these two crystal structures. As indicated by the dotted line and the arrow in FIG. 5, the $CoO_2$ layer in the H1-3 type crystal structure largely deviates from that in R-3m (O3). Such a dynamic structural change might adversely affect the stability of the crystal structure.

A difference in volume is also large. A difference in volume in comparison with the same number of cobalt atoms between the H1-3 type crystal structure and the O3-type crystal structure in the discharged state is 3.0% or more.

In addition, a structure in which $CoO_2$ layers are continuous, such as P-3m1 (O1), included in the H1-3 type crystal structure is highly likely to be unstable.

Thus, the repeated high-voltage charge and discharge break the crystal structure of lithium cobalt oxide. The break of the crystal structure degrades the cycle performance. This is probably because the break of the crystal structure reduces sites where lithium can stably exist and makes it difficult to insert and extract lithium.

In the positive electrode active material of one embodiment of the present invention, the difference in the positions of CoO$_2$ layers can be small in repeated charge and discharge at high voltage. Furthermore, the change in the volume can be small. Accordingly, the positive electrode active material of one embodiment of the present invention can achieve excellent cycle performance. In addition, the positive electrode active material of one embodiment of the present invention can have a stable crystal structure in a high-voltage charged state. Thus, in the positive electrode active material of one embodiment of the present invention, a short circuit is less likely to occur while the high-voltage charged state is maintained. This is preferable because the safety is further improved.

In the positive electrode active material of one embodiment of the present invention, there is a small difference in change in the crystal structure and volume in comparison with the same number of transition metal atoms between the sufficiently discharged state and the high-voltage charged state.

FIG. 4 shows examples of the crystal structures of the positive electrode active material 100 before and after being charged and discharged.

The crystal structure with a charge depth of 0 (the discharged state) in FIG. 4 is R-3m (O3), which is the same as that in FIG. 5. Meanwhile, the positive electrode active material 100 with a charge depth in a sufficiently charged state includes a crystal whose structure is different from the H1-3 type crystal structure. This structure belongs to the space group R-3m, and is not a spinel crystal structure but a structure in which an ion of cobalt, magnesium, or the like is coordinated to six oxygen atoms and the cation arrangement has symmetry similar to that of the spinel crystal structure. This structure is thus referred to as the pseudo-spinel crystal structure in this specification and the like. Note that although the indication of lithium is omitted in the diagram of the pseudo-spinel crystal structure shown in FIG. 4 to explain the symmetry of cobalt atoms and the symmetry of oxygen atoms, a lithium of 20 atomic % or less, for example, with respect to cobalt practically exists between the CoO$_2$ layers. In addition, in both the O3-type crystal structure and the pseudo-spinel crystal structure, a slight amount of magnesium preferably exists between the CoO$_2$ layers, i.e., in lithium sites. In addition, a slight amount of halogen such as fluorine preferably exists in oxygen sites at random.

Note that in the pseudo-spinel crystal structure, oxygen is tetracoordinated to a light element such as lithium in some cases. Also in that case, the ion arrangement has symmetry similar to that of the spinel crystal structure.

The pseudo-spinel crystal structure can also be regarded as a crystal structure that contains Li between layers at random but is similar to a CdCl$_2$ type crystal structure. The crystal structure similar to the CdCl$_2$ type crystal structure is close to a crystal structure of lithium nickel oxide when charged up to a charge depth of 0.94 (Li$_{0.06}$NiO$_2$); however, pure lithium cobalt oxide or a layered rock-salt positive electrode active material containing a large amount of cobalt is known not to have this crystal structure generally.

Anions of a layered rock-salt crystal and anions of a rock-salt crystal have cubic closest packed structures (face-centered cubic lattice structures). Anions of a pseudo-spinel crystal are also presumed to have cubic closest packed structures. When the pseudo-spinel crystal is in contact with the layered rock-salt crystal and the rock-salt crystal, there is a crystal plane at which orientations of cubic closest packed structures composed of anions are aligned. Note that a space group of the layered rock-salt crystal and the pseudo-spinel crystal is R-3m, which is different from a space group Fm-3m of a rock-salt crystal (a space group of a general rock-salt crystal) and a space group Fd-3m of a rock-salt crystal (a space group of a rock-salt crystal having the simplest symmetry); thus, the Miller index of the crystal plane satisfying the above conditions in the layered rock-salt crystal and the pseudo-spinel crystal is different from that in the rock-salt crystal. In this specification, a state where the orientations of the cubic closest packed structures composed of anions in the layered rock-salt crystal, the pseudo-spinel crystal, and the rock-salt crystal are aligned is referred to as a state where crystal orientations are substantially aligned in some cases.

In the positive electrode active material 100, a change in the crystal structure when high-voltage charge is performed and a large amount of lithium is released is inhibited as compared with a conventional positive electrode active material. As indicated by the dotted lines in FIG. 4, for example, there is a very little deviation in the CoO$_2$ layers between the crystal structures.

More specifically, the structure of the positive electrode active material 100 is highly stable even when charging voltage is high. For example, at charging voltage that makes the conventional positive electrode active material illustrated in FIG. 5 have the H1-3 type crystal structure, for example, at a voltage of approximately 4.6 V with reference to the potential of lithium metal, the positive electrode active material 100 has the R-3m (O3) crystal structure. Moreover, in a higher charging voltage region, for example, at voltages of approximately 4.65 V to 4.7 V with reference to the potential of lithium metal, the pseudo-spinel crystal structure can be obtained. At a much higher charging voltage, the H1-3 type crystal is eventually observed in some cases. In the case where graphite, for instance, is used as a negative electrode active material in a secondary battery, when the voltage of the secondary battery ranges from 4.3 V to 4.5 V, for example, the R-3m (O3) crystal structure can be maintained. In a higher charging voltage region, for example, at voltages of 4.35 V to 4.55 V with reference to the potential of lithium metal, the pseudo-spinel crystal structure can be obtained.

Thus, in the positive electrode active material 100, the crystal structure is less likely to be disordered even when charge and discharge are repeated at high voltage.

Note that in the unit cell of the pseudo-spinel crystal structure, coordinates of cobalt and oxygen can be represented by Co (0, 0, 0.5) and O (0, 0, x) within the range of $0.20 \leq x \leq 0.25$.

A slight amount of magnesium existing between the CoO$_2$ layers, i.e., in lithium sites at random, has an effect of inhibiting a deviation in the CoO$_2$ layers. Thus, the existence of magnesium between the CoO$_2$ layers makes it easier to obtain the pseudo-spinel crystal structure. Therefore, magnesium is preferably distributed over the entire particle of the positive electrode active material 100. In addition, to distribute magnesium over the entire particle, heat treatment is preferably performed in the formation process of the positive electrode active material 100.

However, cation mixing occurs when the heat treatment temperature is excessively high, so that magnesium is highly likely to enter the cobalt sites. Magnesium in the cobalt sites eliminates the effect of maintaining the R-3m structure. Furthermore, when the heat treatment temperature is excessively high, adverse effects such as reduction of cobalt to have a valence of two and transpiration of lithium are concerned.

In view of the above, a halogen compound such as a fluorine compound is preferably added to lithium cobalt oxide before the heat treatment for distributing magnesium over the entire particle. The addition of the halogen compound decreases the melting point of lithium cobalt oxide. The decrease in the melting point makes it easier to distribute magnesium over the entire particle at a temperature at which the cation mixing is unlikely to occur. Furthermore, the existence of the fluorine compound expects to improve corrosion resistance to hydrofluoric acid generated by decomposition of an electrolyte solution.

When the magnesium concentration is higher than a predetermined value, the effect of stabilizing a crystal structure becomes small in some cases. This is probably because magnesium enters the cobalt sites in addition to the lithium sites.

<Charge Method>

High-voltage charge for determining whether or not a composite oxide is the positive electrode active material 100 of one embodiment of the present invention can be performed on a coin cell (CR2032 type with a diameter of 20 mm and a height of 3.2 mm) with a lithium counter electrode, for example.

More specifically, a positive electrode current collector made of aluminum foil that is coated with slurry in which a positive electrode active material, a conductive additive, and a binder are mixed can be used as a positive electrode.

A lithium metal can be used for the counter electrode. Note that when a material other than the lithium metal is used for the counter electrode, the potential of a secondary battery differs from the potential of the positive electrode. Unless otherwise specified, voltages and potentials in this specification and the like refer to the potentials of a positive electrode.

As an electrolyte contained in an electrolyte solution, 1 mol/L lithium hexafluorophosphate ($LiPF_6$) can be used. As the electrolyte solution, a solution in which ethylene carbonate (EC) and diethyl carbonate (DEC) at EC:DEC=3:7 (volume ratio) and vinylene carbonate (VC) at 2 wt % are mixed can be used.

As a separator, 25-μm-thick polypropylene can be used.

A positive electrode can and a negative electrode can that are formed using stainless steel (SUS) can be used as a positive electrode can and a negative electrode can.

The coin cell formed under the above conditions is charged with constant current at 4.6 V and 0.5 C and then charged with constant voltage until the current value reaches 0.01 C. Note that here, 1 C is set to 137 mA/g. The temperature is set to 25° C. After the charge is performed in this manner, the coin cell is disassembled in a glove box with an argon atmosphere and the positive electrode is taken out, whereby the high-voltage charged positive electrode active material can be obtained. In order to inhibit reaction with components in the external world, the positive electrode active material is preferably hermetically sealed in an argon atmosphere when performing various analyses later. For example, XRD can be performed on the positive electrode active material enclosed in an airtight container with an argon atmosphere.

<XRD>

Figure 6:
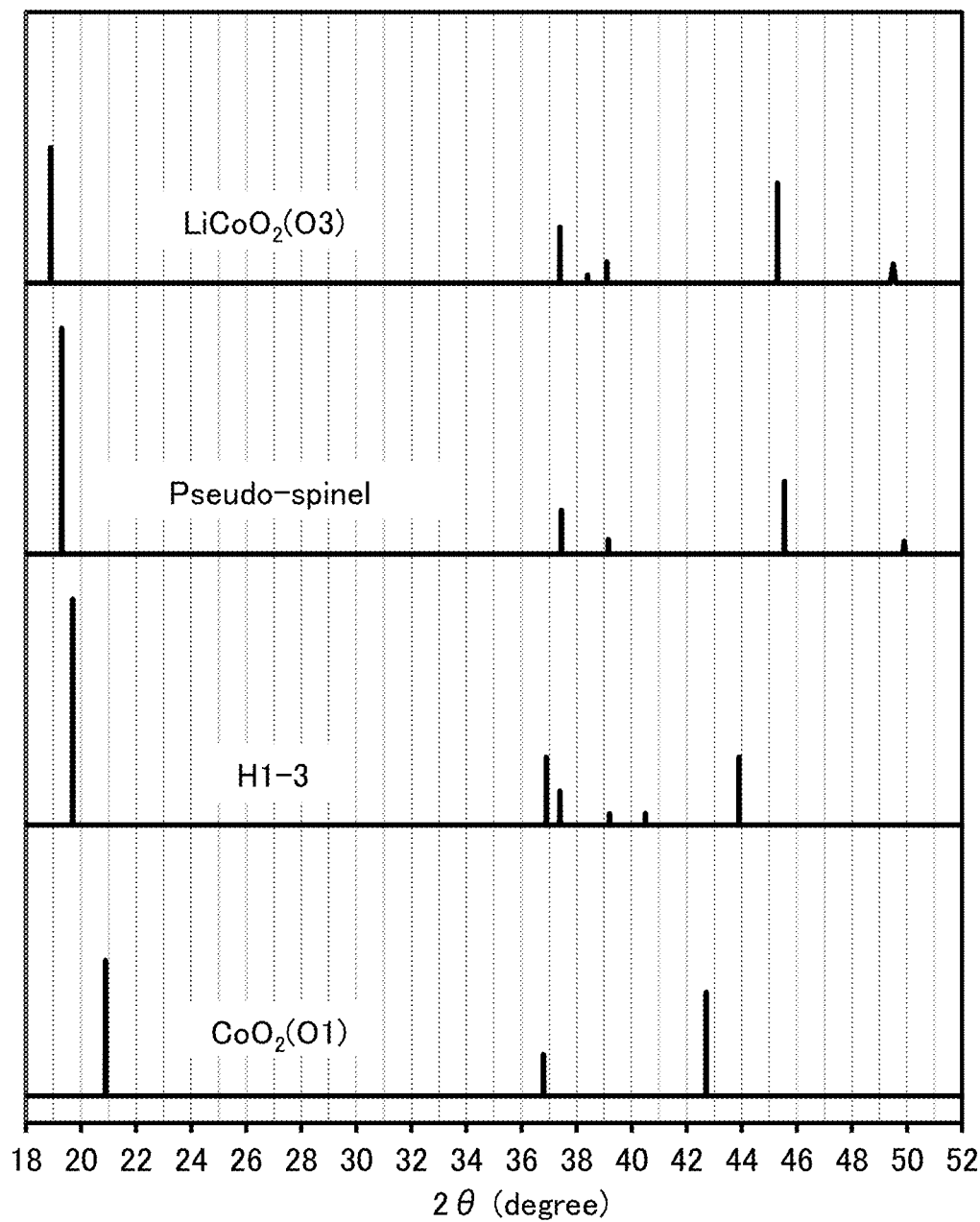
FIG. 6 shows an XRD pattern calculated from crystal structures.

FIG. 6 shows ideal powder XRD patterns with the CuKα1 ray that were calculated from models of the pseudo-spinel crystal structure and the H1-3 type crystal structure. In addition, for comparison, ideal XRD patterns calculated from the crystal structures of $LiCoO_2$ (O3) with a charge depth of 0 and $CoO_2$ (O1) with a charge depth of 1 are also shown. Note that the patterns of $LiCoO_2$ (O3) and $CoO_2$ (O1) are made from crystal structure data obtained from ICSD (Inorganic Crystal Structure Database) (see Non-Patent Document 5) using Reflex Powder Diffraction, which is a module of Materials Studio (BIOVIA). The range of 2θ is from 15° to 75°, Step size is 0.01, the wavelength λ1 is $1.540562 \times 10^{-10}$ m, λ2 is not set, and Monochromator is a single monochromator. The pattern of the H1-3 type crystal structure is made from the crystal structure data disclosed in Non-Patent Document 3 in a similar manner. The pattern of the pseudo-spinel crystal structure is estimated from the XRD pattern of the positive electrode active material of one embodiment of the present invention, the crystal structure is fitted with TOPAS ver. 3 (crystal structure analysis software manufactured by Bruker Corporation), and XRD patterns are made in a manner similar to those of other structures.

As shown in FIG. 6, the pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, sharp diffraction peaks appear at 2θ of 19.30±0.10° (greater than or equal to 19.20° and less than or equal to 19.40°) and 2θ of 45.55±0.05° (greater than or equal to 45.50° and less than or equal to 45.60°). However, in the H1-3 type crystal structure and $CoO_2$ (P-3m1, O1), peaks at these positions do not appear. Thus, the peaks at 2θ of 19.30±0.20° and 2θ of 45.55±0.10° in the high-voltage charged state can be the features of the positive electrode active material 100 of one embodiment of the present invention.

It can also be said that the positions where the XRD diffraction peaks appear are close in the crystal structure with a charge depth of 0 and the crystal structure in the high-voltage charged state. More specifically, a difference in the positions of two or more, further preferably three or more of the main diffraction peaks between both of the crystal structures is 2θ of less than or equal to 0.7, further preferably 2θ of less than or equal to 0.5.

Note that although the positive electrode active material 100 of one embodiment of the present invention has the pseudo-spinel crystal structure when being charged with high voltage, not all the particles necessarily have the pseudo-spinel crystal structure. The particles may have another crystal structure, or some of the particles may be amorphous. Note that when the XRD patterns are analyzed by the Rietveld analysis, the pseudo-spinel crystal structure preferably accounts for more than or equal to 50 wt %, further preferably more than or equal to 60 wt %, still further preferably more than or equal to 66 wt % of the positive electrode active material. The positive electrode active material in which the pseudo-spinel crystal structure accounts for more than or equal to 50 wt %, further preferably more than or equal to 60 wt %, still further preferably more than or equal to 66 wt % can have sufficiently good cycle performance.

Furthermore, even after 100 or more cycles of charge and discharge, the pseudo-spinel crystal structure preferably accounts for more than or equal to 35 wt %, further preferably more than or equal to 40 wt %, still further preferably more than or equal to 43 wt % when the Rietveld analysis is performed.

In addition, the crystallite size of the pseudo-spinel crystal structure included in the positive electrode active material particle is decreased to approximately one-tenth that of $LiCoO_2$ (O3) in the discharged state. Thus, a clear peak of the pseudo-spinel crystal structure can be observed after the high-voltage charge even under the same XRD measurement conditions as those of a positive electrode before the charge and discharge. By contrast, simple $LiCoO_2$ has a small crystallite size and a broad small peak even when it can have a structure part of which is similar to the pseudo-spinel crystal structure. The crystallite size can be calculated from the half width of the XRD peak.

<DQ/DVvsV Curve>

Moreover, when the positive electrode active material of one embodiment of the present invention is discharged at a low rate of, for example, 0.2 C or less after high-voltage charge, a characteristic change in voltage appears just before the end of discharge, in some cases. This change can be clearly observed by the fact that at least one peak appears within the range of 3.5 V to 3.9 V in a dQ/dVvsV curve calculated from a discharge curve.

[First Principles Calculation]

Next, how the stability or the like of the crystal structure of the positive electrode active material of one embodiment of the present invention is changed by addition of magnesium was estimated by the first principles calculation.

In each of the O3-type crystal structure and the H1-3 type crystal structure, a change in energy when lithium is released was calculated by the first principles calculation. Calculation was performed also in the case where magnesium is substituted for 2% of lithium at a lithium site in each of the crystal structures.

A lattice and an atomic position were optimized using the first principles calculation to calculate energy. As software, VASP (The Vienna Ab initio simulation package) was used. As a functional, LDA (Local density approximation)+U was used. The U potential of cobalt was set to 4.91. As pseudo-potential of electronic states, potential generated by a PAW (Projector Augmented Wave) method was used. The cut-off energy was set to 600 eV. Note that k-point sampling was conducted using a 1×1×1 mesh. Here, for the U potential, Non-Patent Document 6 and Non-Patent Document 7 can be referred to.

The number of atoms used for the calculation is as follows: in the case where magnesium is not added, the number of lithium atoms is (48-x), the number of cobalt atoms is 48, and the number of oxygen atoms is 96; and in the case where magnesium is added, the number of lithium atoms is (47-x), the number of magnesium atoms is 1, the number of cobalt atoms is 48, and the number of oxygen atoms is 96. Note that x is the number of released lithium atoms.

In this specification and the like, energy calculated in such a manner is referred to as stabilization energy in some cases.

The energy difference ΔE between a crystal structure model in which one magnesium atom is substituted at a lithium site and a crystal structure model obtained by releasing x lithium atoms from the former crystal structure model can be calculated by Formula 1 below.

[Formula 1]

$$\Delta E = [\{E_{total}(Li_{47-x}Mg_1Co_{48}O_{96}) + x \times E_{atom}(Li)\} - E_{total}(Li_{47}Mg_1Co_{48}O_{96})]/48 \quad \text{(Formula 1)}$$

Here, $E_{total}(Li_{47}Mg_1Co_{48}O_{96})$ represents the energy of the structure in which Mg is substituted for one lithium atom of $Li_{48}Co_{48}O_{96}$, $E_{total}(Li_{47-x}Mg_1Co_{48}O_{96})$ represents the energy of the structure in which Mg is substituted for one lithium atom of $Li_{48}Co_{48}O_{96}$ and x lithium atoms are released, $E_{atom}(Li)$ represents the energy of one lithium atom, $E_{atom}(Co)$ represents the energy of one cobalt atom, and $E_{atom}(Mg)$ represents the energy of one magnesium atom. In addition, Formula 1 above represents the crystal structure model in which a magnesium atom is substituted for one lithium atom, and a similar calculation was performed on a model in which a magnesium atom is not substituted for a lithium atom.

Figure 7A:
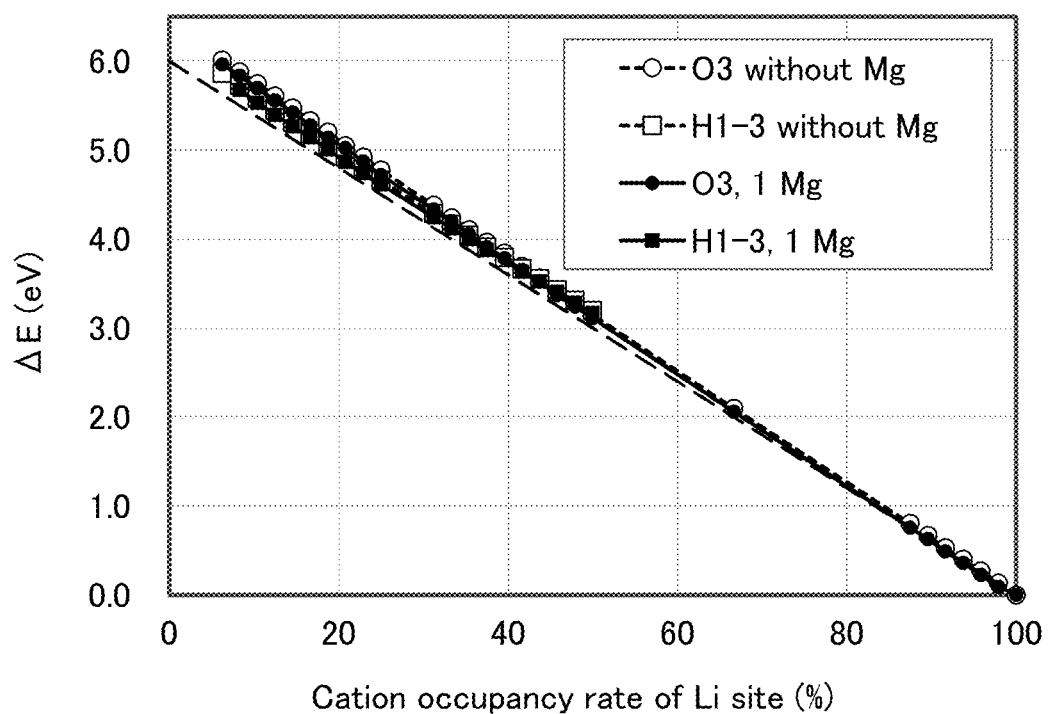
FIG. 7A and FIG. 7B show calculation results of the relation between the occupancy rate of a lithium site and energy.
Figure 7B:
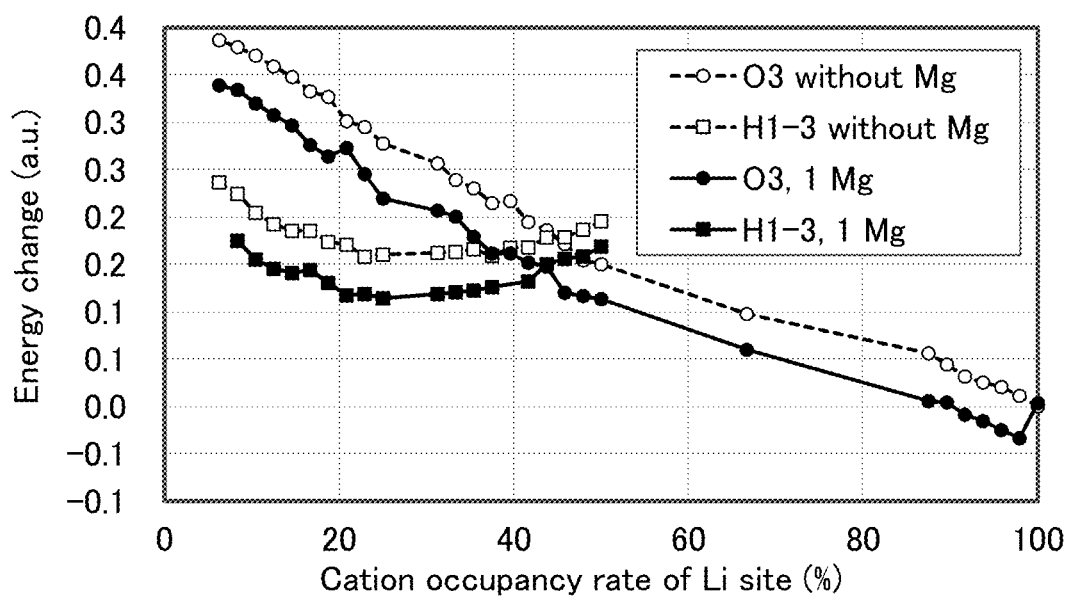
Figure 8:
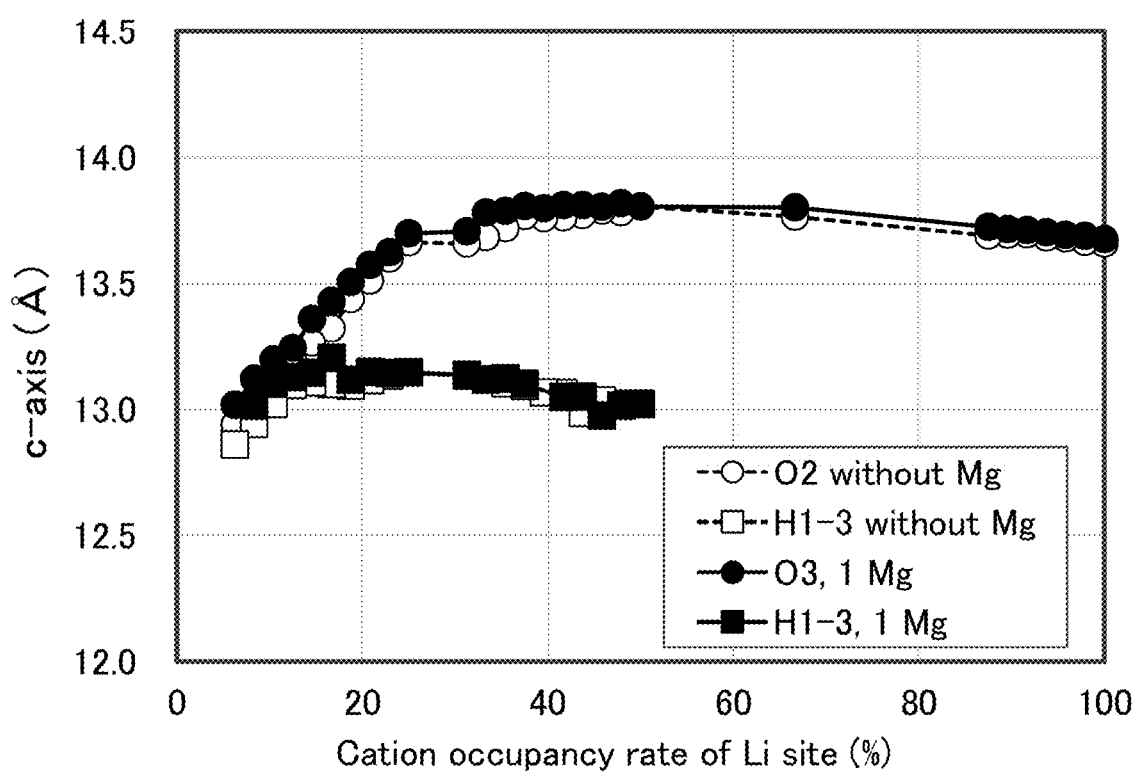
FIG. 8 shows calculation results of the relation between the occupancy rate of a lithium site and a c-axis.

FIG. 7 and FIG. 8 show calculation results.

In FIG. 7A, the horizontal axis represents the occupancy rate of the lithium site and the vertical axis represents the energy difference ΔE. FIG. 7B is a diagram in which differences between the straight line, which is indicated by a chain line in FIG. 7A and represents that the energy difference ΔE is 6 eV when the occupancy rate of the lithium site is 0%, and the calculation results are plotted with the vertical axis. Lithium in the positive electrode active material is released by charging a secondary battery. Thus, by calculating the energy for the decrease in the occupancy rate of the lithium site, the state where lithium is released by charge can be considered.

As shown in FIG. 7A and FIG. 7B, the energy difference ΔE increases as the occupancy rate of the lithium site decreases, resulting in an unstable crystal structure. Moreover, as can be seen from FIG. 7B, the energies of the O3-type crystal structure and the H1-3 type crystal structure intersect with each other, which suggests that a phase change occurs at the intersection. In the structure in which substitution of one magnesium atom is performed, the occupancy rate of the lithium site where the intersection of the O3-type crystal structure and the H1-3 type crystal structure is observed is lower than that in the structure in which substitution of magnesium is not performed. That is, it is suggested that a larger amount of lithium can be released without a phase change.

According to the calculation results shown in FIG. 7A and FIG. 7B, it can be said that addition of magnesium allows stable charge of the positive electrode active material at a high charging voltage.

In FIG. 8, the horizontal axis represents the occupancy rate of the lithium site and the vertical axis represents the lattice constant of a c-axis. The lattice constant of the c-axis increased as the occupancy rate of the lithium site decreased, and then decreased.

Figure 9:
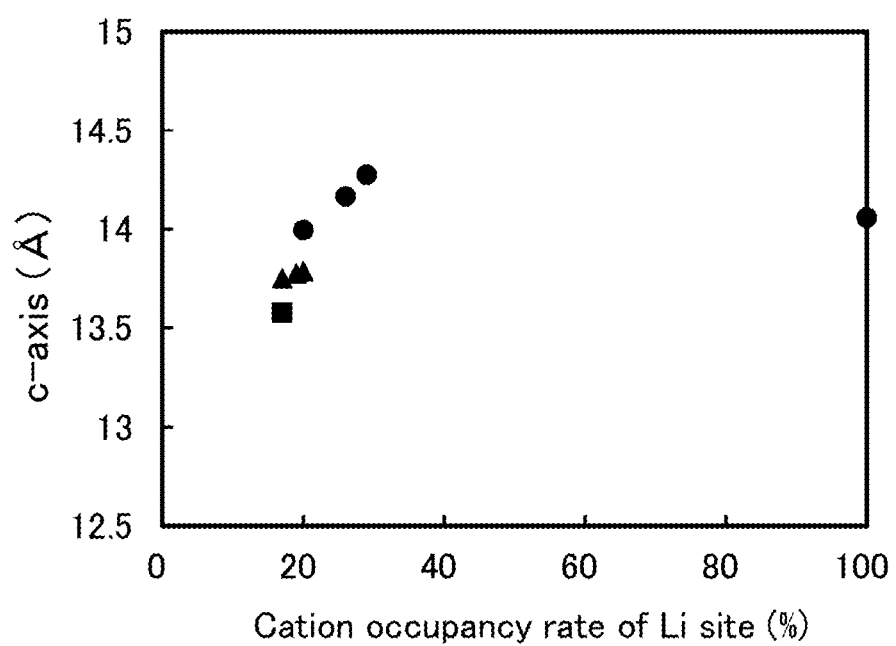
FIG. 9 is a diagram showing the relation between the occupancy rate of a lithium site and a c-axis.

FIG. 9 shows the relation between the value of the c-axis calculated from the measured value obtained by XRD and the occupancy rate of the lithium site in the positive electrode active material of one embodiment of the present invention. Here, the theoretical capacity of lithium cobalt oxide was set to 274 mAh/g. As shown in FIG. 9, the calculation results match the phenomenon.

This embodiment can be implemented in appropriate combination with the other embodiments.

Embodiment 2

In this embodiment, a method for manufacturing a positive electrode active material of one embodiment of the present invention is described.

[Manufacturing Method Example of Positive Electrode Active Material]

Next, an example of a manufacturing method of the positive electrode active material of one embodiment of the present invention is described with reference to FIG. 10.

<Step S11>

First, as Step S11, a halogen source such as a fluorine source or a chlorine source and a magnesium source, which are materials of a mixture 902, are prepared. In addition to those, a lithium source may be prepared.

As the fluorine source, for example, lithium fluoride, magnesium fluoride, or the like can be used. Among them, lithium fluoride, which has a relatively low melting point of 848° C., is preferable because it is easily melted in an annealing process described later. As the chlorine source, for example, lithium chloride, magnesium chloride, or the like can be used. As the magnesium source, for example, magnesium fluoride, magnesium oxide, magnesium hydroxide, magnesium carbonate, or the like can be used. As the lithium source, for example, lithium fluoride, lithium carbonate, or the like can be used. That is, lithium fluoride can be used as both the lithium source and the fluorine source. In addition, magnesium fluoride can be used as both the fluorine source and the magnesium source.

In this embodiment, lithium fluoride LiF is prepared as the fluorine source, and magnesium fluoride $MgF_2$ is prepared as the fluorine source and the magnesium source. When lithium fluoride LiF and magnesium fluoride $MgF_2$ are mixed at a molar ratio of approximately $LiF:MgF_2$=65:35, the effect of reducing the melting point becomes the highest (Non-Patent Document 4). On the other hand, when the amount of lithium fluoride increases, cycle performance might deteriorate because of a too large amount of lithium. Therefore, the molar ratio of lithium fluoride LiF to magnesium fluoride $MgF_2$ is preferably $LiF:MgF_2$=x:1 ($0 \leq x \leq 1.9$), further preferably $LiF:MgF_2$=x:1 ($0.1 \leq x \leq 0.5$), still further preferably $LiF:MgF_2$=x:1 (x=the vicinity of 0.33). Note that in this specification and the like, the vicinity means a value greater than 0.9 times and smaller than 1.1 times a certain value.

In addition, in the case where the following mixing and grinding steps are performed by a wet process, a solvent is prepared. As the solvent, ketone such as acetone; alcohol such as ethanol or isopropanol; ether; dioxane; acetonitrile; N-methyl-2-pyrrolidone (NMP); or the like can be used. An aprotic solvent that hardly reacts with lithium is further preferably used. In this embodiment, acetone is used.

<Step S12>

Next, as Step S12, the materials of the mixture 902 are mixed and ground. Although the mixing can be performed by a dry process or a wet process, the wet process is preferable because the materials can be ground to the smaller size. For example, a ball mill, a bead mill, or the like can be used for the mixing. When the ball mill is used, a zirconia ball is preferably used as media, for example. The mixing step and the grinding step are preferably performed sufficiently to pulverize the mixture 902.

<Step S13>

Next, in Step S13, the materials mixed and ground in the above manner are collected, whereby the mixture 902 is obtained.

For example, the mixture 902 preferably has an average particle diameter (D50) of greater than or equal to 600 nm and less than or equal to 20 μm, further preferably greater than or equal to 1 μm and less than or equal to 10 μm. When mixed with a composite oxide containing lithium, a transition metal, and oxygen in the later step, the mixture 902 pulverized to such a small size is easily attached to surfaces of composite oxide particles uniformly. The mixture 902 is preferably attached to the surfaces of the composite oxide particles uniformly because both halogen and magnesium are easily distributed to the surface portion of the composite oxide particles after heating. When there is a region containing neither halogen nor magnesium in the surface portion, the positive electrode active material might be less likely to have the above-described pseudo-spinel crystal structure in the charged state.

Next, the composite oxide containing the metal A, the metal M, and oxygen is obtained through Step S21 to Step S24.

<Step S21>

First, as Step S21, a metal A source and a metal M source are prepared as materials of the composite oxide containing the metal A, the metal M, and oxygen.

An example of using lithium as the metal A is described. As the lithium source, for example, lithium carbonate, lithium fluoride, or the like can be used.

As the metal M, at least one of cobalt, manganese, and nickel can be used, for example.

In the case where the positive electrode active material has a layered rock-salt crystal structure, as the ratio of the materials, the mixture ratio of cobalt, manganese, and nickel with which the positive electrode active material can have a layered rock-salt crystal structure is used. In addition, aluminum may be added to the transition metal as long as the positive electrode active material can have the layered rock-salt crystal structure.

As the metal M source, oxide or hydroxide of the metal described as an example of the metal M, or the like can be used. As a cobalt source, for example, cobalt oxide, cobalt hydroxide, or the like can be used. As a manganese source, manganese oxide, manganese hydroxide, or the like can be used. As a nickel source, nickel oxide, nickel hydroxide, or the like can be used. As an aluminum source, aluminum oxide, aluminum hydroxide, or the like can be used.

<Step S22>

Next, as Step S22, the metal A source and the metal M source are mixed. The mixing can be performed by a dry process or a wet process. For example, a ball mill, a bead mill, or the like can be used for the mixing. When the ball mill is used, a zirconia ball is preferably used as media, for example.

<Step S23>

Next, as Step S23, the materials mixed in the above manner are heated. This step is sometimes referred to as baking or first heating to distinguish this step from a heating step performed later. The heating is preferably performed at higher than or equal to 800° C. and lower than 1100° C., further preferably at higher than or equal to 900° C. and lower than or equal to 1000° C., still further preferably at approximately 950° C. Excessively low temperature might result in insufficient decomposition and melting of starting materials. By contrast, excessively high temperature might cause a defect due to excessive reduction of the metal that is used as the metal M and causes an oxidation-reduction reaction, transpiration of the metal A, or the like. The use of cobalt as the metal M, for example, may lead to a defect in which cobalt has a valence of two.

The heating time is preferably longer than or equal to 2 hours and shorter than or equal to 20 hours. Baking is preferably performed in an atmosphere with few moisture, such as dry air (e.g., a dew point is lower than or equal to −50° C., further preferably lower than or equal to −100° C.). For example, it is preferable that the heating be performed at 1000° C. for 10 hours, the temperature rise be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling to room temperature in Step S23 is not essential. As long as later steps of Step S24 and Step S31 to Step S33 are performed without problems, the cooling may be performed at a temperature higher than room temperature.

Note that the metals contained in the positive electrode active material may be introduced in Step S22 and Step S23 described above, and some of the metals can be introduced in Step S41 to Step S44 described later. More specifically, a metal M1 (M1 is one or more elements selected from cobalt, manganese, nickel, and aluminum) is introduced in Step S22 and Step S23, and a metal M2 (M2 is one or more elements selected from manganese, nickel, and aluminum, for example) is introduced in Step S41 to Step S44. When the step of introducing the metal M1 and the step of introducing the metal M2 are separately performed in such a manner, the profiles in the depth direction of the metals can be made different from each other in some cases. For example, the concentration of the metal M2 in the surface portion of a particle can be higher than that in the inner portion of the particle. Furthermore, with the number of atoms of the metal M1 as a reference, the ratio of the number of atoms of the metal M2 with respect to the reference can be higher in the surface portion than in the inner portion.

For the positive electrode active material of one embodiment of the present invention, cobalt is preferably selected as the metal M1 and nickel and aluminum are preferably selected as the metal M2.

<Step S24>

Next, as Step S24, the materials baked in the above manner are collected, whereby the composite oxide containing the metal A, the metal M, and oxygen is obtained. Specifically, lithium cobalt oxide, lithium manganese oxide, lithium nickel oxide, lithium cobalt oxide in which manganese is substituted for part of cobalt, lithium nickel-manganese-cobalt oxide, or the like is obtained.

Alternatively, a composite oxide containing the metal A, the metal M, and oxygen that is synthesized in advance may be used as Step S24. In this case, Step S21 to Step S23 can be omitted.

For example, as a composite oxide synthesized in advance, a lithium cobalt oxide particle (product name. CELLSEED C-10N) manufactured by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy method (GD-MS), the magnesium concentration and the fluorine concentration are less than or equal to 50 ppm wt, the calcium concentration, the aluminum concentration, and the silicon concentration are less than or equal to 100 ppm wt, the nickel concentration is less than or equal to 150 ppm wt, the sulfur concentration is less than or equal to 500 ppm wt, the arsenic concentration is less than or equal to 1100 ppm wt, and the concentrations of elements other than lithium, cobalt, and oxygen are less than or equal to 150 ppm wt.

Alternatively, a lithium cobalt oxide particle (product name: CELLSEED C-5H) manufactured by NIPPON CHEMICAL INDUSTRIAL CO., LTD. can be used. This is lithium cobalt oxide in which the average particle diameter (D50) is approximately 6.5 μm, and the concentrations of elements other than lithium, cobalt, and oxygen are approximately equal to or less than those of C-10N in the impurity analysis by GD-MS.

In this embodiment, cobalt is used as the metal M, and the lithium cobalt oxide particle synthesized in advance (CELLSEED C-10N manufactured by NIPPON CHEMICAL INDUSTRIAL CO., LTD.) is used.

<Step S31>

Next, as Step S31, the mixture 902 and the composite oxide obtained in Step S24 are mixed. The ratio of the number TM of transition metal atoms in the composite oxide containing lithium, the transition metal, and oxygen to the number $Mg_{Mix1}$ of magnesium atoms contained in the mixture 902 is preferably TM:$Mg_{Mix1}$=1:y (0.001≤y≤0.06), further preferably TM:$Mg_{Mix1}$=1:y (0.003≤y≤0.03).

The condition of the mixing in Step S31 is preferably milder than that of the mixing in Step S12 not to damage the particles of the composite oxide. For example, a condition with a lower rotation frequency or shorter time than the mixing in Step S12 is preferable. In addition, it can be said that the dry process has a milder condition than the wet process. For example, a ball mill, a bead mill, or the like can be used for the mixing. When the ball mill is used, a zirconia ball is preferably used as media, for example.

<Step S32>

Next, as Step S32, the materials mixed in the above manner are collected, whereby the mixture 903 is obtained.

Note that this embodiment describes a method for adding the mixture of lithium fluoride and magnesium fluoride to lithium cobalt oxide with few impurities; however, one embodiment of the present invention is not limited thereto. A mixture obtained through baking after addition of a magnesium source and a fluorine source to the starting material of lithium cobalt oxide may be used instead of the mixture 903 in Step S33. In that case, there is no need to separate steps Step S11 to Step [S14] S13 and steps Step S21 to Step S24, which is simple and productive.

Alternatively, lithium cobalt oxide to which magnesium and fluorine are added in advance may be used. When lithium cobalt oxide to which magnesium and fluorine are added is used, the process can be simpler because the steps up to Step S32 can be omitted.

In addition, a magnesium source and a fluorine source may be further added to the lithium cobalt oxide to which magnesium and fluorine are added in advance.

<Step S33>

Next, as Step S33, the mixture 903 is heated. This step is referred to as annealing or second heating in some cases to distinguish this step from the heating step performed before.

The annealing is preferably performed at an appropriate temperature for an appropriate time. The appropriate temperature and time depend on the conditions such as the particle size and the composition of the composite oxide containing lithium, the transition metal, and oxygen in Step S24. In the case where the particle size is small, the annealing is preferably performed at a lower temperature or for a shorter time than the case where the particle size is large, in some cases.

When the average particle diameter (D50) of the particles in Step S24 is approximately 12 μm, for example, the annealing temperature is preferably higher than or equal to 600° C. and lower than or equal to 950° C., for example. The annealing time is preferably longer than or equal to 3 hours, further preferably longer than or equal to 10 hours, still further preferably longer than or equal to 60 hours, for example.

On the other hand, when the average particle diameter (D50) of the particles in Step S24 is approximately 5 μm, the annealing temperature is preferably higher than or equal to 600° C. and lower than or equal to 950° C., for example. The annealing time is preferably longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

When the annealing temperature is too high in Step S33, the particles might be sintered.

It is considered that when the mixture 903 is annealed, a material having a low melting point (e.g., lithium fluoride, which has a melting point of 848° C.) in the mixture 902 is melted first and distributed to the surface portion of the composite oxide particle. Next, the existence of the melted material decreases the melting points of other materials, presumably resulting in melting of the other materials. For example, magnesium fluoride (melting point: 1263° C.) is presumably melted and distributed to the surface portion of the composite oxide particle.

Then, the elements that are included in the mixture 902 and are distributed to the surface portion probably form a solid solution in the composite oxide containing lithium, the transition metal, and oxygen.

The elements included in the mixture 902 are diffused faster in the surface portion and the vicinity of the grain boundary than inside the composite oxide particles. Therefore, the concentrations of magnesium and halogen in the surface portion and the vicinity of the grain boundary are higher than those of magnesium and halogen inside the composite oxide particles. As described later, the higher the magnesium concentration in the surface portion and the vicinity of the grain boundary is, the more effectively the change in the crystal structure can be suppressed.

<Step S34>

Next, as Step S34, the material annealed in the above manner is collected, whereby a second composite oxide is obtained.

Then, further treatment may be performed on the composite oxide obtained in Step S34. Here, treatment for adding the metal M2 is performed. The treatment is preferably performed after Step S24 because the concentration of the metal M2 can be higher in the particle surface portion than in the inner portion of the positive electrode active material concentration in some cases.

The addition of the metal M2 may be performed by mixing a material containing the metal M2 with the mixture 902 and the like in Step S31, for example. This case is preferable because the number of steps can be reduced and the steps can be simplified.

Alternatively, as described later, the step of adding the metal M2 may be performed after Step S31 to Step S33. In that case, for example, a compound of magnesium and the metal M2 can be inhibited from being formed in some cases.

The metal M2 is added in the positive electrode active material of one embodiment of the present invention through Step S41 to Step S43 described later. For the addition of the metal M2, a liquid phase method typified by a sol-gel method, a solid phase method, a sputtering method, an evaporation method, a CVD (chemical vapor deposition) method, a PLD (pulsed laser deposition) method, and the like can be used.

<Step S41>

As Step S41, a metal source is first prepared. In the case of employing a sol-gel method, a solvent used for the sol-gel method is also prepared. As the metal source, metal alkoxide, metal hydroxide, metal oxide, or the like can be used. When the metal M2 is aluminum, for example, the relative value of the number of aluminum atoms in the metal source is greater than or equal to 0.005 and less than or equal to 0.02 with the number of cobalt atoms in the lithium cobalt oxide regarded as 1. When the metal M2 contains nickel in addition to aluminum, for example, the relative value of the number of nickel atoms in the metal source is greater than or equal to 0.0005 and less than or equal to 0.02 with the number of cobalt atoms in the lithium cobalt oxide regarded as 1.

Figure 10:
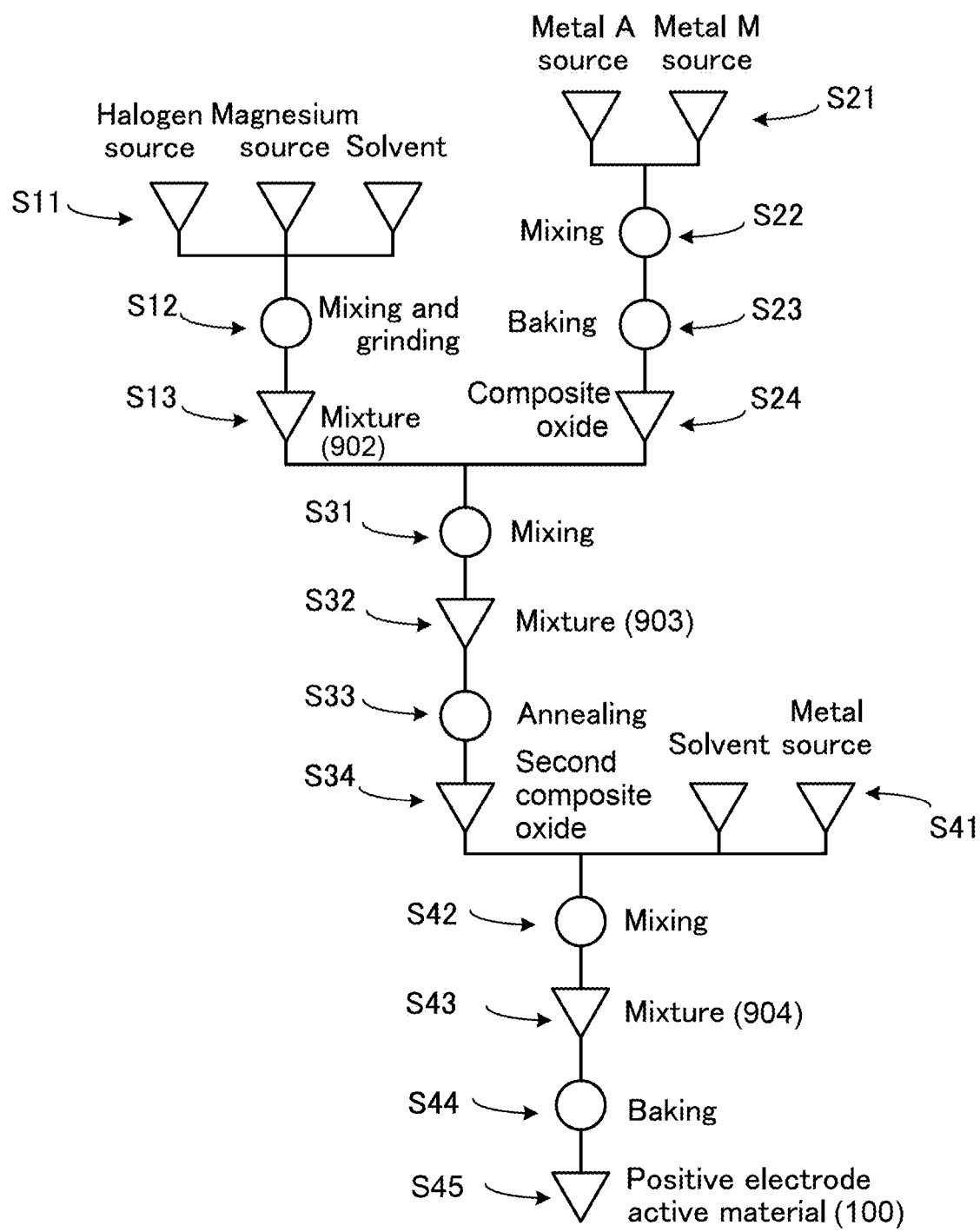
FIG. 10 is a diagram showing an example of a manufacturing method of a positive electrode active material of one embodiment of the present invention.

Here, an example of employing a sol-gel method using aluminum isopropoxide as the metal source and isopropanol as the solvent is shown (Step S41 in FIG. 10).

<Step S42>

Next, as Step S42, aluminum alkoxide is dissolved in alcohol, and then the lithium cobalt oxide particles are mixed.

Next, a mixed solution of the alcohol solution of metal alkoxide and the lithium cobalt oxide particles is stirred under an atmosphere containing water vapor. The stirring can be performed with a magnetic stirrer, for example. The stirring time is not limited as long as water and metal alkoxide in the atmosphere cause hydrolysis and polycondensation reaction. For example, the stirring can be performed at 25° C. and a humidity of 90% RH (Relative Humidity) for 4 hours. Alternatively, the stirring may be performed under an atmosphere where the humidity and temperature are not adjusted, for example, an air atmosphere in a fume hood. In such a case, the stirring time is preferably set longer and can be 12 hours or longer at room temperature, for example.

Reaction between water vapor and metal alkoxide in the atmosphere enables a sol-gel reaction to proceed more slowly as compared with the case where liquid water is added. Alternatively, reaction between metal alkoxide and water at room temperature enables a sol-gel reaction to proceed more slowly as compared with the case where heating is performed at a temperature higher than the boiling point of alcohol serving as a solvent, for example. A sol-gel reaction that proceeds slowly enables formation of a high-quality coating layer with a uniform thickness.

When aluminum is added as the metal M2, for example, the relative value of the number of metal M2 atoms is, with respect to the sum of the metal M1 and the metal M2, preferably greater than or equal to 0.0005 and less than or equal to 0.02, further preferably greater than or equal to 0.001 and less than or equal to 0.015, still further preferably greater than or equal to 0.001 and less than or equal to 0.009, for example. When nickel is added as the metal M2, the relative value of the number of metal M2 atoms is, with respect to the sum of the metal M1 and the metal M2, preferably greater than or equal to 0.0005 and less than or equal to 0.02, further preferably greater than or equal to 0.001 and less than or equal to 0.015, still further preferably greater than or equal to 0.001 and less than or equal to 0.009, for example.

<Step S43>

Next, as Step S43, after the above process, the precipitate is collected from the mixed solution, the collected residue is dried, so that a mixture 904 is obtained. As the collection method of the precipitate, filtration, centrifugation, evaporation to dryness, and the like can be used. The precipitate can be washed with alcohol that is the same as the solvent in which metal alkoxide is dissolved. In the drying step, vacuum or ventilation drying can be performed at 80° C. for 1 hour to 4 hours, for example. Note that in the case of employing evaporation to dryness, the solvent and the precipitate are not necessarily separated in this step; for example, the precipitate is collected in the subsequent baking step (Step S44).

<Step S44>

Next, as Step S44, the obtained mixture 904 is baked.

For the baking time, the retention time at a temperature within a specified range is preferably longer than or equal to 1 hour and shorter than or equal to 50 hours, further preferably longer than or equal to 2 hours and shorter than or equal to 20 hours. When the baking time is too short, the crystallinity of a compound containing the metal M2 formed in the surface portion is low in some cases. Alternatively, the metal M2 is not sufficiently diffused in some cases. Alternatively, an organic substance may remain on the surface in some cases. However, when the baking time is too long, the metal M2 is diffused too much so that the concentration at the surface portion and near the crystal grain boundary might be low. Furthermore, the productivity is lowered.

The specified temperature is preferably higher than or equal to 500° C. and lower than or equal to 1200° C., further preferably higher than or equal to 700° C. and lower than or equal to 920° C., and still further preferably higher than or equal to 800° C. and lower than or equal to 900° C. When the specified temperature is too low, the crystallinity of the compound containing the metal M2 formed in the surface portion is low in some cases. Alternatively, the metal M2 is not sufficiently diffused in some cases. Alternatively, an organic substance may remain on the surface in some cases.

The baking is preferably performed in an oxygen-containing atmosphere. When the oxygen partial pressure is low, Co might be reduced unless the baking temperature is lowered.

In this embodiment, the specified temperature is 850° C. and kept for 2 hours, the temperature rising rate is 200° C./h, and the flow rate of oxygen is 10 L/min.

The cooling time after the baking is preferably long, in which case a crystal structure is easily stabilized. For example, the time of decreasing temperature from the specified temperature to room temperature is preferably longer than or equal to 10 hours and shorter than or equal to 50 hours. Here, the baking temperature in Step S44 is preferably lower than the baking temperature in Step S33.

<Step S45>

Next, as Step S45, cooled particles are collected, so that the positive electrode active material 100 of one embodiment of the present invention can be formed. Here, the collected particles are preferably made to pass through a sieve.

This embodiment can be implemented in appropriate combination with the other embodiments.

Embodiment 3

In this embodiment, examples of materials that can be used for a secondary battery containing the positive electrode active material described in the above embodiment are described.

Structure Example 1 of Secondary Battery

Hereinafter, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain, in addition to the positive electrode active material, other materials such as a coating film of the active material surface, a conductive additive, and a binder.

As the positive electrode active material, the positive electrode active material 100 described in the above embodiment can be used. A secondary battery including the positive electrode active material 100 described in the above embodiment can have high capacity and excellent cycle performance.

Examples of the conductive additive include a carbon material, a metal material, and a conductive ceramic material. Alternatively, a fiber material may be used as the conductive additive. The content of the conductive additive to the total amount of the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive also allows the maintenance of a path for electric conduction between the positive electrode active materials. The addition of the conductive additive to the active material layer increases the electric conductivity of the active material layer.

Examples of the conductive additive include natural graphite, artificial graphite such as mesocarbon microbeads, and carbon fiber. As carbon fiber, mesophase pitch-based carbon fiber and isotropic pitch-based carbon fiber can be used. Furthermore, as carbon fiber, carbon nanofiber and carbon nanotube can be used. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. Thus, a graphene compound is preferably used as the conductive additive, in which case the area where the active material and the conductive additive are in contact with each other can be increased. The graphene compound serving as the conductive additive is preferably formed with a spray dry apparatus as a coating film to cover the entire surface of the active material, in which case the electrical resistance can be reduced in some cases. Here, it is particularly preferable to use, for example, graphene, multilayer graphene, or RGO as a graphene compound. Note that RGO refers to a compound obtained by reducing graphene oxide (GO), for example.

In the case where an active material with a small particle size (e.g., 1 m or less) is used, the specific surface area of the active material is large and thus more conductive paths for the active materials are needed. Thus, the amount of conductive additive tends to increase and the carried amount of active material tends to decrease relatively. When the carried amount of active material decreases, the capacity of the secondary battery also decreases. In such a case, a graphene compound that can efficiently form a conductive path even with a small amount is particularly preferably used as the conductive additive because the carried amount of active material does not decrease.

A cross-sectional structure example of an active material layer 200 containing a graphene compound as a conductive additive is described below.

Figure 11A:
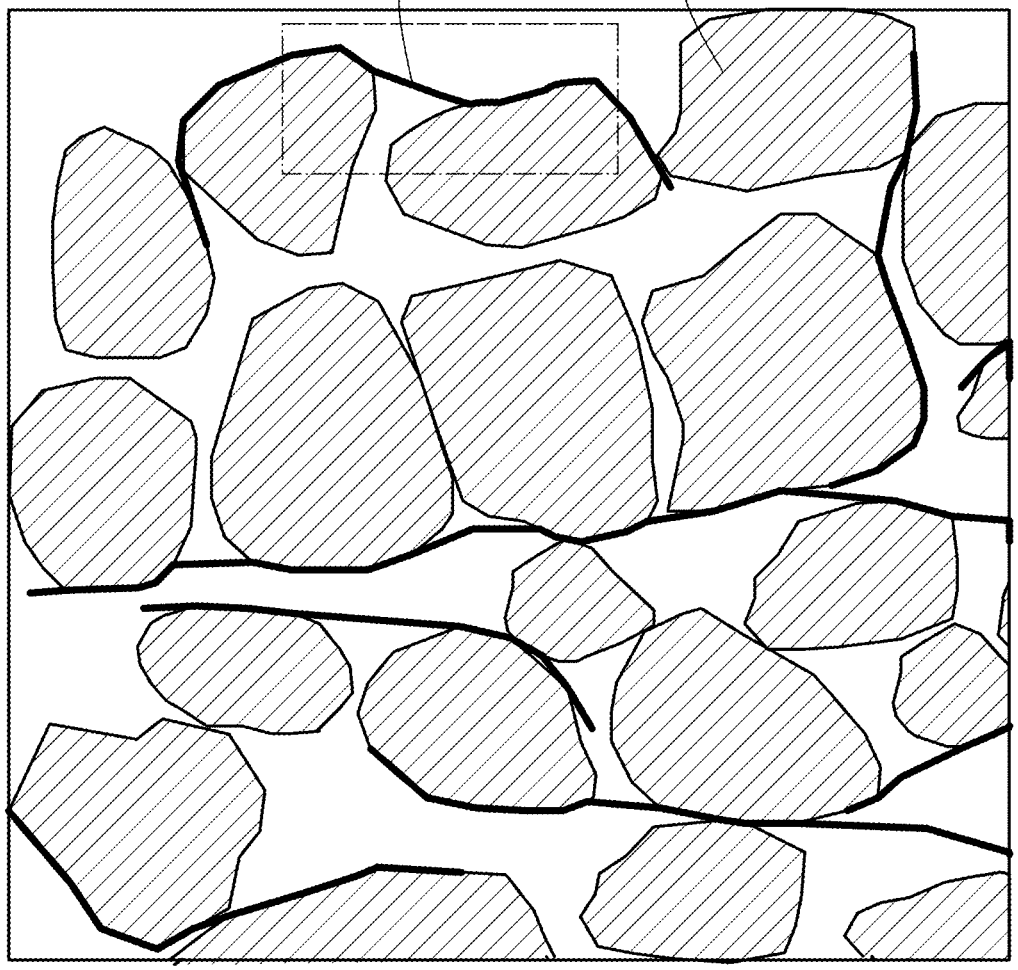
FIG. 11A and FIG. 11B are cross-sectional views of an active material layer containing a graphene compound as a conductive additive.

FIG. 11A is a longitudinal cross-sectional view of the active material layer 200. The active material layer 200 includes particles of the positive electrode active material 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

Figure 11B:
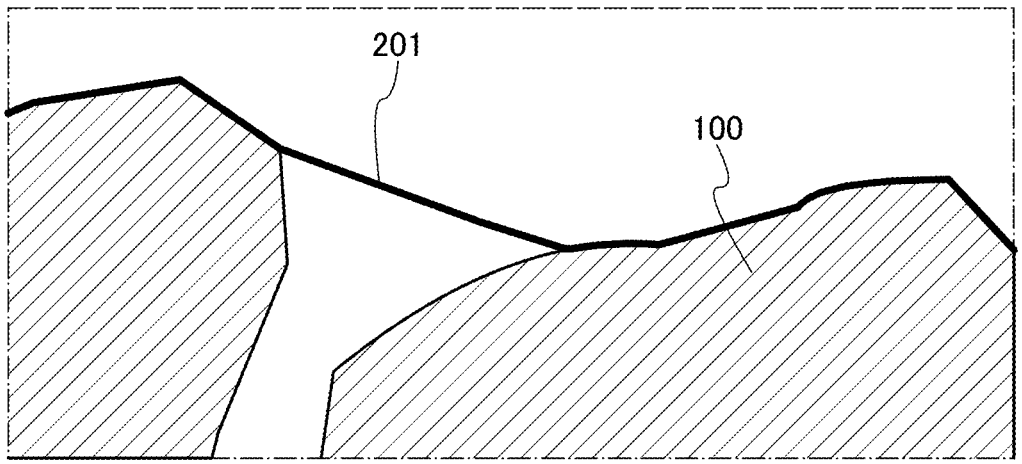

The longitudinal cross section of the active material layer 200 in FIG. 11B shows substantially uniform dispersion of the sheet-like graphene compounds 201 in the active material layer 200. The graphene compounds 201 are schematically shown by thick lines in FIG. 11B but are actually thin films each having a thickness corresponding to the thickness of a single layer or a multi-layer of carbon molecules. The plurality of graphene compounds 201 are formed to partly coat or adhere to the surfaces of the plurality of particles of the positive electrode active material 100, so that the graphene compounds 201 make surface contact with the particles of the positive electrode active material 100.

Here, the plurality of graphene compounds are bonded to each other to form a net-like graphene compound sheet (hereinafter, referred to as a graphene compound net or a graphene net). The graphene net covering the active material can function as a binder for bonding active materials. The amount of binder can thus be reduced, or the binder does not have to be used. This can increase the proportion of the active material in the electrode volume or the electrode weight. That is to say, the capacity of the secondary battery can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by evaporation from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike conductive additive particles that make point contact with an active material, such as acetylene black, the graphene compound 201 is capable of making low-resistance surface contact; accordingly, the electrical conduction between the particles of the positive electrode active material 100 and the graphene compounds 201 can be improved with a smaller amount of the graphene compound 201 than that of a normal conductive additive. This increases the proportion of the positive electrode active material 100 in the active material layer 200, resulting in increased discharge capacity of the secondary battery.

It is possible to form a graphene compound serving as a conductive additive as a coating film to cover the entire surface of the active material and to form a conductive path between the active materials using the graphene compound in advance with a spray dry apparatus.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, and regenerated cellulose or starch can be used. It is further preferred that such water-soluble polymers be used in combination with any of the above rubber materials.

Alternatively, as the binder, a material such as polystyrene, poly(methyl acrylate), poly(methyl methacrylate) (polymethyl methacrylate, PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

A fluorine-based resin has an advantage in high mechanical strength, high chemical resistance, high heat resistance, and the like. Note that PVDF that is a fluorine-based resin particularly has excellent characteristics among fluorine-based resins; it has high mechanical strength, is easy to process, and has high heat resistance.

Meanwhile, when the slurry formed in coating the active material layer is alkaline, PVDF might be gelled. Alternatively, PVDF might be insolubilized. Gelling or insolubilization of a binder might decrease adhesion between a current collector and an active material layer. The use of the positive electrode active material of one embodiment of the present invention can decrease pH of the slurry and accordingly can inhibit gelling or insolubilization in some cases, which is preferable.

<Positive Electrode Current Collector>

The positive electrode current collector can be formed using a material that has high conductivity, such as a metal like stainless steel, gold, platinum, aluminum, and titanium, or an alloy thereof. It is preferred that a material used for the positive electrode current collector not dissolve at the potential of the positive electrode. Alternatively, it is possible to use an aluminum alloy to which an element that improves heat resistance, such as silicon, titanium, neodymium, scandium, or molybdenum, is added. Still alternatively, the positive electrode current collector may be formed using a metal element that forms silicide by reacting with silicon. Examples of the metal element that forms silicide by reacting with silicon include zirconium, titanium, hafnium, vanadium, niobium, tantalum, chromium, molybdenum, tungsten, cobalt, and nickel. The current collector can have any of various shapes including a foil-like shape, a plate-like shape (sheet-like shape), a net-like shape, a punching-metal shape, and an expanded-metal shape. The current collector preferably has a thickness of greater than or equal to 5 μm and less than or equal to 30 μm.

[Method for Fabricating Positive Electrode]

In an example of a method for fabricating a positive electrode including the positive electrode active material of one embodiment of the present invention, slurry is formed and application of the slurry is performed, whereby an electrode can be fabricated. An example of a method for forming slurry used for fabricating an electrode will be described.

Here, a solvent used for formation of the slurry is preferably a polar solvent. For example, water, methanol, ethanol, acetone, tetrahydrofuran (THF), dimethylformamide (DMF), N-methylpyrrolidone (NMP), dimethyl sulfoxide (DMSO), or a mixed solution of two or more of the above can be used.

In the case where the positive electrode active material of one embodiment of the present invention includes the first particle group and the second particle group, the first particle group and the second particle group are mixed at a desired ratio. In the case where the mixing ratio of the first particle group and the second particle group is 1:w (weight ratio), w is preferably greater than or equal to 0.01 and less than or equal to 0.6, further preferably greater than or equal to 0.03 and less than or equal to 0.6, still further preferably greater than or equal to 0.04 and less than or equal to 0.5, still further preferably greater than or equal to 0.09 and less than or equal to 0.3.

The positive electrode active material of one embodiment of the present invention may have a particle size distribution in accordance with the mixing ratio of the first particle group and the second particle group. Depending on the proportions of the particle groups, the intensity or area of each of local maximum peaks corresponding to the particle groups may have a value in accordance with the ratio of the proportions. The number of local maximum peaks of one particle group may be one or two or more. In the case of two or more local maximum peaks, the total area of the plurality of local maximum peaks may be used.

The positive electrode active material in which the first particle group and the second particle group are mixed, a conductive additive, a binder, and a solvent are mixed to form a mixture J. The mixing may be performed under normal pressure or reduced pressure. In the mixing step, a mixer can be used, for example.

Then, the viscosity of the mixture J is measured. After that, a solvent is added as needed to adjust the viscosity. Through the above steps, slurry for coating an active material layer is obtained.

Here, for example, the higher the viscosity of the mixture J is, the higher the dispersibility of the active material, the binder, and the conductive additive in the mixtures is (the better they are mixed together), in some cases. Thus, the viscosity of the mixture J is preferably higher. However, an excessively high viscosity of the mixture J is not preferred in terms of productivity because it might reduce the electrode application speed.

Next, a method for forming an active material layer over a current collector with the use of the formed slurry will be described.

First, the slurry is applied to a current collector. Before the application of the slurry, surface treatment may be performed on the current collector. Examples of such surface treatment are corona discharge treatment, plasma treatment, undercoat treatment, and the like. Here, the "undercoat" refers to a film formed over a current collector before application of slurry onto the current collector for the purpose of reducing the interface resistance between an active material layer and the current collector or increasing the adhesion between the active material layer and the current collector. Note that the undercoat is not necessarily formed in a film shape, and may be formed in an island shape. In addition, the undercoat may serve as an active material to have capacity. For the undercoat, a carbon material can be used, for example. Examples of the carbon material include graphite, carbon black such as acetylene black and ketjen black (registered trademark), and a carbon nanotube.

For the application of the slurry, a slot die method, a gravure method, a blade method, or a combination of any of them can be used, for example. Furthermore, a continuous coater or the like may be used for the application.

Then, the solvent of the slurry is evaporated to form the active material layer.

The step of evaporating the solvent of the slurry is preferably performed at a temperature in the range from 50° C. to 200° C. inclusive, further preferably from 60° C. to 90° C. inclusive. The evaporation may be performed in an air atmosphere under normal pressure or reduced pressure. Performing the evaporation under reduced pressure can shorten the evaporation time in some cases. Alternatively, the evaporation temperature can be lowered in some cases.

The evaporation step can be performed with use of a hot plate, a drying furnace, or the like.

The active material layers may be formed on both surfaces of the current collector, or the active material layer may be formed on only one surface of the current collector. Alternatively, both surfaces may partly have a region where the active material layer is formed.

After the evaporation of the solvent from the active material layer, pressing is preferably performed by a compression method such as a roll press method or a flat plate press method.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium and a compound containing the element, for example, may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably 0.2 or more and 1.5 or less, further preferably 0.3 or more and 1.2 or less.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it is relatively easy to have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (when a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

Alternatively, for the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm³).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material. For example, a transition metal oxide that does not form an alloy with lithium, such as cobalt oxide (CoO), nickel oxide (NiO), and iron oxide (FeO), may be used. Other examples of the material that causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharge or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as "impurities"). Specifically, the weight ratio of impurities to the electrolyte solution is less than or equal to 1%, preferably less than or equal to 0.1%, further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a PEO (polyethylene oxide)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

Deterioration of the separator in charge and discharge at high voltage can be suppressed and thus the reliability of the secondary battery can be improved because oxidation resistance is improved when the separator is coated with the ceramic-based material. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. An exterior body in the form of a film can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Structure Example 2 of Secondary Battery

A structure of a secondary battery using a solid electrolyte layer will be described below as a structure example of a secondary battery.

Figure 12A:
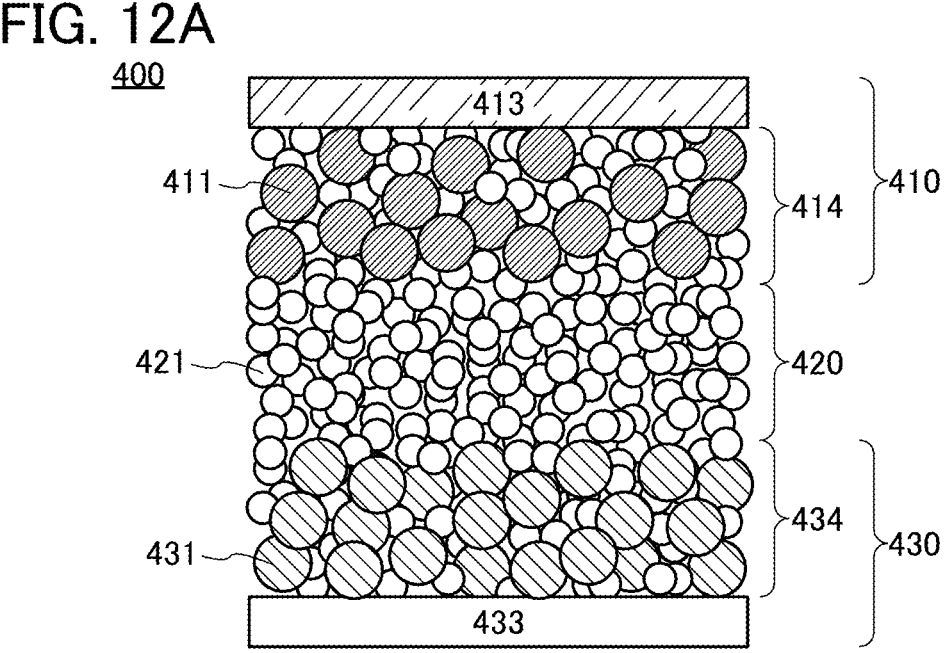
FIG. 12A and FIG. 12B are diagrams showing examples of a secondary battery of one embodiment of the present invention.

As illustrated in FIG. 12A, a secondary battery 400 of one embodiment of the present invention includes a positive electrode 410, a solid electrolyte layer 420, and a negative electrode 430.

The positive electrode 410 includes a positive electrode current collector 413 and a positive electrode active material layer 414. The positive electrode active material layer 414 includes a positive electrode active material 411 and a solid electrolyte 421. The positive electrode active material layer 414 may also include a conductive additive and a binder.

The solid electrolyte layer 420 includes the solid electrolyte 421. The solid electrolyte layer 420 is positioned between the positive electrode 410 and the negative electrode 430, and is a region that includes neither the positive electrode active material 411 nor a negative electrode active material 431.

Figure 12B:
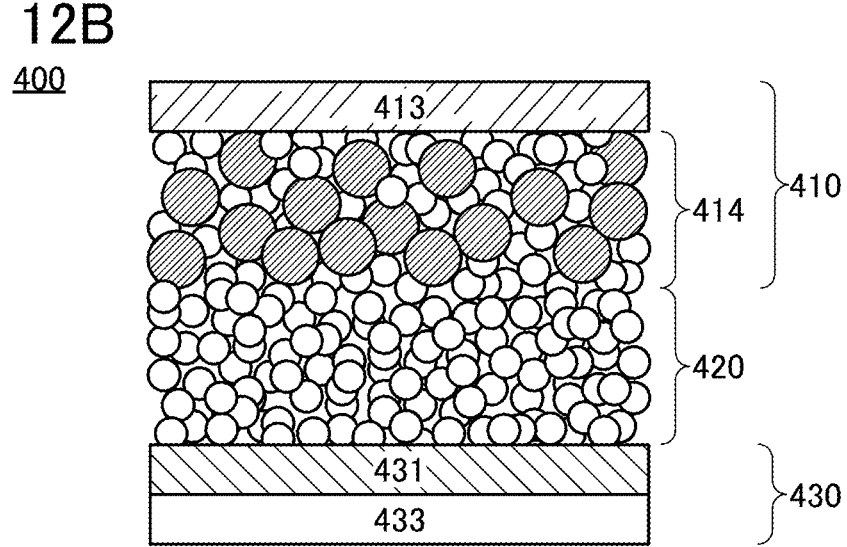

The negative electrode 430 includes a negative electrode current collector 433 and a negative electrode active material layer 434. The negative electrode active material layer 434 includes the negative electrode active material 431 and the solid electrolyte 421. The negative electrode active material layer 434 may also include a conductive additive and a binder. Note that when metal lithium is used for the negative electrode 430, it is possible that the negative electrode 430 does not include the solid electrolyte 421 as illustrated in FIG. 12B. The use of metal lithium for the negative electrode 430 is preferable because the energy density of the secondary battery 400 can be increased.

Figure 13A:
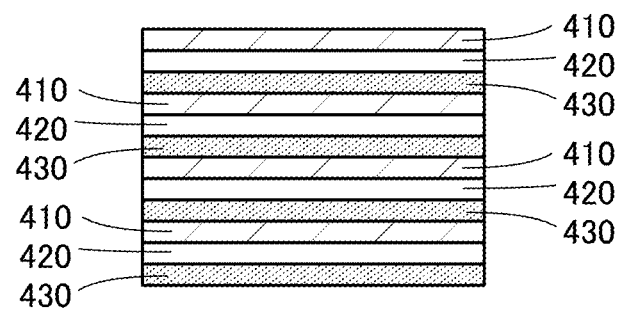
FIG. 13A and FIG. 13B are diagrams showing examples of secondary batteries of embodiments of the present invention.

As illustrated in FIG. 13A, the secondary battery may have a structure in which a combination of the positive electrode 410, the solid electrolyte layer 420, and the negative electrode 430 is repeatedly stacked. Stacking the positive electrodes 410, the solid electrolyte layers 420, and the negative electrodes 430 can increase the voltage of the secondary battery. FIG. 13A is a schematic diagram illustrating the case where four layers of the combination of the positive electrode 410, the solid electrolyte layer 420, and the negative electrode 430 are stacked.

Figure 13B:
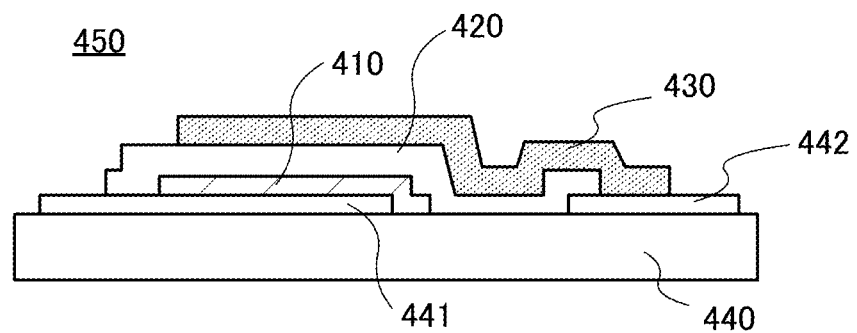

The secondary battery of one embodiment of the present invention may be a thin-film all-solid-state battery. A thin-film all-solid-state battery can be manufactured by depositing a positive electrode, a solid electrolyte, a negative electrode, a wiring electrode, and the like by a vapor phase method (a vacuum deposition method, a pulsed laser deposition method, an aerosol deposition method, or a sputtering method). FIG. 13B shows an example of a thin-film-type all-solid-state battery 450, for example. As illustrated in FIG. 13B, after a wiring electrode 441 and a wiring electrode 442 are formed over a substrate 440, the positive electrode 410 is formed over the wiring electrode 441, the solid electrolyte layer 420 is formed over the positive electrode 410, and the negative electrode 430 is formed over the solid electrolyte layer 420 and the wiring electrode 442, whereby the thin-film-type all-solid-state battery 450 can be manufactured. As the substrate 440, a ceramic substrate, a glass substrate, a plastic substrate, a metal substrate, or the like can be used.

As the solid electrolyte 421 included in the solid electrolyte layer 420, a sulfide-based solid electrolyte, an oxide-based solid electrolyte, or a halide-based solid electrolyte can be used, for example.

Examples of the sulfide-based solid electrolyte include a thio-silicon-based material (e.g., $Li_{10}GeP_2S_{12}$ and $Li_{3.25}Ge_{0.25}P_{0.75}S_4$), sulfide glass (e.g., $70Li_2S.30P_2S_5$, $30Li_2S.26B_2S_3.44LiI$, $63Li_2S.38SiS_2.1Li_3PO_4$, $57Li_2S.38SiS_2.5Li_4SiO_4$, and $50Li_2S.50GeS_2$), and sulfide-based crystallized glass (e.g., $Li_7P_3S_{11}$ and $Li_{3.25}P_{0.95}S_4$). The sulfide-based solid electrolyte has advantages such as high conductivity of some materials, low-temperature synthesis, and ease of maintaining a conduction path after charge and discharge because of its relative softness.

Examples of the oxide-based solid electrolyte include a material with a perovskite crystal structure (e.g., $La_{2/3-x}Li_{3x}TiO_3$), a material with a NASICON crystal structure (e.g., $Li_{1-x}Al_xTi_{2-x}(PO_4)_3$), a material with a garnet crystal structure (e.g., $Li_7La_3Zr_2O_{12}$), a material with a LISICON crystal structure (e.g., $Li_{14}ZnGe_4O_{16}$), LLZO ($Li_7La_3Zr_2O_{12}$), oxide glass (e.g., $Li_3PO_4$—$Li_4SiO_4$ and $50Li_4SiO_4.50Li_3BO_3$), and oxide-based crystallized glass (e.g., $Li_{1.07}Al_{0.69}Ti_{1.46}(PO_4)_3$ and $Li_{1.5}Al_{0.5}Ge_{1.5}(PO_4)_3$). The oxide-based solid electrolyte has an advantage of stability in the air.

Examples of the halide-based solid electrolyte include $LiAlCl_4$, $Li_3InBr_6$, LiF, LiCl, LiBr, and LiI. Moreover, a composite material in which pores of porous aluminum oxide or porous silica are filled with such a halide-based solid electrolyte can be used as the solid electrolyte.

Alternatively, different solid electrolytes may be mixed and used.

In particular, $Li_{1+x}Al_xTi_{2-x}(PO_4)_3$ ($0<x<1$) with a NASICON crystal structure (hereinafter LATP) is preferable because LATP contains aluminum and titanium, each of which is the element the positive electrode active material 100 of one embodiment of the present invention is allowed to contain, and thus a synergistic effect of improving the cycle performance is expected. Moreover, higher productivity due to the reduction in the number of steps is expected.

Note that in this specification and the like, a material with a NASICON crystal structure refers to a compound that is represented by $M_2(XO_4)_3$ (M: transition metal; X: S, P, As, Mo, W, or the like) and has a structure in which $MO_6$ octahedra and $XO_4$ tetrahedra that share common corners are arranged three-dimensionally.

[Exterior Body and Shape of Secondary Battery]

An exterior body of the secondary battery 400 of one embodiment of the present invention can be formed using a variety of materials and have a variety of shapes, and preferably has a function of applying pressure to the positive electrode, the solid electrolyte layer, and the negative electrode.

FIG. 14 shows an example of a cell for evaluating materials of an all-solid-state battery, for example.

Figure 14A:
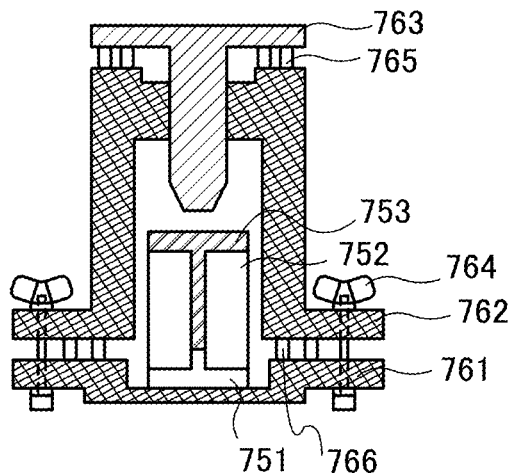
FIG. 14A to FIG. 14C are diagrams showing examples of a secondary battery of one embodiment of the present invention.

FIG. 14A is a schematic cross-sectional view of an evaluation cell, the evaluation cell includes a lower component 761, an upper component 762, and a fixation screw and a butterfly nut 764 for fixing them, and by rotating a pressure screw 763, an electrode plate 753 is pressed to fix an evaluation material. An insulator 766 is provided between the lower component 761 and the upper component 762 that are made of a stainless steel material. An O ring 765 for hermetic sealing is provided between the upper component 762 and the pressure screw 763.

Figure 14B:
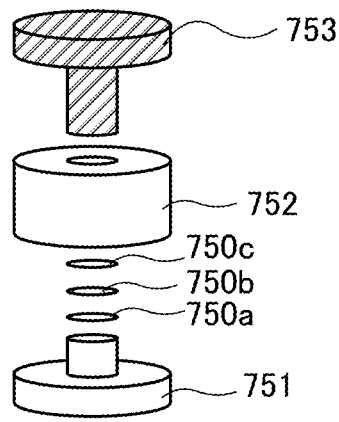

The evaluation material is placed on an electrode plate 751, surrounded by an insulating tube 752, and pressed from above by the electrode plate 753. FIG. 14B is an enlarged perspective view of the evaluation material and its vicinity.

Figure 14C:
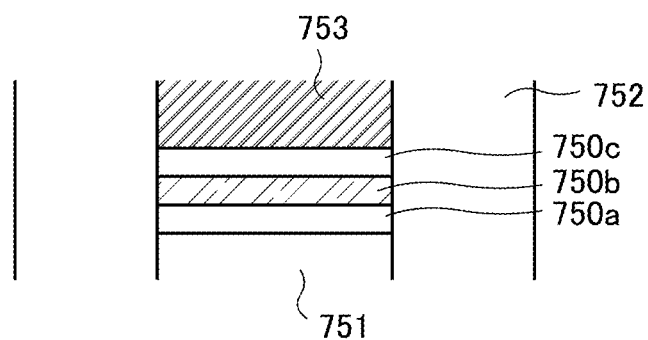

A stack of a positive electrode 750a, a solid electrolyte layer 750b, and a negative electrode 750c is shown as an example of the evaluation material, and its cross section is shown in FIG. 14C. Note that the same portions in FIG. 14A, FIG. 14B, and FIG. 14C are denoted by the same reference numerals.

The electrode plate 751 and the lower component 761 that are electrically connected to the positive electrode 750a can be said to correspond to a positive electrode terminal. The electrode plate 753 and the upper component 762 that are electrically connected to the negative electrode 750c can be said to correspond to a negative electrode terminal. The electric resistance or the like can be measured while pressure is applied to the evaluation material through the electrode plate 751 and the electrode plate 753.

The exterior body of the secondary battery of one embodiment of the present invention is preferably a package having excellent airtightness. For example, a ceramic package or a resin package can be used. Sealing of the exterior body is preferably performed in a closed atmosphere, for example, in a glove box, in which air is blocked.

Figure 15A:
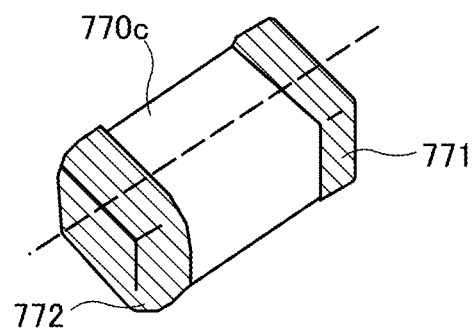
FIG. 15A and FIG. 15B are diagrams showing examples of a secondary battery of one embodiment of the present invention.

FIG. 15A is a perspective view of a secondary battery of one embodiment of the present invention that has an exterior body and a shape different from those in FIG. 14. The secondary battery in FIG. 15A includes external electrodes 771 and 772 and is sealed with an exterior body including a plurality of package components.

Figure 15B:
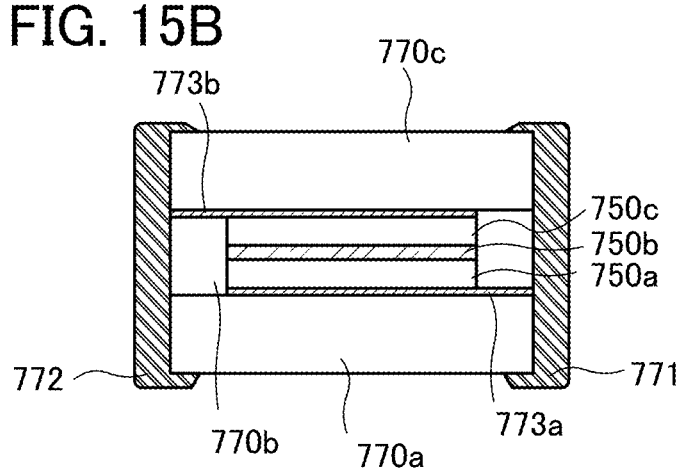

FIG. 15B shows an example of a cross section along the dashed-dotted line in FIG. 15A. A stacked body including the positive electrode 750a, the solid electrolyte layer 750b, and the negative electrode 750c is surrounded and sealed by a package component 770a in which an electrode layer 773a is provided on a flat plate, a frame-like package component 770b, and a package component 770c in which an electrode layer 773b is provided on a flat plate. For the package components 770a, 770b, and 770c, an insulating material such as a resin material or ceramic can be used.

The external electrode 771 is electrically connected to the positive electrode 750a through the electrode layer 773a and functions as a positive electrode terminal. The external electrode 772 is electrically connected to the negative electrode 750c through the electrode layer 773b and functions as a negative electrode terminal.

This embodiment can be implemented in appropriate combination with any of the other embodiments.

Embodiment 4

In this embodiment, examples of a shape of a secondary battery containing the positive electrode active material 100 described in the above embodiment are described. For the materials used for the secondary battery described in this embodiment, the description of the above embodiment can be referred to.

[Coin-Type Secondary Battery]

Figure 16A:
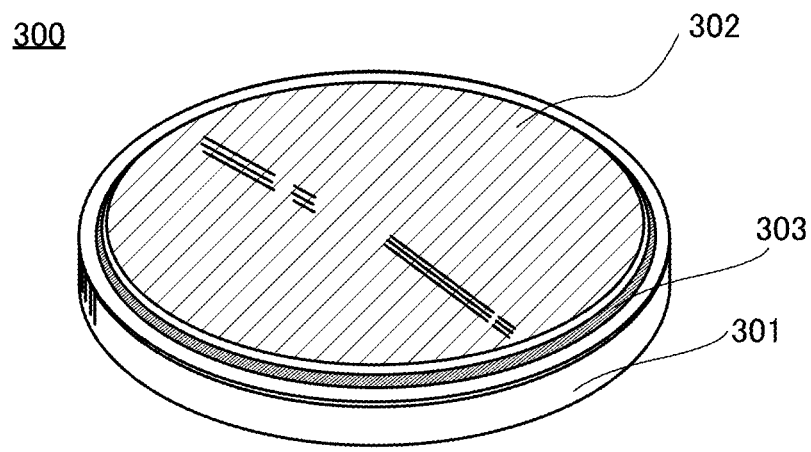
FIG. 16A and FIG. 16B are diagrams illustrating a coin-type secondary battery.
Figure 16B:
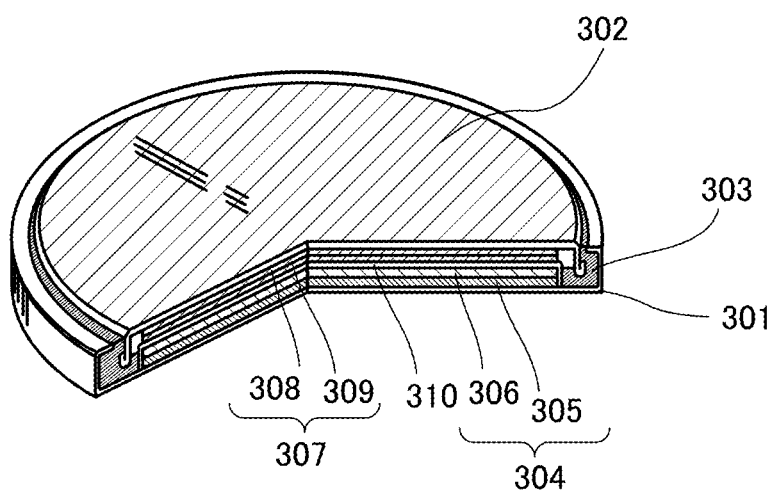

First, an example of a coin-type secondary battery is described. FIG. 16A is an external view of a coin-type (single-layer flat type) secondary battery, and FIG. 16B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution. Then, as illustrated in FIG. 16B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 is manufactured.

When the positive electrode active material described in the above embodiment is used in the positive electrode 304, the coin-type secondary battery 300 with high capacity and excellent cycle performance can be obtained.

Here, a current flow in charging a secondary battery is described with reference to FIG. 16C. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charge current is supplied. The use of the terms "anode" and "cathode" related to an oxidation reaction and a reduction reaction might cause confusion because the anode and the cathode change places at the time of charge and discharge. Thus, the terms "anode" and "cathode" are not used in this specification. If the term "anode" or "cathode" is used, it should be mentioned that the anode or the cathode is which of the one at the time of charge or the one at the time of discharge and corresponds to which of a positive (plus) electrode or a negative (minus) electrode.

Figure 16C:
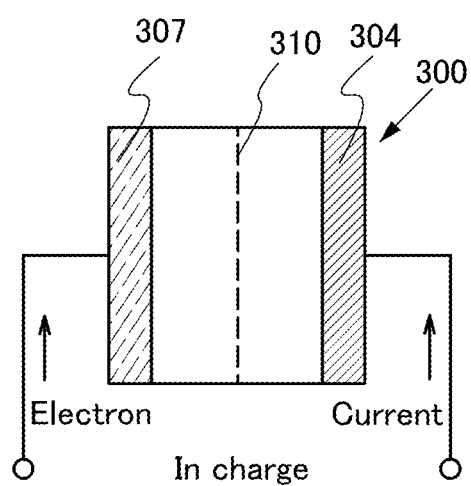
FIG. 16C is a diagram illustrating an electricity flow of a secondary battery.

Two terminals illustrated in FIG. 16C are connected to a charger, and the secondary battery 300 is charged. As the charge of the secondary battery 300 proceeds, a potential difference between electrodes increases.

[Cylindrical Secondary Battery]

Figure 17A:
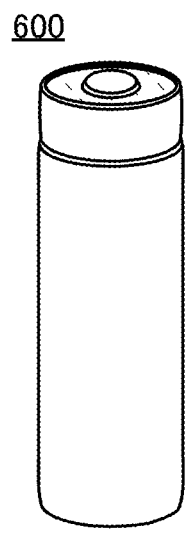
FIG. 17A and FIG. 17B are diagrams illustrating a cylindrical secondary battery.
Figure 17B:
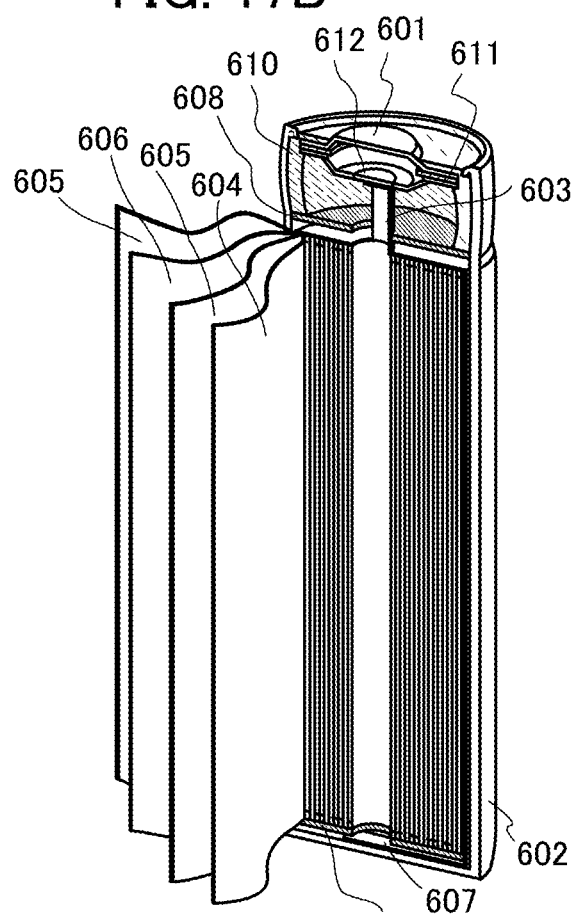

Next, an example of a cylindrical secondary battery is described with reference to FIG. 17. FIG. 17A illustrates an external view of a secondary battery 600. FIG. 17B is a schematic cross-sectional view of the cylindrical secondary battery 600. The cylindrical secondary battery 600 includes, as illustrated in FIG. 17B, a positive electrode cap (battery lid) 601 on the top surface and a battery can (outer can) 602 on a side surface and a bottom surface. The positive electrode cap and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic can be used for the PTC element.

Figure 17C:
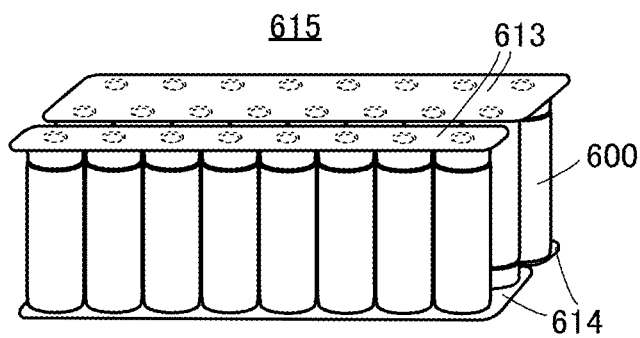
FIG. 17C and FIG. 17D are diagrams illustrating a module including a plurality of cylindrical secondary batteries.

Alternatively, as illustrated in FIG. 17C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 17D:
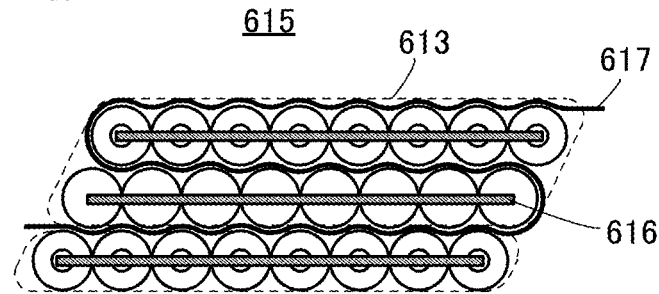

FIG. 17D is a top view of the module 615. The conductive plate 613 is shown by a dotted line for clarity of the drawing. As illustrated in FIG. 17D, the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 with high capacity and excellent cycle performance can be obtained.

[Structure Examples of Secondary Battery]

Other structure examples of secondary batteries are described with reference to FIG. 18 to FIG. 22.

Figure 18A:
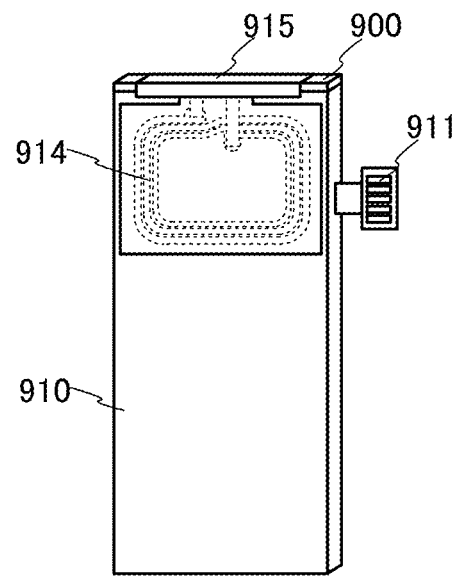
FIG. 18A and FIG. 18B are diagrams showing an example of a secondary battery.
Figure 18B:
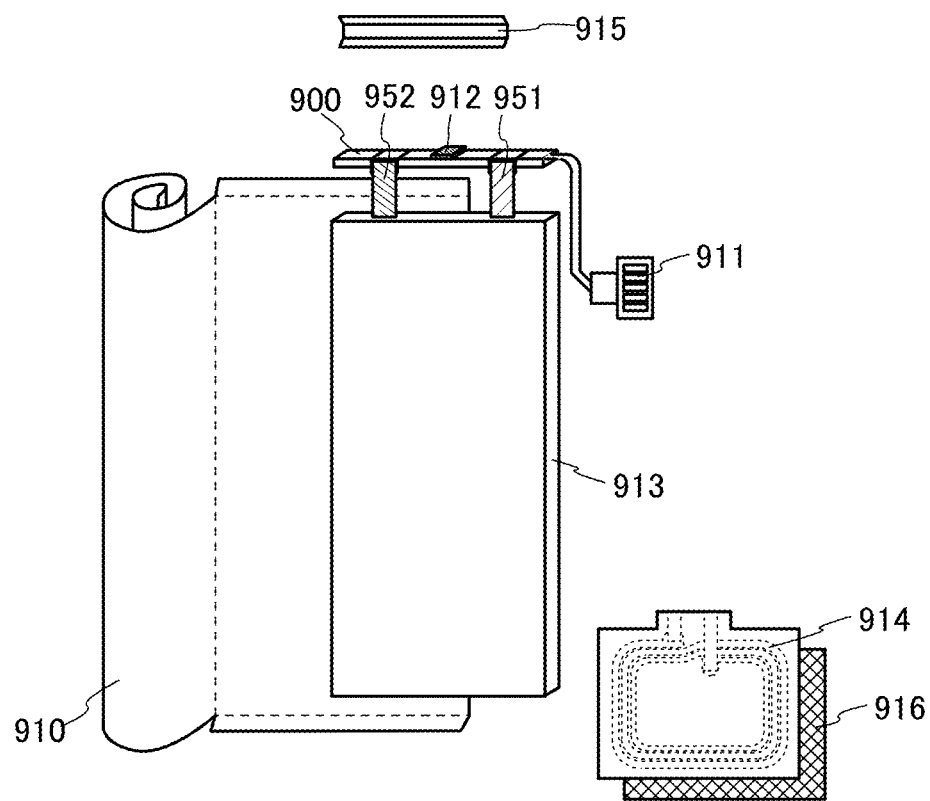

FIG. 18A and FIG. 18B are external views of a secondary battery. A secondary battery 913 is connected to an antenna 914 and an antenna 915 through a circuit board 900. A label 910 is attached to the secondary battery 913. In addition, as illustrated in FIG. 18B, the secondary battery 913 is connected to a terminal 951 and a terminal 952.

The circuit board 900 includes a terminal 911 and a circuit 912. The terminal 911 is connected to the terminal 951, the terminal 952, the antenna 914, the antenna 915, and the circuit 912. Note that a plurality of terminals 911 may be provided and each of the plurality of terminals 911 may serve as a control signal input terminal, a power supply terminal, and the like.

The circuit 912 may be provided on the rear surface of the circuit board 900. Note that the shapes of the antenna 914 and the antenna 915 are not limited to coil shapes, and may be linear shapes or plate shapes, for example. An antenna such as a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 may serve as one of two conductors of a capacitor. Thus, electric power can be transmitted and received not only by an electromagnetic field or a magnetic field but also by an electric field.

The line width of the antenna 914 is preferably larger than the line width of the antenna 915. This makes it possible to increase the amount of power received by the antenna 914.

The secondary battery includes a layer 916 between the antenna 914 and the antenna 915, and the secondary battery 913. The layer 916 has a function of preventing an influence on an electromagnetic field by the secondary battery 913, for example. As the layer 916, for example, a magnetic body can be used.

Note that the structure of the secondary battery is not limited to that in FIG. 18.

Figure 19A:
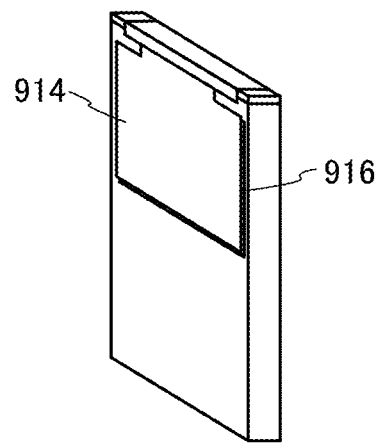
FIG. 19A to FIG. 19D are diagrams showing examples of secondary batteries.
Figure 19B:
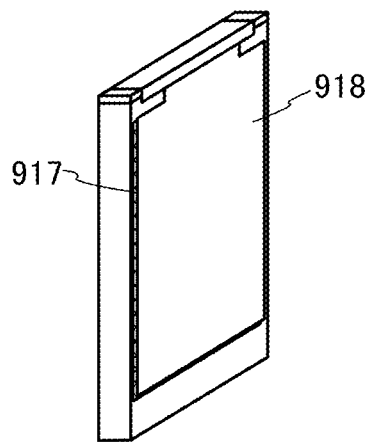

For example, as illustrated in FIG. 19A and FIG. 19B, two opposite surfaces of the secondary battery 913 illustrated in FIG. 18A and FIG. 18B may be provided with respective antennas. FIG. 19A is an external view seen from one side of the opposite surfaces, and FIG. 19B is an external view seen from the other side of the opposite surfaces. For portions similar to those of the secondary battery illustrated in FIG. 18A and FIG. 18B, the description of the secondary battery illustrated in FIG. 18A and FIG. 18B can be appropriately referred to.

As illustrated in FIG. 19A, the antenna 914 is provided on one of the opposite surfaces of the secondary battery 913 with the layer 916 located therebetween, and as illustrated in FIG. 19B, an antenna 918 is provided on the other of the opposite surfaces of the secondary battery 913 with a layer 917 located therebetween. The layer 917 has a function of preventing an influence on an electromagnetic field by the secondary battery 913, for example. As the layer 917, for example, a magnetic body can be used.

With the above structure, both of the antenna 914 and the antenna 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as NFC (near field communication), can be employed.

Figure 19C:
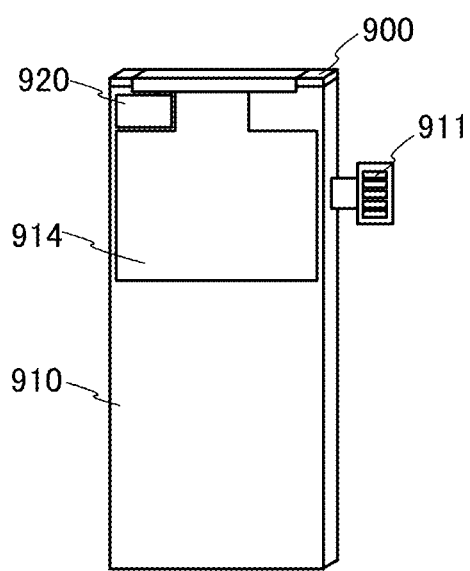

Alternatively, as illustrated in FIG. 19C, the secondary battery 913 illustrated in FIG. 18A and FIG. 18B may be provided with a display device 920. The display device 920 is electrically connected to the terminal 911. Note that the label 910 is not necessarily provided in a portion where the display device 920 is provided. For portions similar to those of the secondary battery illustrated in FIG. 18A and FIG. 18B, the description of the secondary battery illustrated in FIG. 18A and FIG. 18B can be appropriately referred to.

The display device 920 may display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 19D:
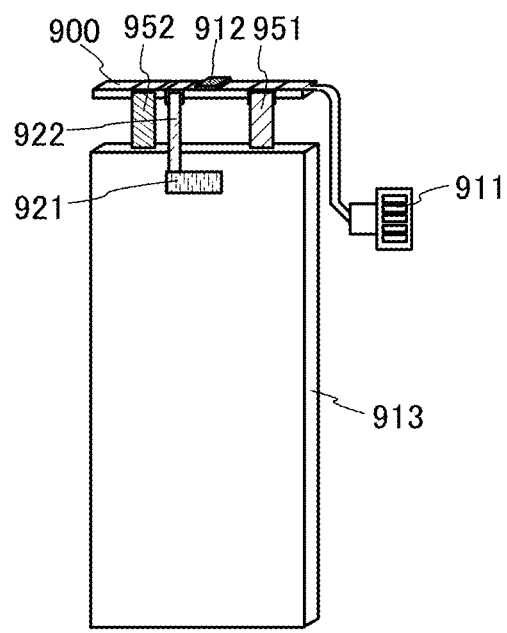

Alternatively, as illustrated in FIG. 19D, the secondary battery 913 illustrated in FIG. 18A and FIG. 18B may be provided with a sensor 921. The sensor 921 is electrically connected to the terminal 911 via a terminal 922. For portions similar to those of the secondary battery illustrated in FIG. 18A and FIG. 18B, the description of the secondary battery illustrated in FIG. 18A and FIG. 18B can be appropriately referred to.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment (e.g., temperature) where the secondary battery is placed can be acquired and stored in a memory inside the circuit 912.

Furthermore, structure examples of the secondary battery 913 are described with reference to FIG. 20.

Figure 20A:
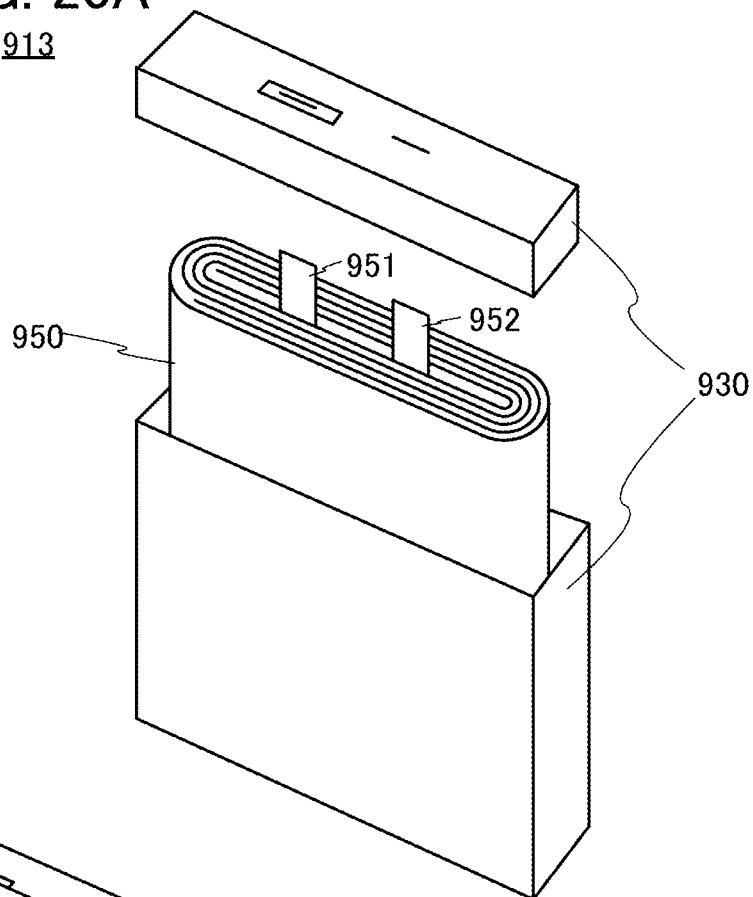
FIG. 20A and FIG. 20B are diagrams showing examples of a secondary battery.

The secondary battery 913 illustrated in FIG. 20A includes a wound body 950 provided with the terminal 951 and the terminal 952 inside a housing 930. The wound body 950 is soaked in an electrolyte solution inside the housing 930. The terminal 952 is in contact with the housing 930. An insulator or the like inhibits contact between the terminal 951 and the housing 930. Note that in FIG. 20A, the housing 930 divided into two pieces is illustrated for convenience; however, in the actual structure, the wound body 950 is covered with the housing 930 and the terminal 951 and the terminal 952 extend to the outside of the housing 930. For the housing 930, a metal material (e.g., aluminum) or a resin material can be used.

Figure 20B:
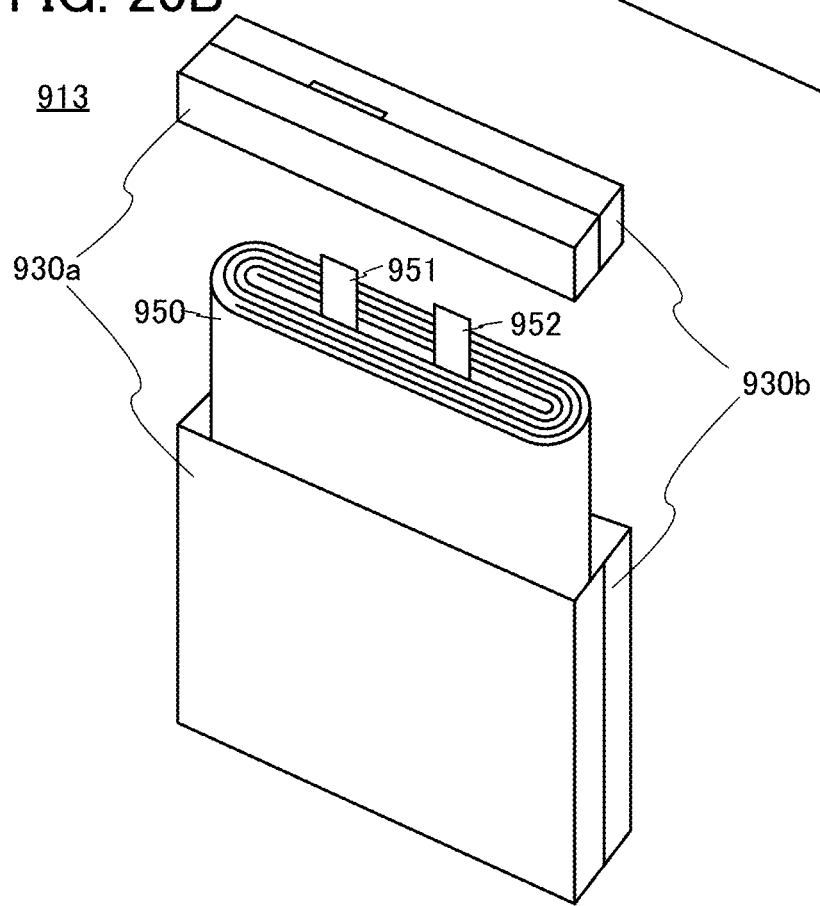

Note that as illustrated in FIG. 20B, the housing 930 illustrated in FIG. 20A may be formed using a plurality of materials. For example, in the secondary battery 913 illustrated in FIG. 20B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antenna 914 and the antenna 915 may be provided inside the housing 930a. For the housing 930b, a metal material can be used, for example.

Figure 21:
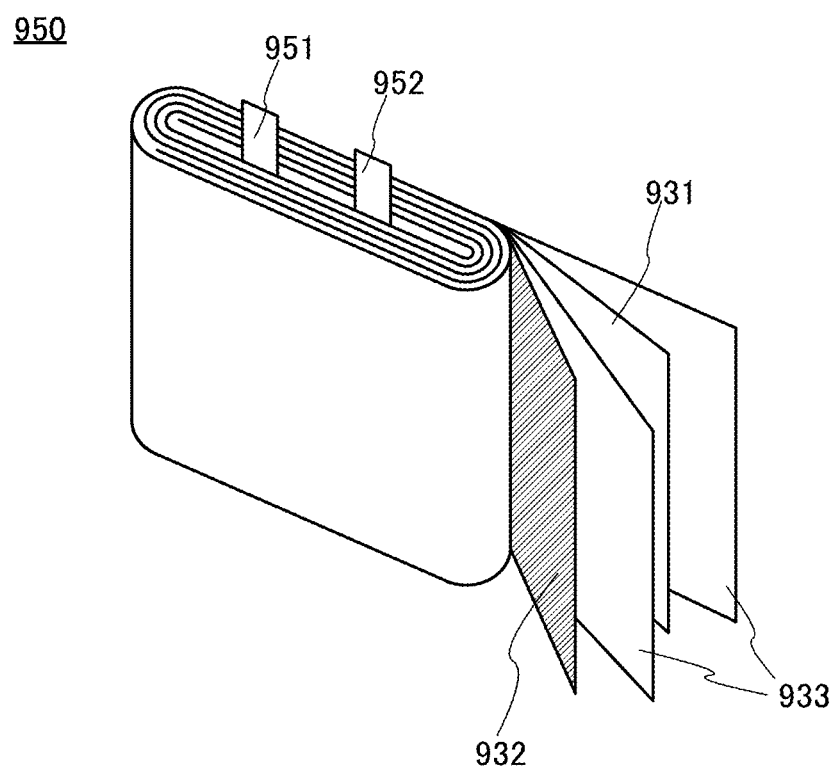
FIG. 21 is a diagram showing an example of a secondary battery.

FIG. 21 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 illustrated in FIG. 18 via one of the terminal 951 and the terminal 952. The positive electrode 932 is connected to the terminal 911 illustrated in FIG. 18 via the other of the terminal 951 and the terminal 952.

When the positive electrode active material described in the above embodiment is used in the positive electrode 932, the secondary battery 913 with high capacity and excellent cycle performance can be obtained.

[Laminated Secondary Battery]

Next, an example of a laminated secondary battery is described with reference to FIG. 22 to FIG. 26. When the laminated secondary battery has flexibility and is used in an electronic device at least part of which is flexible, the secondary battery can be bent as the electronic device is bent.

Figure 22A:
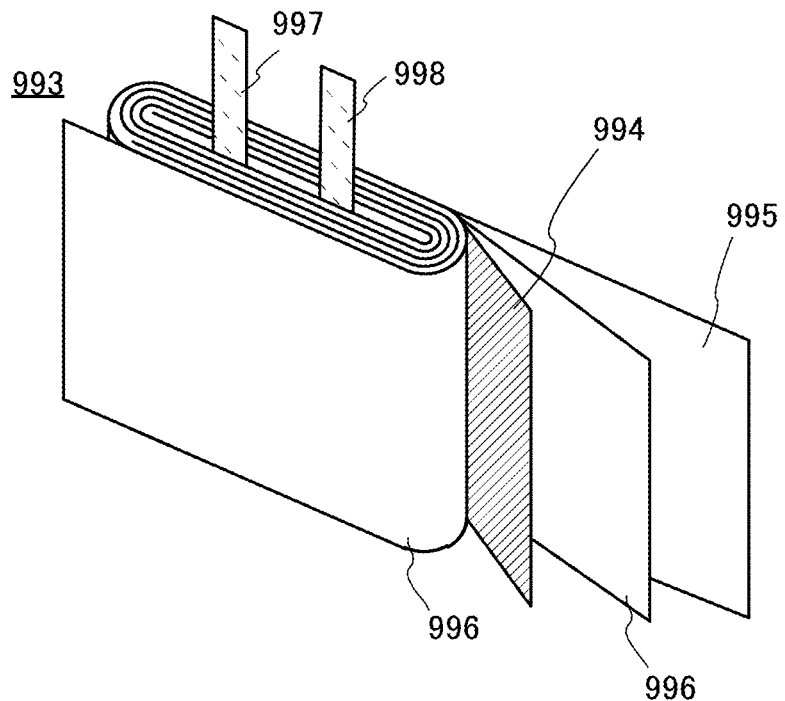
FIG. 22A to FIG. 22C are diagrams illustrating a laminated secondary battery.

A laminated secondary battery 980 is described with reference to FIG. 22. The laminated secondary battery 980 includes a wound body 993 illustrated in FIG. 22A. The wound body 993 includes a negative electrode 994, a positive electrode 995, and separators 996. The wound body 993 is, like the wound body 950 illustrated in FIG. 21, obtained by winding a sheet of a stack in which the negative electrode 994 overlaps with the positive electrode 995 with the separator 996 provided therebetween.

Note that the number of stacks each including the negative electrode 994, the positive electrode 995, and the separator 996 may be determined as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 22B:
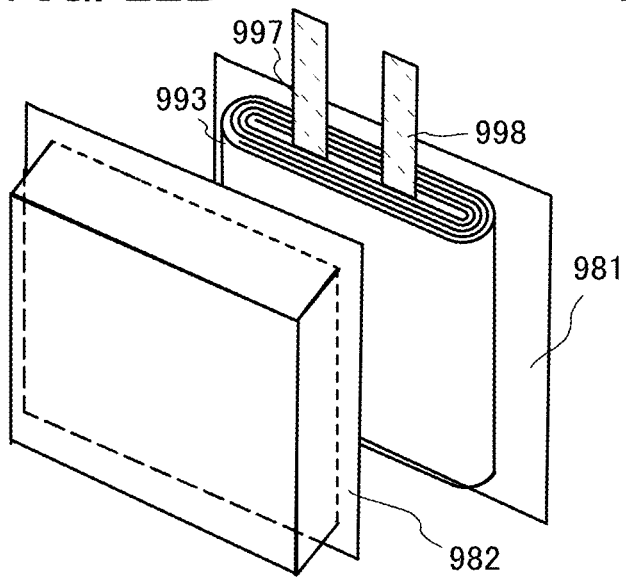
Figure 22C:
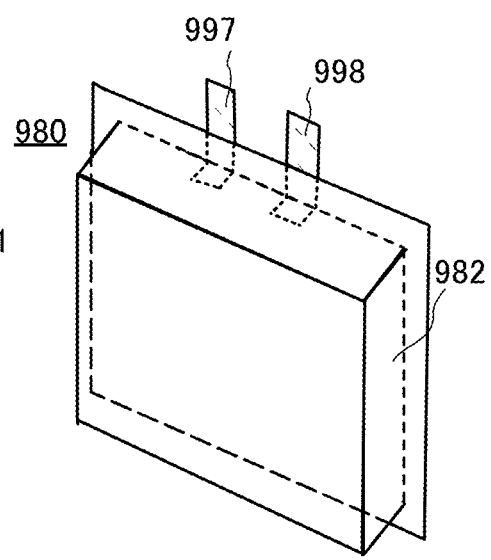

As illustrated in FIG. 22B, the wound body 993 is packed in a space formed by bonding a film 981 and a film 982 having a depressed portion that serve as exterior bodies by thermocompression bonding or the like, whereby the secondary battery 980 illustrated in FIG. 22C can be formed. The wound body 993 includes the lead electrode 997 and the lead electrode 998, and is soaked in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be formed.

Although FIG. 22B and FIG. 22C show an example of using two films, the wound body 993 may be placed in a space formed by bending one film.

When the positive electrode active material described in the above embodiment is used in the positive electrode 995, the secondary battery 980 with high capacity and excellent cycle performance can be obtained.

In FIG. 22, an example in which the secondary battery 980 includes a wound body in a space formed by films serving as exterior bodies is described; however, as illustrated in FIG. 23, a secondary battery may include a plurality of strip-shaped positive electrodes, a plurality of strip-shaped separators, and a plurality of strip-shaped negative electrodes in a space formed by films serving as exterior bodies, for example.

Figure 23A:
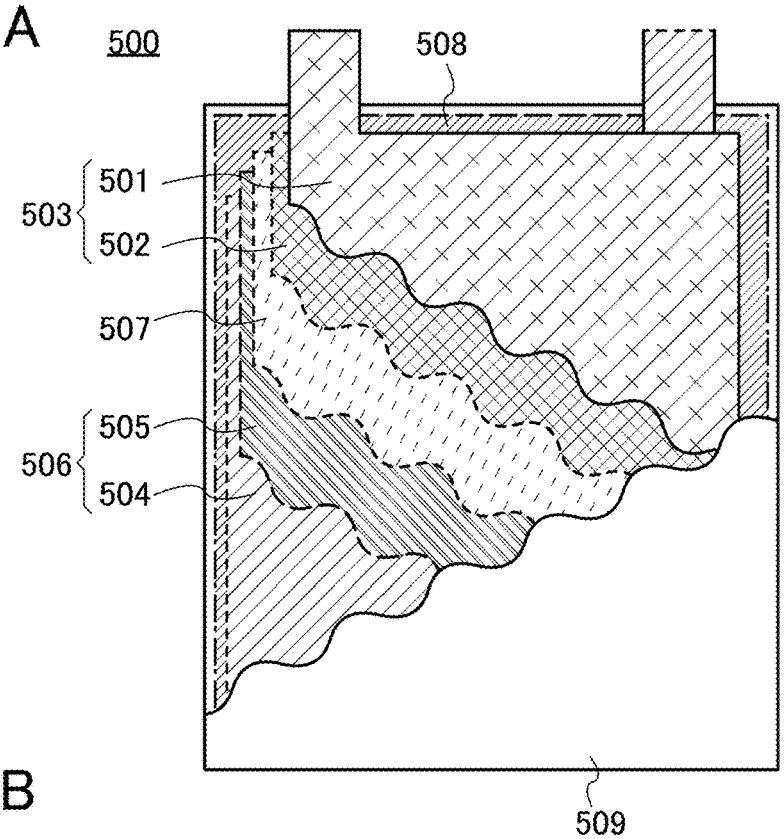
FIG. 23A and FIG. 23B are diagrams illustrating a laminated secondary battery.

A laminated secondary battery 500 illustrated in FIG. 23A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used as the electrolyte solution 508.

In the laminated secondary battery 500 illustrated in FIG. 23A, the positive electrode current collector 501 and the negative electrode current collector 504 also serve as terminals for electrical contact with the outside. For this reason, the positive electrode current collector 501 and the negative electrode current collector 504 may be arranged so that part of the positive electrode current collector 501 and part of the negative electrode current collector 504 are exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

As the exterior body 509 of the laminated secondary battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 23B:
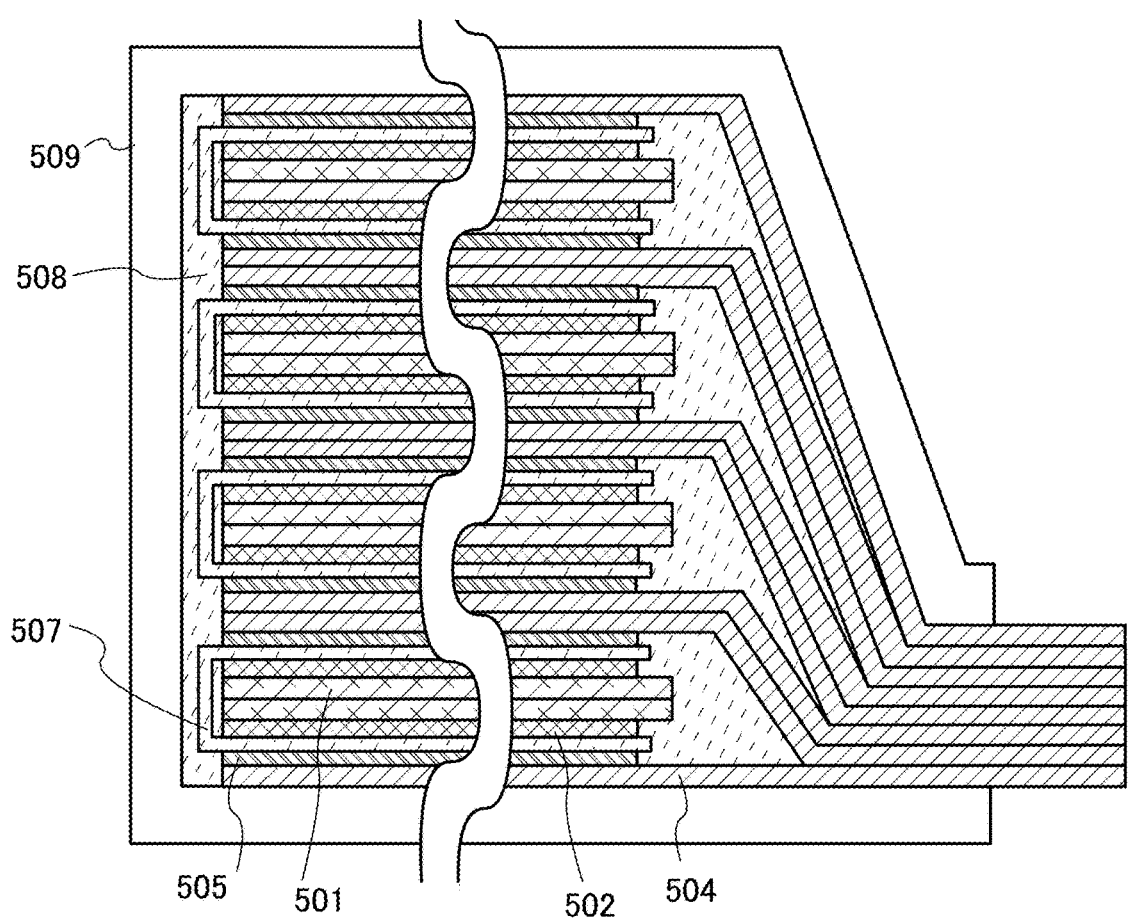

FIG. 23B shows an example of a cross-sectional structure of the laminated secondary battery 500. Although FIG. 23A shows an example in which only two current collectors are included for simplicity, an actual battery includes a plurality of electrode layers as illustrated in FIG. 23B.

In FIG. 23B, the number of electrode layers is 16, for example. The laminated secondary battery 500 has flexibility even though including 16 electrode layers. FIG. 23B illustrates a structure including 8 layers of negative electrode current collectors 504 and 8 layers of positive electrode current collectors 501, i.e., 16 layers in total. Note that FIG. 23B illustrates a cross section of the lead portion of the negative electrode, and the 8 layers of the negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. In contrast, with a small number of electrode layers, the secondary battery can have small thickness and high flexibility.

Figure 24:
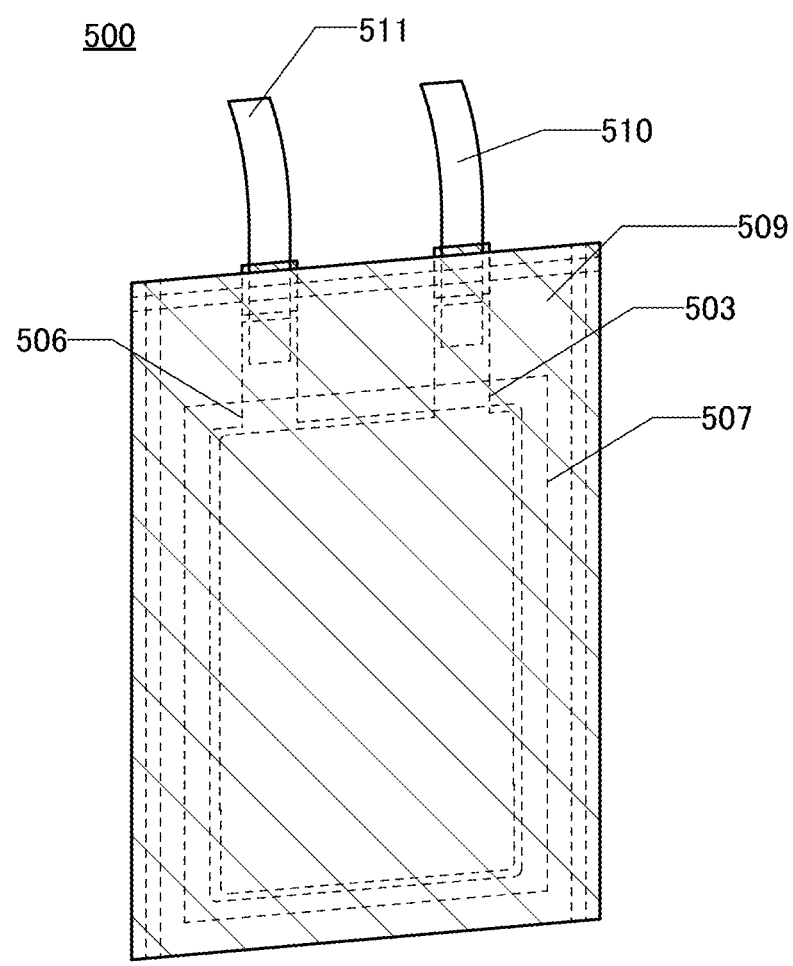
FIG. 24 is a diagram illustrating an external view of a secondary battery.
Figure 25:
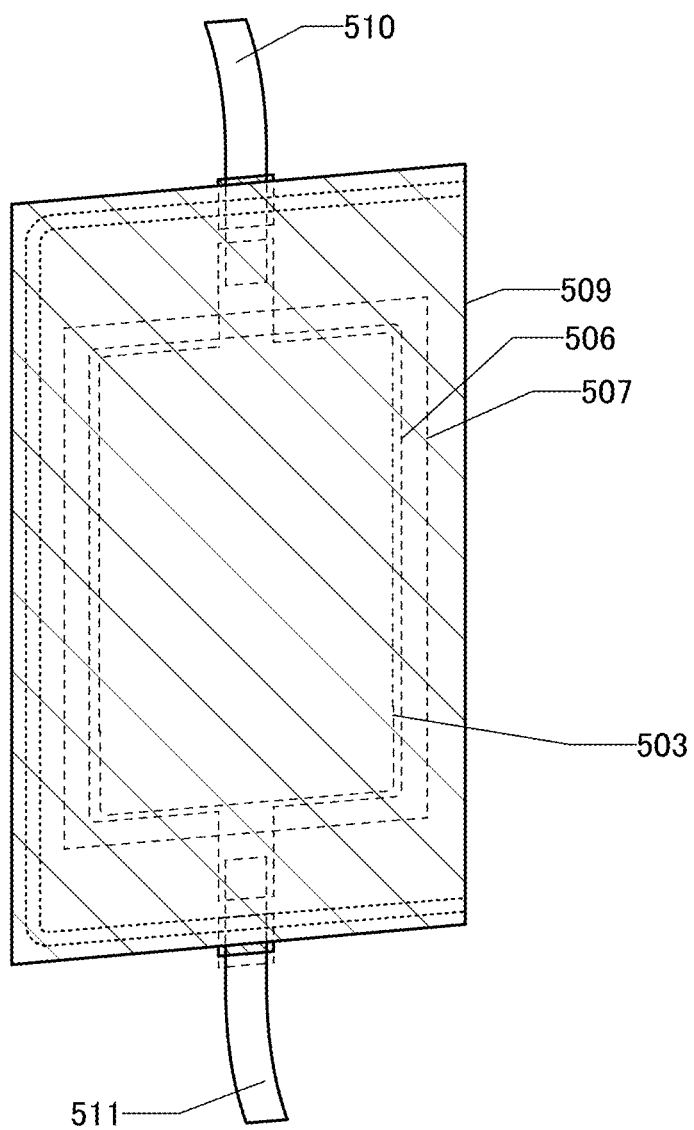
FIG. 25 is a diagram illustrating an external view of a secondary battery.

FIG. 24 and FIG. 25 each show an example of the external view of the laminated secondary battery 500. In FIG. 24 and FIG. 25, the laminated secondary battery 500 includes the positive electrode 503, the negative electrode 506, the separator 507, the exterior body 509, a positive electrode lead electrode 510, and a negative electrode lead electrode 511.

Figure 26A:
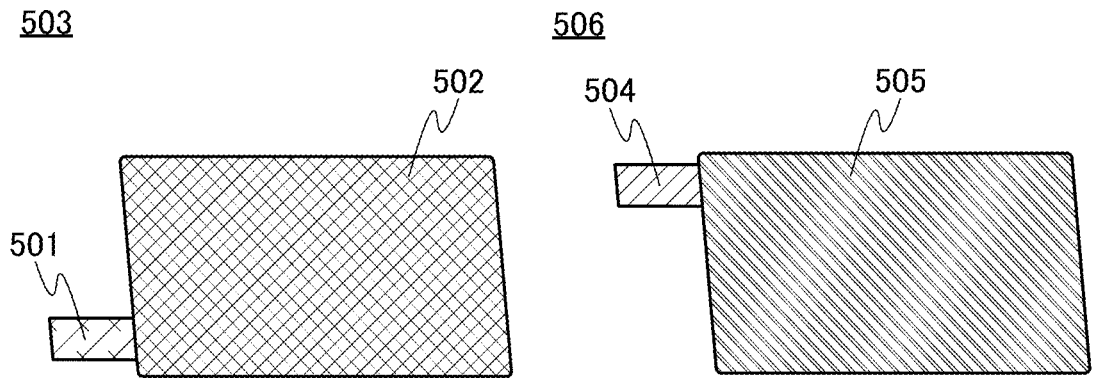
FIG. 26A to FIG. 26C are diagrams illustrating a manufacturing method of a secondary battery.

FIG. 26A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 26A.

[Method for Manufacturing Laminated Secondary Battery]

Figure 26B:
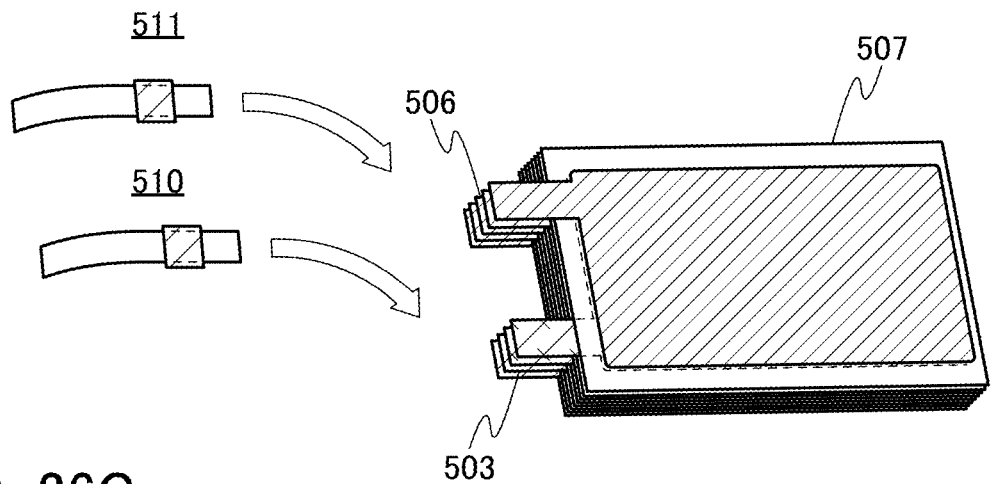

Here, an example of a method for manufacturing the laminated secondary battery whose external view is illustrated in FIG. 24 is described with reference to FIG. 26B and FIG. 26C.

First, the negative electrode 506, the separator 507, and the positive electrode 503 are stacked. FIG. 26B illustrates a stack including the negative electrode 506, the separator 507, and the positive electrode 503. Here, an example in which 5 negative electrodes and 4 positive electrodes are used is shown. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Figure 26C:
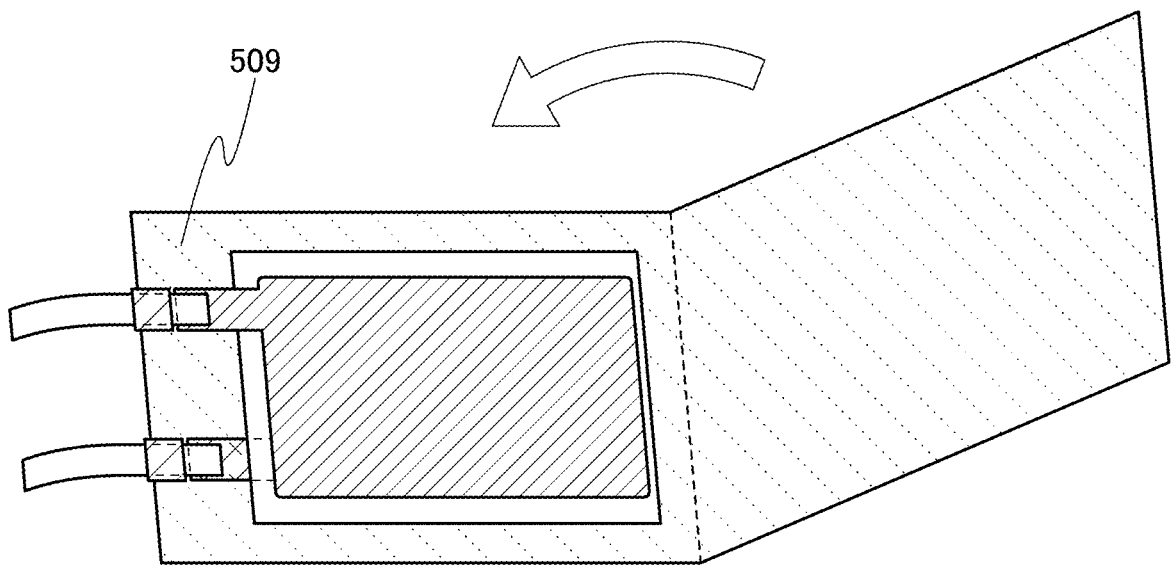

Subsequently, the exterior body 509 is folded along a dashed line as illustrated in FIG. 26C. Then, the outer edges of the exterior body 509 are bonded to each other. The bonding can be performed by thermocompression, for example. At this time, an unbonded region (hereinafter referred to as an inlet) is provided for part (or one side) of the exterior body 509 so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert gas atmosphere. Lastly, the inlet is sealed by bonding. In the above manner, the laminated secondary battery 500 can be manufactured.

When the positive electrode active material described in the above embodiment is used in the positive electrode 503, the secondary battery 500 with high capacity and excellent cycle performance can be obtained.

[Bendable Secondary Battery]

Next, an example of a bendable secondary battery is described with reference to FIG. 27 and FIG. 28.

Figure 27A:
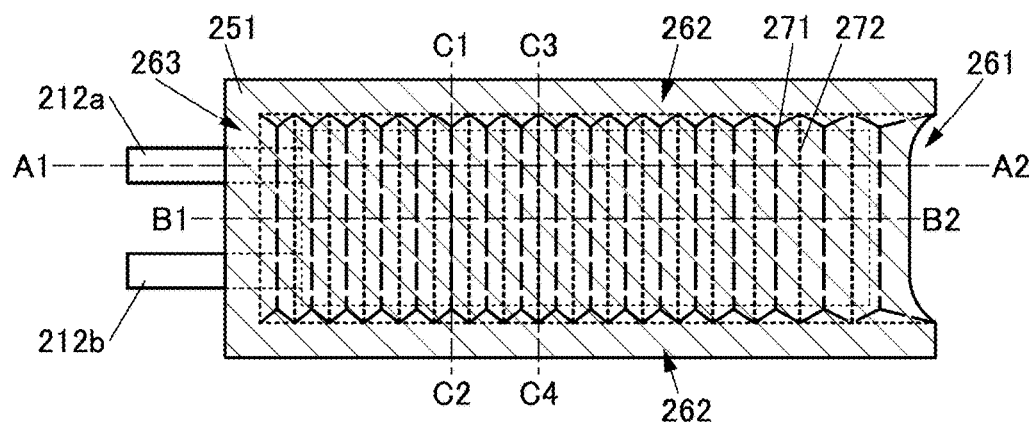
FIG. 27A to FIG. 27E are diagrams illustrating a bendable secondary battery.
Figure 27B:
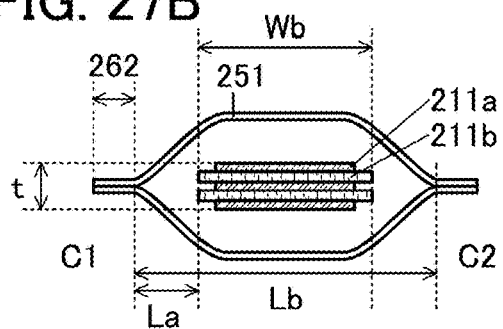
Figure 27C:
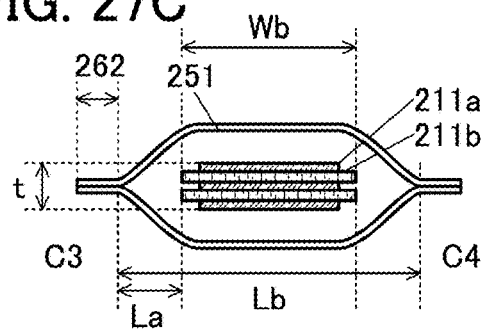
Figure 27D:
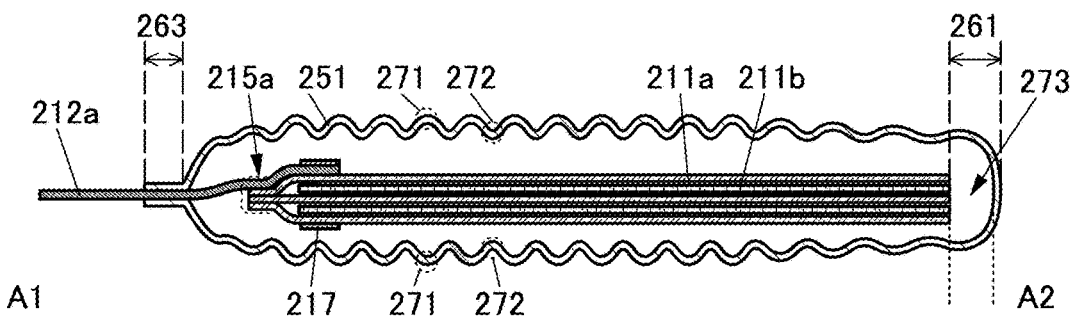

FIG. 27A is a schematic top view of a bendable secondary battery 250. FIG. 27B, FIG. 27C, and FIG. 27D are schematic cross-sectional views taken along the cutting line C1-C2, the cutting line C3-C4, and the cutting line A1-A2, respectively, in FIG. 27A. The secondary battery 250 includes an exterior body 251 and a positive electrode 211a and a negative electrode 211b held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 28A:
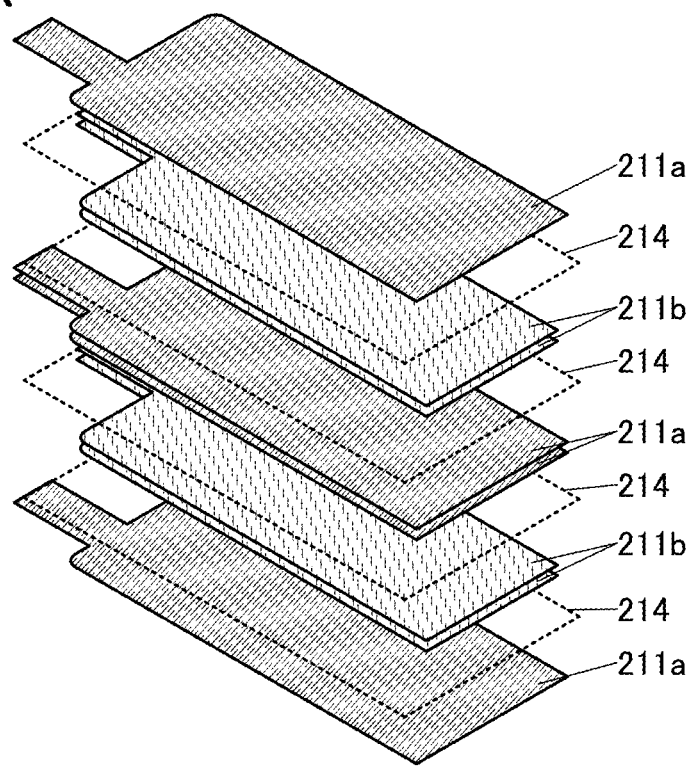
FIG. 28A and FIG. 28B are diagrams illustrating a bendable secondary battery.
Figure 28B:
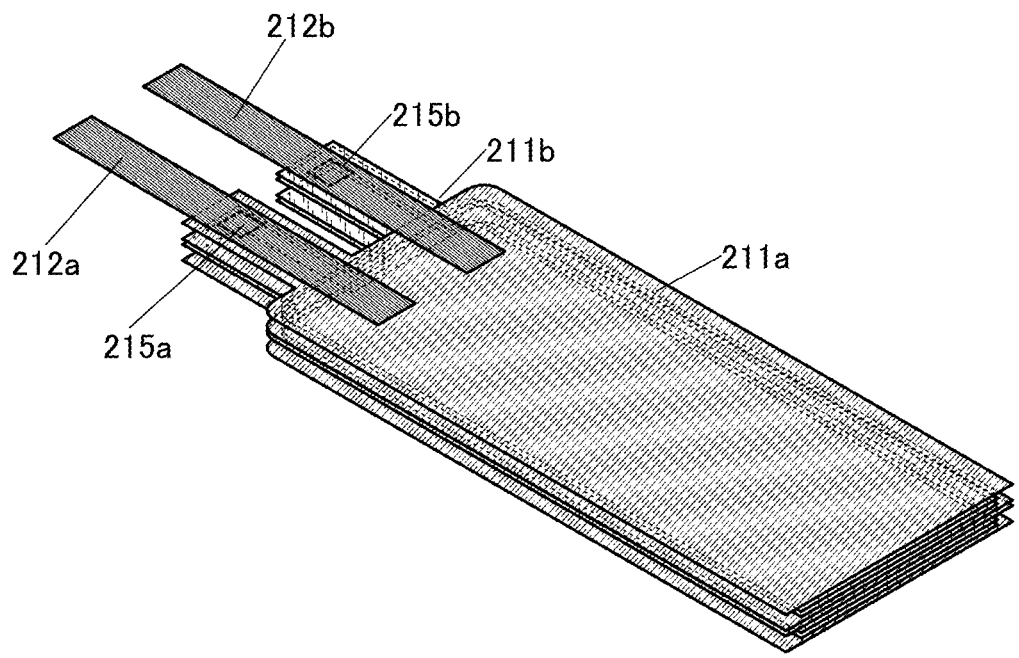

The positive electrode 211a and the negative electrode 211b included in the secondary battery 250 are described with reference to FIG. 28. FIG. 28A is a perspective view illustrating the stacking order of the positive electrode 211a, the negative electrode 211b, and a separator 214. FIG. 28B is a perspective view illustrating the lead 212a and the lead 212b in addition to the positive electrode 211a and the negative electrode 211b.

As illustrated in FIG. 28A, the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab. A positive electrode active material layer is formed on one surface of the positive electrode 211a other than the tab, and a negative electrode active material layer is formed on one surface of the negative electrode 211b other than the tab.

The positive electrodes 211a and the negative electrodes 211b are stacked so that surfaces of the positive electrodes 211a on each of which the positive electrode active material layer is not formed are in contact with each other and that surfaces of the negative electrodes 211b on each of which the negative electrode active material is not formed are in contact with each other.

Furthermore, the separator 214 is provided between the surface of the positive electrode 211a on which the positive electrode active material is formed and the surface of the negative electrode 211b on which the negative electrode active material is formed. In FIG. 28, the separator 214 is shown by a dotted line for easy viewing.

In addition, as illustrated in FIG. 28B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIG. 27B, FIG. 27C, FIG. 27D, and FIG. 27E.

The exterior body 251 has a film-like shape and is folded in half so as to sandwich the positive electrodes 211a and the negative electrodes 211b. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 includes portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 27B shows a cross section along the part overlapping with the crest line 271. FIG. 27C shows a cross section along the part overlapping with the trough line 272. FIG. 27B and FIG. 27C correspond to cross sections of the secondary battery 250, the positive electrodes 211a, and the negative electrodes 211b in the width direction.

Here, the distance between end portions of the positive electrode 211a and the negative electrode 211b in the width direction and the seal portion 262, that is, the distance between the end portions of the positive electrode 211a and the negative electrode 211b and the seal portion 262 is referred to as a distance La. When the secondary battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

The distance La between the positive and negative electrodes 211a and 211b and the seal portion 262 is preferably increased as the total thickness of the stacked positive electrodes 211a and negative electrodes 211b is increased.

Specifically, when the total thickness of the stacked positive electrodes 211a, negative electrodes 211b, and separators 214 (not illustrated) is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in the above range, a compact battery highly reliable for bending can be obtained.

Furthermore, when the distance between the pair of seal portions 262 is referred to as a distance Lb, it is preferred that the distance Lb be sufficiently longer than the widths of the positive electrode 211a and the negative electrode 211b (here, a width Wb of the negative electrode 211b). In that case, even when the positive electrode 211a and the negative electrode 211b come into contact with the exterior body 251 by change in the shape of the secondary battery 250, such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance Lb, which is the distance between the pair of seal portions 262, and the width Wb of the negative electrode 211b is preferably 1.6 times or more and 6.0 times or less, further preferably 1.8 times or more and 5.0 times or less, and still further preferably 2.0 times or more and 4.0 times or less as large as the thickness t of the positive electrode 211a and the negative electrode 211b.

In other words, the distance Lb, the width Wb, and the thickness t preferably satisfy the relationship of Formula 2 below.

[Formula 2]

$$\frac{Lb - Wb}{2t} \geq a \qquad \text{(Formula 2)}$$

Here, α satisfies 0.8 or more and 3.0 or less, preferably 0.9 or more and 2.5 or less, further preferably 1.0 or more and 2.0 or less.

FIG. 27D illustrates a cross section including the lead 212a and corresponds to a cross section of the secondary battery 250, the positive electrode 211a, and the negative electrode 211b in the length direction. As illustrated in FIG. 27D, a space 273 is preferably provided between the end portions of the positive electrode 211a and the negative electrode 211b in the length direction and the exterior body 251 in the folded portion 261.

Figure 27E:
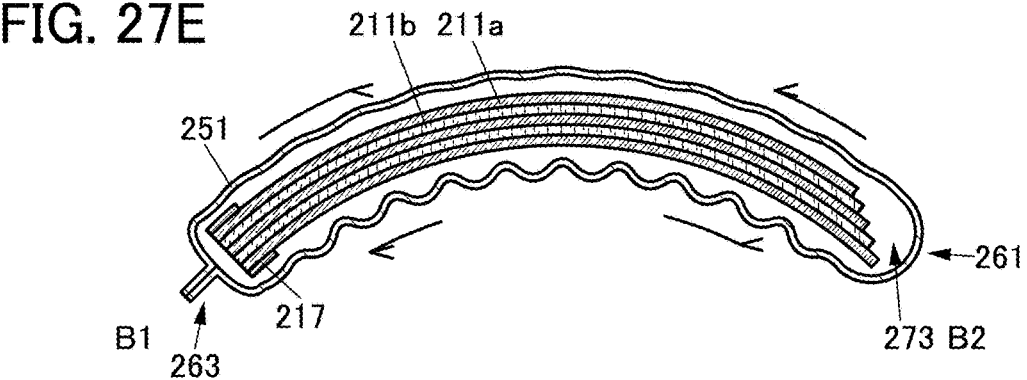

FIG. 27E is a schematic cross-sectional view of the secondary battery 250 in a state of being bent. FIG. 27E corresponds to a cross section along the cutting line B1-B2 in FIG. 27A.

When the secondary battery 250 is bent, a part of the exterior body 251 positioned on the outer side in bending is unbent and the other part positioned on the inner side changes its shape as it shrinks. More specifically, the part of the exterior body 251 positioned on the outer side changes its shape such that the wave amplitude becomes smaller and the length of the wave period becomes larger. In contrast, the part of the exterior body 251 positioned on the inner side changes its shape such that the wave amplitude becomes larger and the length of the wave period becomes smaller. When the exterior body 251 changes its shape in this manner, stress applied to the exterior body 251 due to bending is relieved, so that a material itself of the exterior body 251 does not need to expand and contract. Thus, the secondary battery 250 can be bent with weak force without damage to the exterior body 251.

Furthermore, as illustrated in FIG. 27E, when the secondary battery 250 is bent, the positions of the positive electrode 211a and the negative electrode 211b are shifted relatively. At this time, ends of the stacked positive electrodes 211a and negative electrodes 211b on the seal portion 263 side are fixed by a fixing member 217. Thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. Consequently, the secondary battery 250 can be bent without damage to the positive electrode 211a and the negative electrode 211b.

Furthermore, the space 273 is provided between the positive and negative electrodes 211a and 211b and the exterior body 251, whereby the relative positions of the positive electrode 211a and the negative electrode 211b can be shifted while the positive electrode 211a and the negative electrode 211b located on an inner side when the secondary battery 250 is bent do not come in contact with the exterior body 251.

In the secondary battery 250 illustrated in FIG. 27 and FIG. 28, the exterior body is less likely to be damaged and the positive electrode 211a and the negative electrode 211b are less likely to be damaged, for example, and the battery characteristics are less likely to deteriorate even when the secondary battery 250 is repeatedly bent and unbent. When the positive electrode active material described in the above embodiment is used in the positive electrode 211a included in the secondary battery 250, a battery with better cycle performance can be obtained.

Figure 29A:
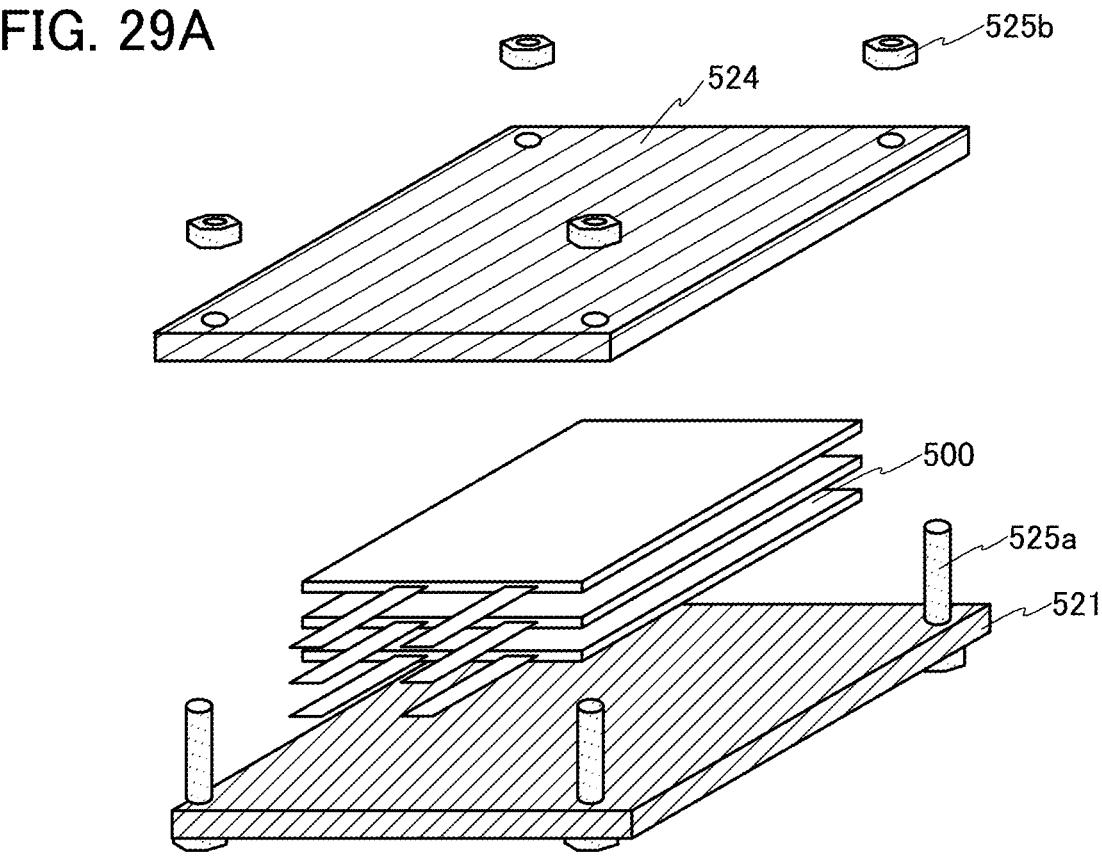
FIG. 29A and FIG. 29B are diagrams showing a secondary battery of one embodiment of the present invention and an example of a manufacturing method thereof.

FIG. 29A is a perspective view showing three laminated secondary batteries 500 sandwiched and fixed between a first plate 521 and a second plate 524. The distance between the first plate 521 and the second plate 524 is fixed using a fixation tool 525a and a fixation tool 525b as illustrated in FIG. 29B, whereby stress can be applied to the three secondary batteries 500.

Figure 29B:
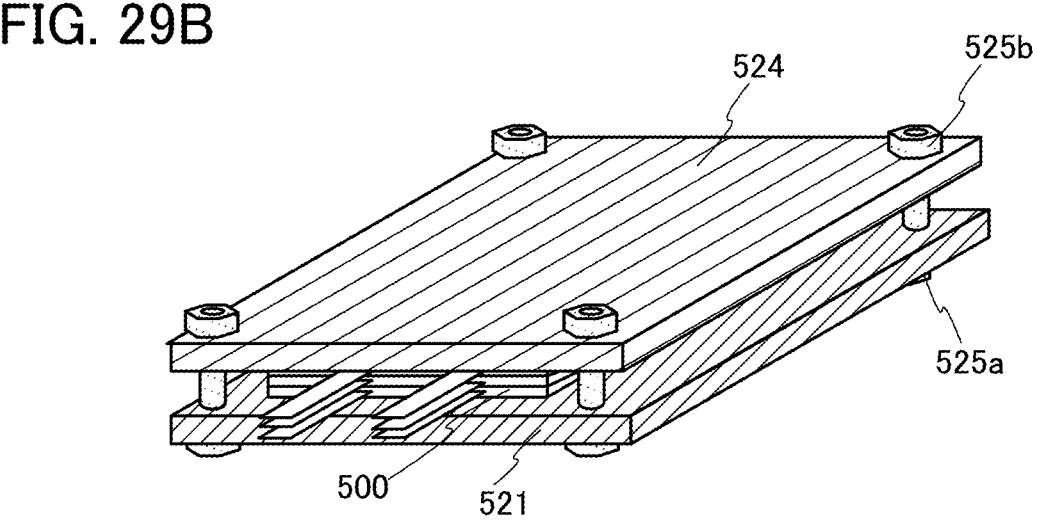

Although FIG. 29A and FIG. 29B show an example of using the three laminated secondary batteries 500, the number of secondary batteries 500 is not particularly limited and four or more secondary batteries 500 can be used. A set of ten or more secondary batteries 500 can be used as a power source for a compact vehicle, and a set of 100 or more secondary batteries 500 can be used as an in-vehicle large power source. In order to prevent overcharge, the laminated secondary battery 500 may be provided with a protection circuit or a temperature sensor for monitoring the temperature rise.

In an all-solid-state battery, the contact state of the inside interfaces can be kept favorable by applying a predetermined pressure in the direction of stacking positive electrodes and negative electrodes. By applying a predetermined pressure in the direction of stacking positive electrodes and negative electrodes, expansion in the stacking direction due to charge and discharge of the all-solid-state battery can be suppressed, and the reliability of the all-solid-state battery can be improved.

This embodiment can be implemented in appropriate combination with any of the other embodiments.

Embodiment 5

In this embodiment, examples of electronic devices each including the secondary battery of one embodiment of the present invention are described.

First, FIG. 30A to FIG. 30G show examples of electronic devices including the bendable secondary battery described in part of Embodiment 3. Examples of electronic devices each including a bendable secondary battery include television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 30A:
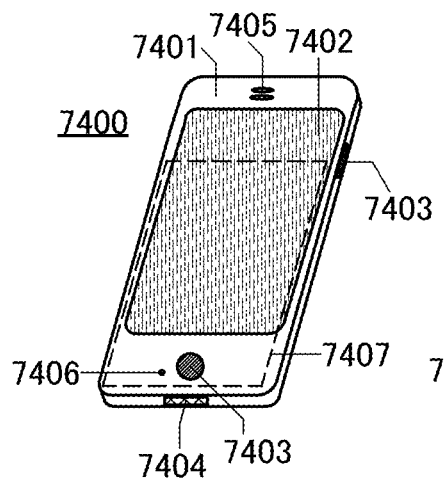
FIG. 30A to FIG. 30H are diagrams showing examples of electronic devices.

FIG. 30A shows an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 30B:
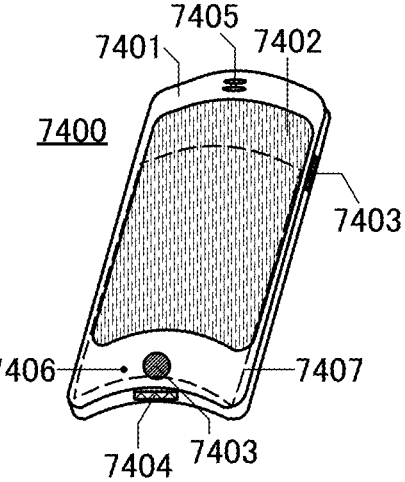
Figure 30C:
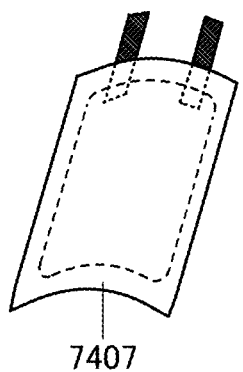

FIG. 30B illustrates the mobile phone 7400 that is bent. When the whole mobile phone 7400 is bent by the external force, the secondary battery 7407 provided therein is also bent. FIG. 30C illustrates the bent secondary battery 7407. The secondary battery 7407 is a thin storage battery. The secondary battery 7407 is fixed in a state of being bent. Note that the secondary battery 7407 includes a lead electrode electrically connected to a current collector. The current collector is, for example, copper foil, and partly alloyed with gallium; thus, adhesion between the current collector and an active material layer in contact with the current collector is improved and the secondary battery 7407 can have high reliability even in a state of being bent.

Figure 30D:
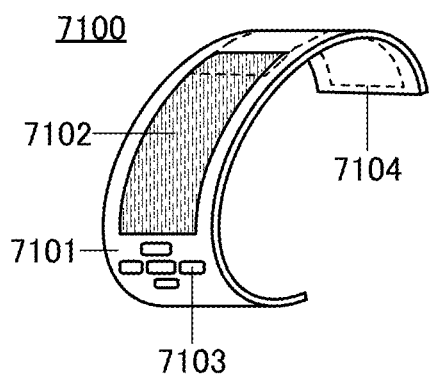
Figure 30E:

FIG. 30D shows an example of a bangle display device. A portable display device 7100 includes a housing 7101, a display portion 7102, operation buttons 7103, and a secondary battery 7104. FIG. 30E illustrates the bent secondary battery 7104. When the display device is worn on a user's arm while the secondary battery 7104 is bent, the housing changes its shape and the curvature of part or the whole of the secondary battery 7104 is changed. Note that the bending condition of a curve at a given point that is represented by a value of the radius of a corresponding circle is referred to as the radius of curvature, and the reciprocal of the radius of curvature is referred to as curvature. Specifically, part or the whole of the housing or the main surface of the secondary battery 7104 is changed in the range of radius of curvature from 40 mm or more to 150 mm or less. When the radius of curvature at the main surface of the secondary battery 7104 is in the range from 40 mm or more to 150 mm or less, the reliability can be kept high. When the secondary battery of one embodiment of the present invention is used as the secondary battery 7104, a lightweight portable display device with a long lifetime can be provided.

Figure 30F:
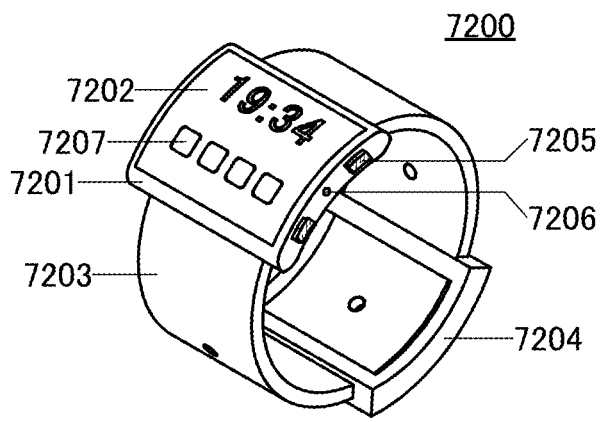

FIG. 30F shows an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charge via the input/output terminal 7206 is possible. Note that the charge operation may be performed by wireless power feeding without using the input/output terminal 7206.

The display portion 7202 of the portable information terminal 7200 includes the secondary battery of one embodiment of the present invention. When the secondary battery of one embodiment of the present invention is used, a lightweight portable information terminal with along lifetime can be provided. For example, the secondary battery 7104 illustrated in FIG. 30E that is in the state of being curved can be provided in the housing 7201. Alternatively, the secondary battery 7104 illustrated in FIG. 30E can be provided in the band 7203 such that it can be curved.

The portable information terminal 7200 preferably includes a sensor. As the sensor, for example, a human body sensor such as a fingerprint sensor, a pulse sensor, or a temperature sensor, a touch sensor, a pressure sensitive sensor, or an acceleration sensor is preferably mounted.

Figure 30G:
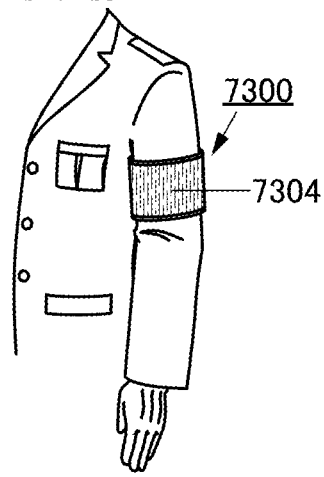

FIG. 30G shows an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input/output terminal, and data can be directly transmitted to and received from another information terminal via a connector. In addition, charge via the input/output terminal is possible. Note that the charge operation may be performed by wireless power feeding without using the input/output terminal.

When the secondary battery of one embodiment of the present invention is used as the secondary battery included in the display device 7300, a lightweight display device with a long lifetime can be provided.

In addition, examples of electronic devices each including the secondary battery with excellent cycle performance described in the above embodiment are described with reference to FIG. 30H, FIG. 31, and FIG. 32.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight stick type secondary batteries with high capacity are desired in consideration of handling ease for users.

Figure 30H:
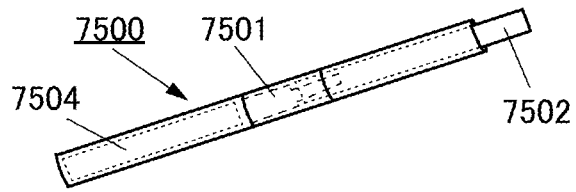

FIG. 30H is a perspective view of a device called a vaporizer (electronic cigarette). In FIG. 30H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 illustrated in FIG. 30H includes an external terminal for connection to a charger. When the electronic cigarette 7500 is held by a user, the secondary battery 7504 becomes a tip portion; thus, it is preferred that the secondary battery 7504 have a short total length and be lightweight. With the secondary battery of one embodiment of the present invention, which has high capacity and excellent cycle performance, the small and lightweight electronic cigarette 7500 that can be used for a long time over a long period can be provided.

Figure 31A:
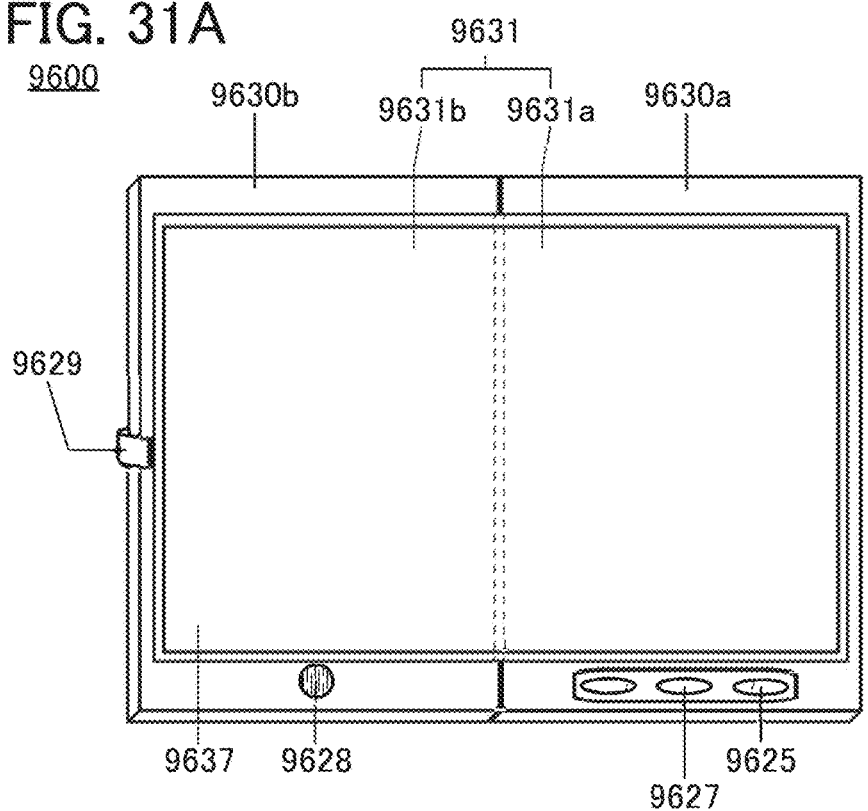
FIG. 31A to FIG. 31C are diagrams showing an example of an electronic device.
Figure 31B:
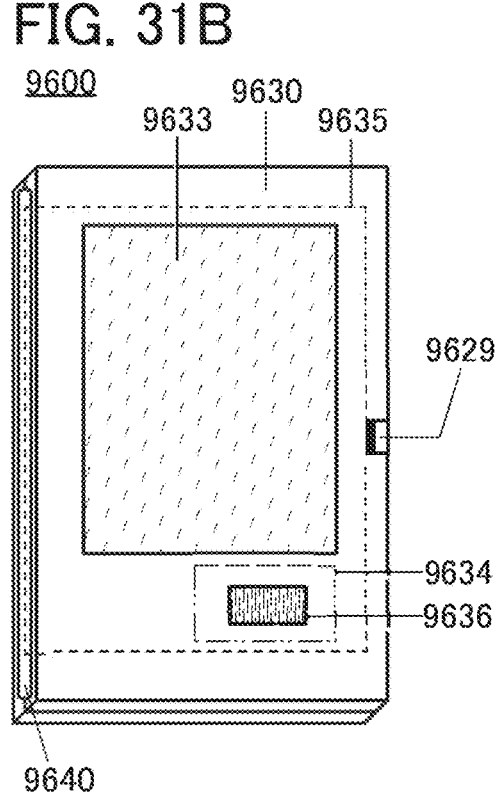

Next, FIG. 31A and FIG. 31B show an example of a tablet terminal that can be folded in half A tablet terminal 9600 illustrated in FIG. 31A and FIG. 31B includes a housing 9630a, a housing 9630b, a movable portion 9640 connecting the housing 9630a and the housing 9630b to each other, a display portion 9631 including a display portion 9631a and a display portion 9631b, a switch 9625 to a switch 9627, a fastener 9629, and an operation switch 9628. A flexible panel is used for the display portion 9631, whereby a tablet terminal with a larger display portion can be provided. FIG. 31A illustrates the tablet terminal 9600 that is opened, and FIG. 31B illustrates the tablet terminal 9600 that is closed.

The tablet terminal 9600 includes a power storage unit 9635 inside the housing 9630a and the housing 9630b. The power storage unit 9635 is provided across the housing 9630a and the housing 9630b, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631a on the housing 9630a side, and data such as text or an image is displayed on the display portion 9631b on the housing 9630b side.

In addition, it is possible that a keyboard is displayed on the display portion 9631b on the housing 9630b side, and data such as text or an image is displayed on the display portion 9631a on the housing 9630a side. Furthermore, it is possible that a switching button for showing/hiding a keyboard on a touch panel is displayed on the display portion 9631 and the button is touched with a finger, a stylus, or the like to display keyboard buttons on the display portion 9631.

In addition, touch input can be performed concurrently in a touch panel region in the display portion 9631a on the housing 9630a side and a touch panel region in the display portion 9631b on the housing 9630b side.

The switch 9625 to the switch 9627 may function not only as an interface for operating the tablet terminal 9600 but also as an interface that can switch various functions. For example, at least one of the switch 9625 to the switch 9627 may have a function of switching on/off of the tablet terminal 9600. For another example, at least one of the switch 9625 to the switch 9627 may have a function of switching display between a portrait mode and a landscape mode and a function of switching display between monochrome display and color display. For another example, at least one of the switch 9625 to the switch 9627 may have a function of adjusting the luminance of the display portion 9631. The luminance of the display portion 9631 can be controlled in accordance with the amount of external light in use of the tablet terminal 9600 detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

FIG. 31A shows an example in which the display portion 9631a on the housing 9630a side and the display portion 9631b on the housing 9630b side have substantially the same display area; however, there is no particular limitation on the display areas of the display portion 9631a and the display portion 9631b, and the display portions may have different areas or different display quality. For example, one of the display panels may display higher definition images than the other.

The tablet terminal 9600 is folded in half in FIG. 31B. The tablet terminal 9600 includes a housing 9630, a solar cell 9633, and a charge and discharge control circuit 9634 including a DCDC converter 9636. The power storage unit of one embodiment of the present invention is used as the power storage unit 9635.

Note that as described above, the tablet terminal 9600 can be folded in half, and thus can be folded when not in use such that the housing 9630a and the housing 9630b overlap with each other. Thus, the display portion 9631 can be protected owing to the holding, which increases the durability of the tablet terminal 9600. With the power storage unit 9635 including the secondary battery of one embodiment of the present invention, which has high capacity and excellent cycle performance, the tablet terminal 9600 that can be used for a long time over a long period can be provided.

The tablet terminal 9600 illustrated in FIG. 31A and FIG. 31B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal 9600, supplies electric power to a touch panel, a display portion, a video signal processing portion, and the like. Note that the solar cell 9633 can be provided on one surface or both surfaces of the housing 9630 and the power storage unit 9635 can be charged efficiently. The use of a lithium-ion battery as the power storage unit 9635 brings an advantage such as a reduction in size.

Figure 31C:
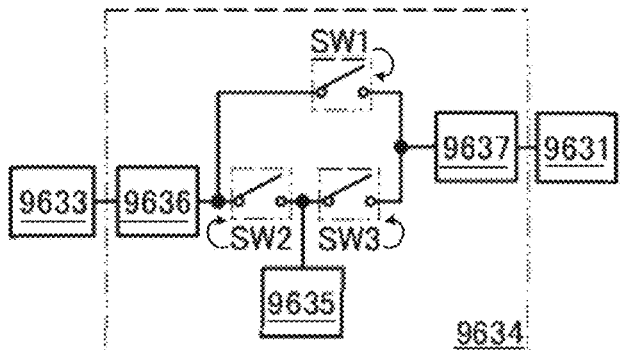

The structure and operation of the charge and discharge control circuit 9634 illustrated in FIG. 31B are described with reference to a block diagram in FIG. 31C. The solar cell 9633, the power storage unit 9635, the DCDC converter 9636, a converter 9637, switches SW1 to SW3, and the display portion 9631 are illustrated in FIG. 31C, and the power storage unit 9635, the DCDC converter 9636, the converter 9637, and the switches SW1 to SW3 correspond to the charge and discharge control circuit 9634 illustrated in FIG. 31B.

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage is raised or lowered by the converter 9637 to a voltage needed for the display portion 9631. When display on the display portion 9631 is not performed, the switch SW1 is turned off and the switch SW2 is turned on, so that the power storage unit 9635 is charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the charge may be performed with a non-contact power transmission module that performs charge by transmitting and receiving power wirelessly (without contact), or with a combination of other charge units.

Figure 32:
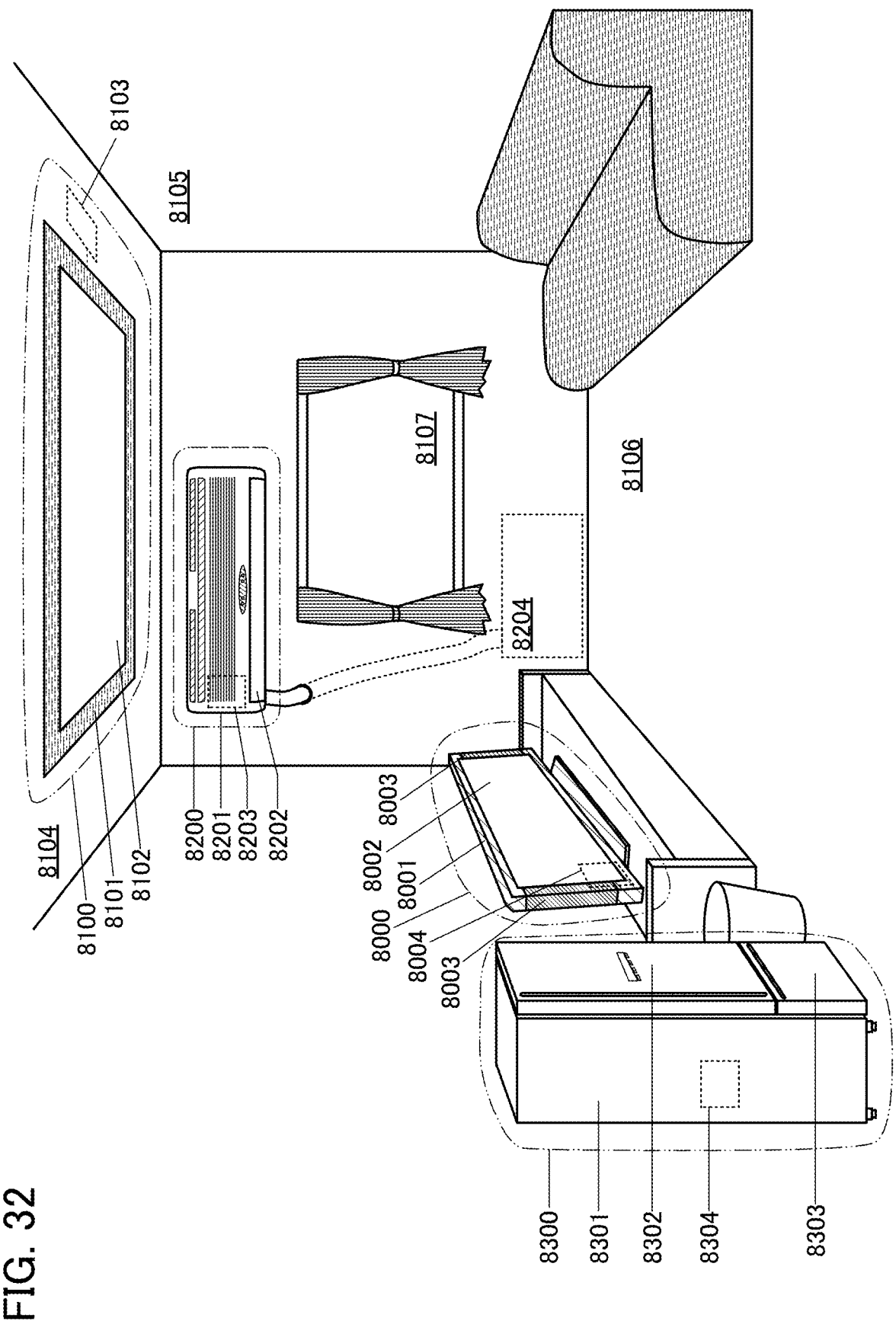
FIG. 32 is a diagram showing examples of electronic devices.

FIG. 32 illustrates other examples of electronic devices. In FIG. 32, a display device 8000 is an example of an electronic device including a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply and can use electric power stored in the secondary battery 8004. Thus, the display device 8000 can be operated with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

Note that the display device includes, in its category, all of information display devices for personal computers, advertisement displays, and the like besides TV broadcast reception.

In FIG. 32, an installation lighting device 8100 is an example of an electronic device including a secondary battery 8103 of one embodiment of the present invention. Specifically, the lighting device 8100 includes a housing 8101, alight source 8102, the secondary battery 8103, and the like. Although FIG. 32 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply and can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 32 as an example, the secondary battery of one embodiment of the present invention can be used in an installation lighting device provided in, for example, a side wall 8105, a floor 8106, or a window 8107 other than the ceiling 8104, and can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 32, an air conditioner including an indoor unit 8200 and an outdoor unit 8204 is an example of an electronic device including a secondary battery 8203 of one embodiment of the present invention. Specifically, the indoor unit 8200 includes a housing 8201, an air outlet 8202, the secondary battery 8203, and the like. Although FIG. 32 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply and can use electric power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 32 as an example, the secondary battery of one embodiment of the present invention can be used in an air conditioner in which the function of an indoor unit and the function of an outdoor unit are integrated in one housing.

In FIG. 32, an installation lighting device 8100 is an example of an electronic device including a secondary battery 8103 of one embodiment of the present invention. Specifically, the lighting device 8100 includes a housing 8101, a light source 8102, the secondary battery 8103, and the like. Although FIG. 32 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply and can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the secondary battery of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion is referred to as a usage rate of electric power) is low, electric power is stored in the secondary battery, whereby the usage rate of electric power can be reduced in a time period other than the above time period. For example, in the case of the electric refrigerator-freezer 8300, electric power is stored in the secondary battery 8304 in night time when the temperature is low and the refrigerator door 8302 and the freezer door 8303 are not opened or closed. On the other hand, in daytime when the temperature is high and the refrigerator door 8302 and the freezer door 8303 are opened and closed, the secondary battery 8304 is used as an auxiliary power supply; thus, the usage rate of electric power in daytime can be reduced.

According to one embodiment of the present invention, the secondary battery can have excellent cycle performance and improved reliability. Furthermore, according to one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained.

This embodiment can be implemented in appropriate combination with the other embodiments.

Embodiment 6

In this embodiment, examples of vehicles each including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 33A:
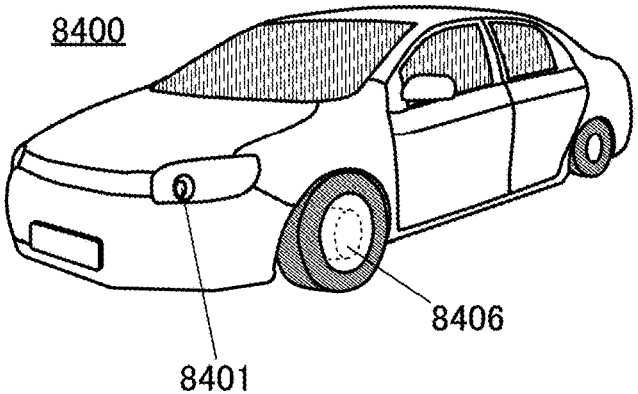
FIG. 33A to FIG. 33C are diagrams showing examples of vehicles.

FIG. 33 illustrates examples of a vehicle including the secondary battery of one embodiment of the present invention. An automobile 8400 illustrated in FIG. 33A is an electric vehicle that runs on the power of an electric motor. Alternatively, the automobile 8400 is a hybrid electric vehicle capable of running on the power of either an electric motor or an engine as appropriate. The use of one embodiment of the present invention allows fabrication of a high-mileage vehicle. The automobile 8400 includes the secondary battery. As the secondary battery, the modules of the secondary batteries illustrated in FIG. 17C and FIG. 17D may be arranged to be used in a floor portion in the automobile. Alternatively, a battery pack in which a plurality of secondary batteries each of which is illustrated in FIG. 20 are combined may be placed in the floor portion in the automobile. The secondary battery is used not only for driving an electric motor 8406, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 33B:
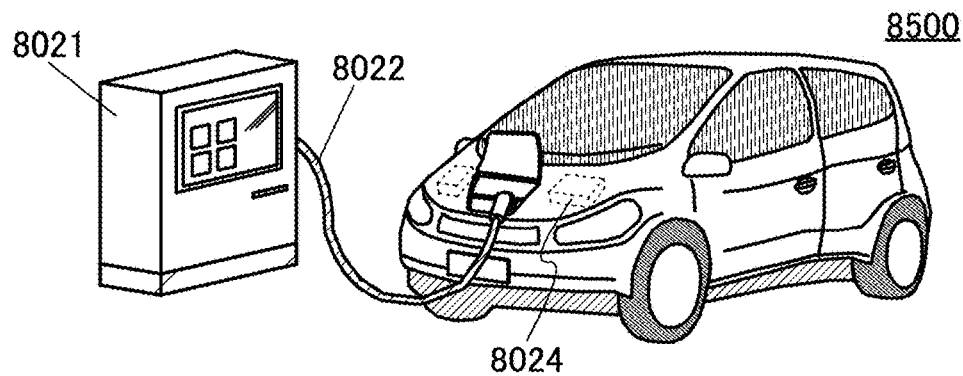

An automobile 8500 illustrated in FIG. 33B can be charged when the secondary battery included in the automobile 8500 is supplied with electric power through external charge equipment by a plug-in system, a contactless power feeding system, or the like. FIG. 33B illustrates a state where a secondary battery 8024 included in the automobile 8500 is charged with the use of a ground-based charge apparatus 8021 through a cable 8022. In charge, a given method such as CHAdeMO (registered trademark) or Combined Charging System may be employed as a charge method, the standard of a connector, or the like as appropriate. The charge apparatus 8021 may be a charge station provided in a commerce facility or a power source in a house. For example, with the use of a plug-in technique, the secondary battery 8024 included in the automobile 8500 can be charged by being supplied with electric power from outside. The charge can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 33C:
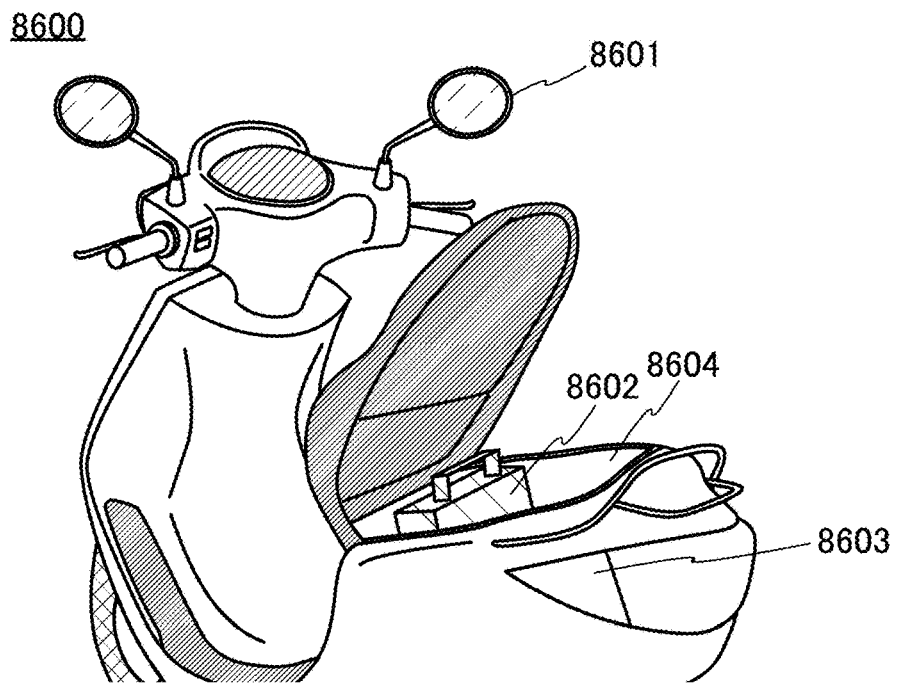

FIG. 33C shows an example of a motorcycle including the secondary battery of one embodiment of the present invention. A motor scooter 8600 illustrated in FIG. 33C includes a secondary battery 8602, side mirrors 8601, and direction indicators 8603. The secondary battery 8602 can supply electric power to the direction indicators 8603.

Furthermore, in the motor scooter 8600 illustrated in FIG. 33C, the secondary battery 8602 can be held in a storage unit under seat 8604. The secondary battery 8602 can be held in the storage unit under seat 8604 even when the storage unit under seat 8604 is small. The secondary battery 8602 is detachable; thus, the secondary battery 8602 is carried indoors when charged, and is stored before the motor scooter is driven.

According to one embodiment of the present invention, the secondary battery can have improved cycle performance and the capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle performance can be used over a long period; thus, the use amount of rare metals typified by cobalt can be reduced.

This embodiment can be implemented in appropriate combination with any of the other embodiments.

Example 1

<Formation of Positive Electrode Active Material>

Positive electrode active materials were formed with reference to the flowchart in FIG. 10 so that when the number of cobalt atoms is 100, the numbers of magnesium atoms, nickel atoms, and aluminum atoms are those listed in Table 1.

TABLE 1

| Mg | Ni | Al |
|---|---|---|
| 0.5 | 0.25 | 0.25 |
| | 0.5 | 0.5 |
| | 1 | 1 |
| 1 | 0.25 | 0.25 |
| | 0.5 | 0.5 |
| | 1 | 0.5 |
| 2 | 0.1 | 0.25 |
| | 0.1 | 0.5 |
| | 0.25 | 0.25 |
| | 0.5 | 0.1 |
| | 0.5 | 0.5 |
| | 0.65 | 0.65 |
| | 0.75 | 0.5 |
| | 0.75 | 0.75 |
| | 0.9 | 0.5 |
| | 1 | 0.5 |
| | 1 | 1 |
| | 1.2 | 0.5 |
| | 1.5 | 0.5 |

First, through Step S11 to Step S13, the mixture 902 containing magnesium and fluorine was formed. Note that LiF and MgF$_2$ were weighted so that the molar ratio of LiF to MgF$_2$ was LiF:MgF$_2$=1:3, and the materials were mixed and ground by a dry method. The mixing and the grinding were performed in a ball mill using a zirconia ball at 150 rpm for 1 hour. The material that has been subjected to the treatment was collected to be the mixture 902.

Next, CELLSEED C-10N manufactured by NIPPON CHEMICAL INDUSTRIAL CO., LTD. was prepared as a composite oxide (Step S24).

Then, the mixture 902 and the composite oxide were mixed (Step S31). Weighting was performed so that when the number of cobalt atoms included in the composite oxide is 100, the number of magnesium atoms included in the mixture 902 is the value listed in Table 1. The mixing was performed by a dry method. The mixing was performed in a ball mill using a zirconia ball at 150 rpm for 1 hour.

Subsequently, the material that has been subjected to the treatment was collected to obtain the mixture 903 (Step S32).

Next, the mixture 903 was put in an alumina crucible and annealed at 850° C. using a muffle furnace in an oxygen atmosphere for 60 hours (Step S33). At the time of annealing, the alumina crucible was covered with a lid. The flow rate of oxygen was 10 L/min. The temperature rise was 200° C./hr, and it took longer than or equal to 10 hours to lower the temperature. The material that has been subjected to the heat treatment was collected and then made to pass through a sieve, so that a second composite oxide was obtained (Step S34).

Next, as Step S41, nickel was added, and Step S41 to Step S44 were performed again to add aluminum. Note that samples fabricated under the condition where Step S41 to Step S44 were not performed were also fabricated.

First, nickel hydroxide that is a metal source and the second composite oxide were mixed in a ball mill. Mixing was performed so that when the number of cobalt atoms is 100, the number of nickel atoms is the value listed in Table 1. The mixing was performed in a ball mill using a zirconia ball at 150 rpm for 1 hour. After the mixing, the mixture was made to pass through a sieve with 300 amp. After that, the obtained mixture was put in an alumina crucible, the alumina crucible was covered with a lid, and annealing was performed at 850° C. for 2 hours in an oxygen atmosphere.

Figure 46:
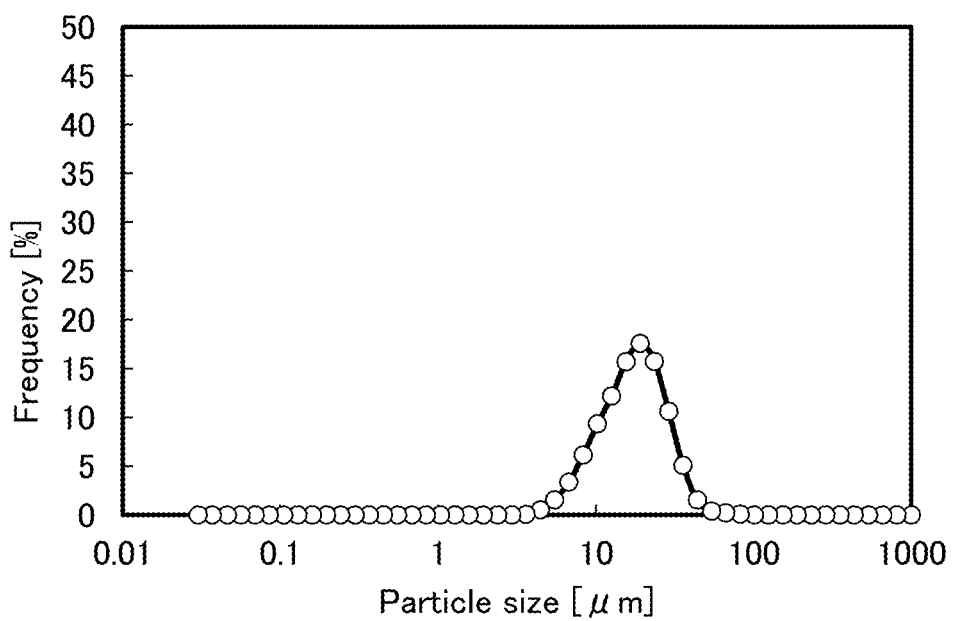
FIG. 46 shows evaluation results of a particle size distribution.

Next, a coating layer containing aluminum was formed by a sol-gel method. Al isopropoxide was used as a metal source, and 2-propanol was used as a solvent. Mixing was performed so that when the number of cobalt atoms is 100, the number of aluminum atoms is the value listed in Table 1. After that, the obtained mixture was put in an alumina crucible, the alumina crucible was covered with a lid, and annealing was performed at 850° C. for 2 hours in an oxygen atmosphere. After that, the mixture was made to pass through a sieve with 53 μmϕ and powder was collected, so that positive electrode active materials in which the conditions were varied as shown in Table 1 were obtained. FIG. 46 shows the measurement results of the particle size distribution under the condition where the numbers of magnesium atoms, nickel atoms, and aluminum atoms are 1, 0.5, and 0.5, respectively, among the obtained positive electrode active materials.

<Fabrication of Secondary Battery>

Positive electrodes were fabricated using the positive electrode active materials obtained above. A current collector that was coated with slurry in which the positive electrode active material, AB, and PVDF were mixed at the active material:AB:PVDF=95:3:2 (weight ratio) was used. As a solvent of the slurry, NMP was used.

After the current collector was coated with the slurry, the solvent was evaporated. Then, pressure was applied at 210 kN/m, and then pressure was applied at 1467 kN/m. Through the above process, the positive electrode was obtained. The carried amount of the positive electrode was approximately 7 mg/cm$^2$.

Using the fabricated positive electrodes, CR2032 type coin secondary batteries (a diameter of 20 mm, a height of 3.2 mm) were fabricated.

A lithium metal was used for a counter electrode.

As an electrolyte contained in the electrolyte solution, 1 mol/L lithium hexafluorophosphate (LiPF$_6$) was used. As the electrolyte solution, an electrolyte solution in which ethylene carbonate (EC) and diethyl carbonate (DEC) were mixed at EC:DEC=3:7 (volume ratio) was used. Note that for secondary batteries used for evaluating the cycle performance, 2 wt % of vinylene carbonate (VC) was added to the electrolytic solution.

As a separator, 25-μm-thick polypropylene was used.

A positive electrode can and a negative electrode can that are formed using stainless steel (SUS) were used.

<Cycle Performance>

Next, the cycle performance of each of the fabricated secondary batteries was evaluated. The CCCV charge (0.5 C, 4.6 V, a termination current of 0.05 C) and the CC discharge (0.5 C, 2.5 V) were repeatedly performed at 25° C., and then the cycle performance was evaluated.

Figure 34:
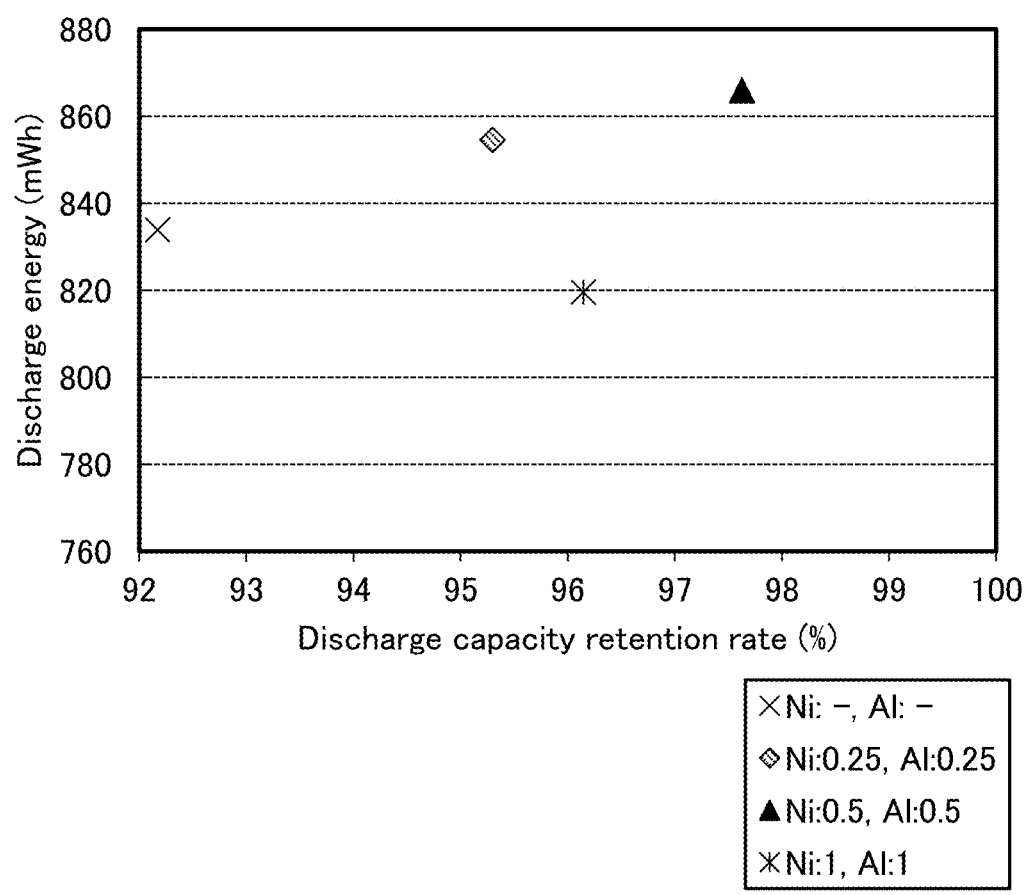
FIG. 34 is a diagram showing the relation between a discharge capacity retention rate and discharge energy of batteries.
Figure 35:
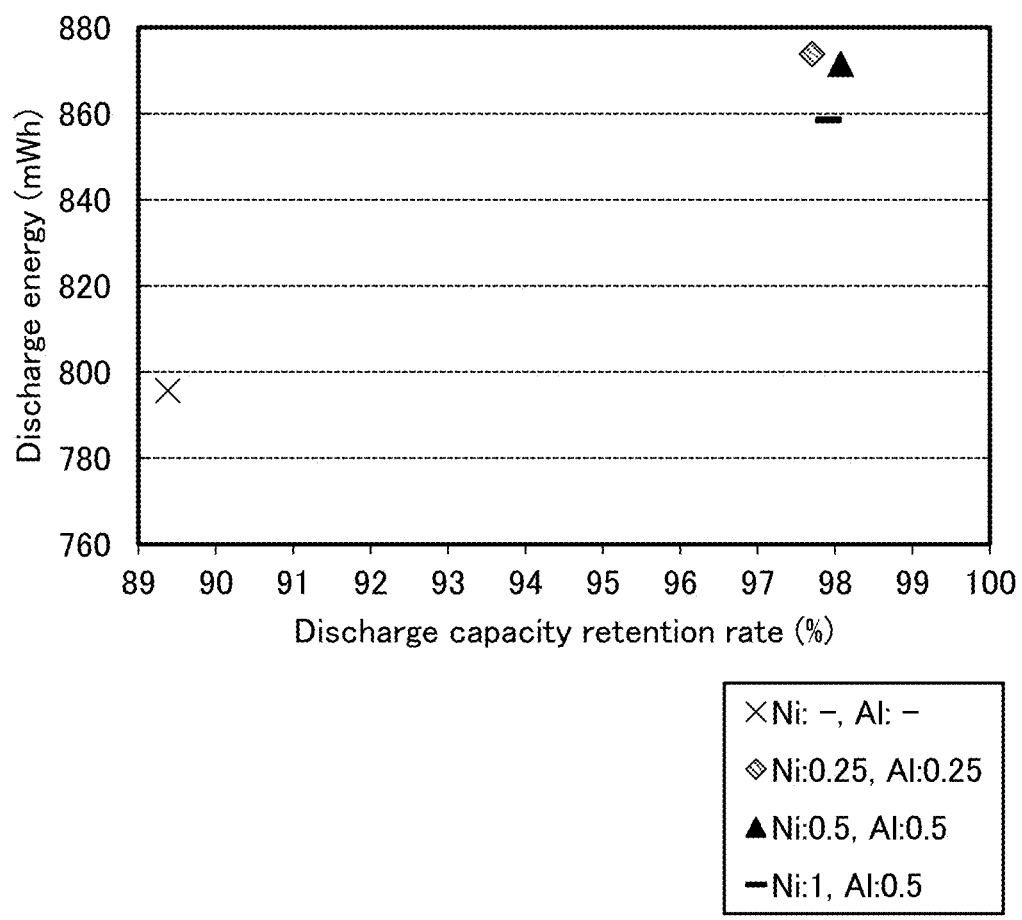
FIG. 35 is a diagram showing the relation between a discharge capacity retention rate and discharge energy of batteries.
Figure 36:
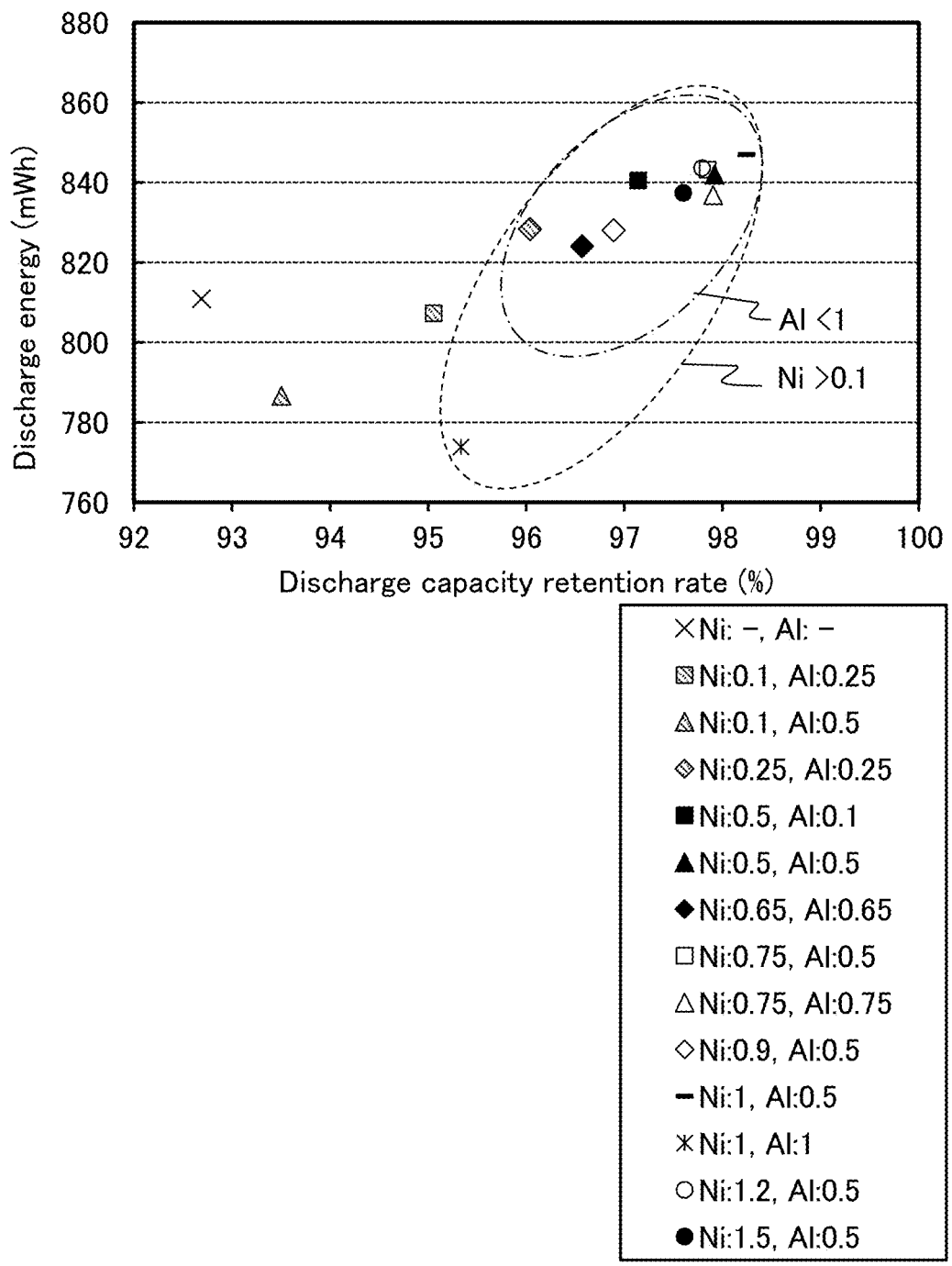
FIG. 36 is a diagram showing the relation between a discharge capacity retention rate and discharge energy of batteries.

FIG. 34 to FIG. 36 show the results of the cycle performance after 50 cycles. The horizontal axis represents a discharge capacity retention rate and the vertical axis represents discharge energy. FIG. 34, FIG. 35, and FIG. 36 summarize values in the case where the amount of magnesium is 0.5, 1.0, and 2.0, respectively, when the amount of cobalt is 100. Table 2 and Table 3 show the discharge capacity retention rate and the discharge energy, respectively, after 50 cycles in the case where the amount of magnesium is 2.0.

TABLE 2

|    |      | Al   |      |      |      |      |      |      |
|----|------|------|------|------|------|------|------|------|
|    |      | 0    | 0.1  | 0.25 | 0.5  | 0.65 | 0.75 | 1    |
| Ni | 0    | 92.7 | —    | —    | —    | —    | —    | —    |
|    | 0.1  | —    | —    | 95.1 | 93.5 | —    | —    | —    |
|    | 0.25 | —    | —    | 96.0 | —    | —    | —    | —    |
|    | 0.5  | —    | 97.1 | —    | 97.9 | —    | —    | —    |
|    | 0.65 | —    | —    | —    | —    | 96.6 | —    | —    |
|    | 0.75 | —    | —    | —    | 97.8 | —    | 97.9 | —    |
|    | 0.9  | —    | —    | —    | 96.9 | —    | —    | —    |
|    | 1    | —    | —    | —    | 98.2 | —    | —    | 95.3 |
|    | 1.2  | —    | —    | —    | 97.8 | —    | —    | —    |
|    | 1.5  | —    | —    | —    | 97.6 | —    | —    | —    |

TABLE 3

|    |      | Al  |     |      |     |      |      |     |
|----|------|-----|-----|------|-----|------|------|-----|
|    |      | 0   | 0.1 | 0.25 | 0.5 | 0.65 | 0.75 | 1   |
| Ni | 0    | 811 | —   | —    | —   | —    | —    | —   |
|    | 0.1  | —   | —   | 807  | 787 | —    | —    | —   |
|    | 0.25 | —   | —   | 828  | —   | —    | —    | —   |
|    | 0.5  | —   | 841 | —    | 842 | —    | —    | —   |
|    | 0.65 | —   | —   | —    | —   | 824  | —    | —   |
|    | 0.75 | —   | —   | —    | 843 | —    | 837  | —   |
|    | 0.9  | —   | —   | —    | 828 | —    | —    | —   |
|    | 1    | —   | —   | —    | 847 | —    | —    | 774 |
|    | 1.2  | —   | —   | —    | 844 | —    | —    | —   |
|    | 1.5  | —   | —   | —    | 837 | —    | —    | —   |

Figure 37:
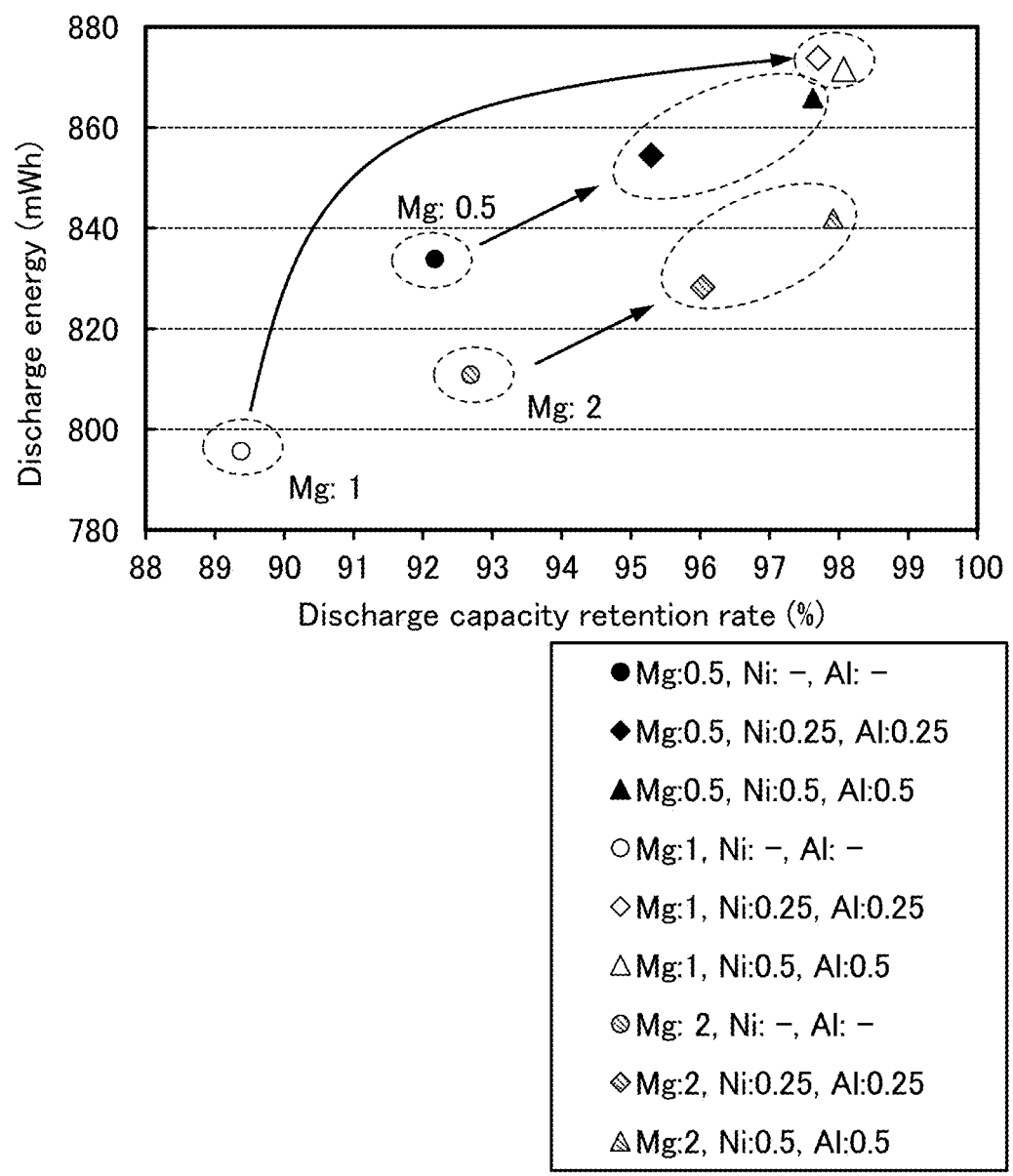
FIG. 37 is a diagram showing the relation between a discharge capacity retention rate and discharge energy of batteries.

FIG. 37 shows parts of the discharge capacity retention rate and the discharge energy under the two conditions where nickel and aluminum were both 0.25 or 0.5 and the condition where Step S41 to Step S44 were not performed and nickel and aluminum were not added (denoted as "Ni: -, Al: -" in the legend in the diagram).

Better performance was obtained under each of the conditions where the amount of nickel is greater than 0.1 and less than 1 and the amount of aluminum is greater than or equal to 0.1 and less than 1. In particular, excellent performance was obtained under the condition where the amount of magnesium is 1.

<Continuous Charge Tolerance>

Next, positive electrode active materials were formed under the condition where the number of magnesium atoms is 1.0 or 1.5 and the numbers of nickel atoms and aluminum atoms are both 0 or 0.25 when the number of cobalt atoms is 100, and secondary batteries were fabricated with reference to the above-described method and continuous charge tolerance was evaluated.

The fabricated secondary batteries using the positive electrode active materials were charged and discharged once at 25° C. As the charge, CCCV charge (0.2 C, 4.5 V, a termination current of 0.02 C) was performed and a 2-minute break was taken after the charge. As the discharge, CC discharge (0.2 C, 3.0 V) was performed and a 2-minute break was taken after the discharge.

After that, CCCV charge (0.5 C) was performed at 60° C. as continuous charge. The upper limit voltage was 4.6 V. Here, 1 C was 191.7 mA/g.

Figure 38A:
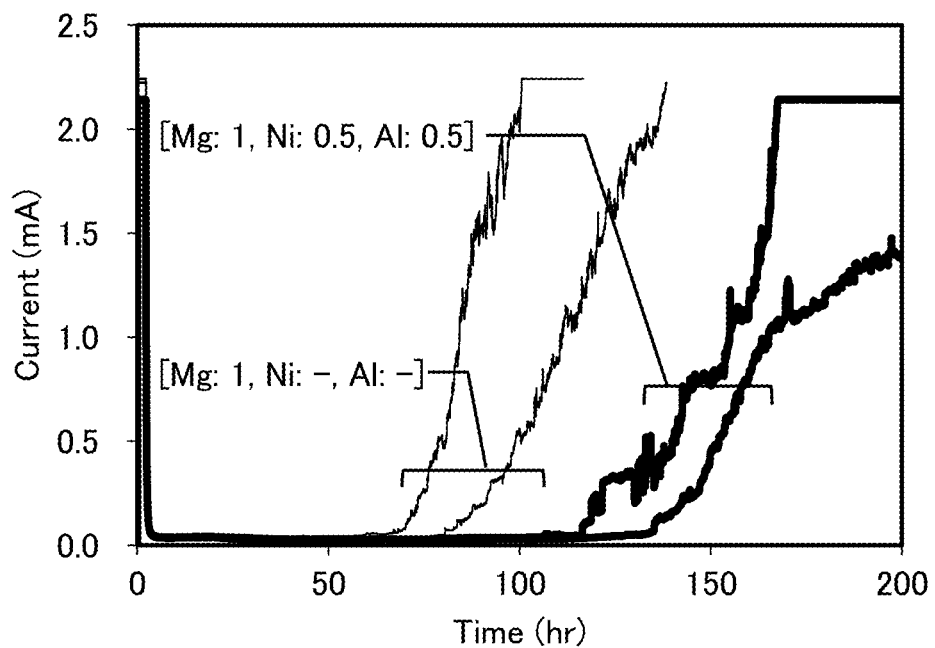
FIG. 38A and FIG. 38B show continuous charge test results of batteries.
Figure 38B:
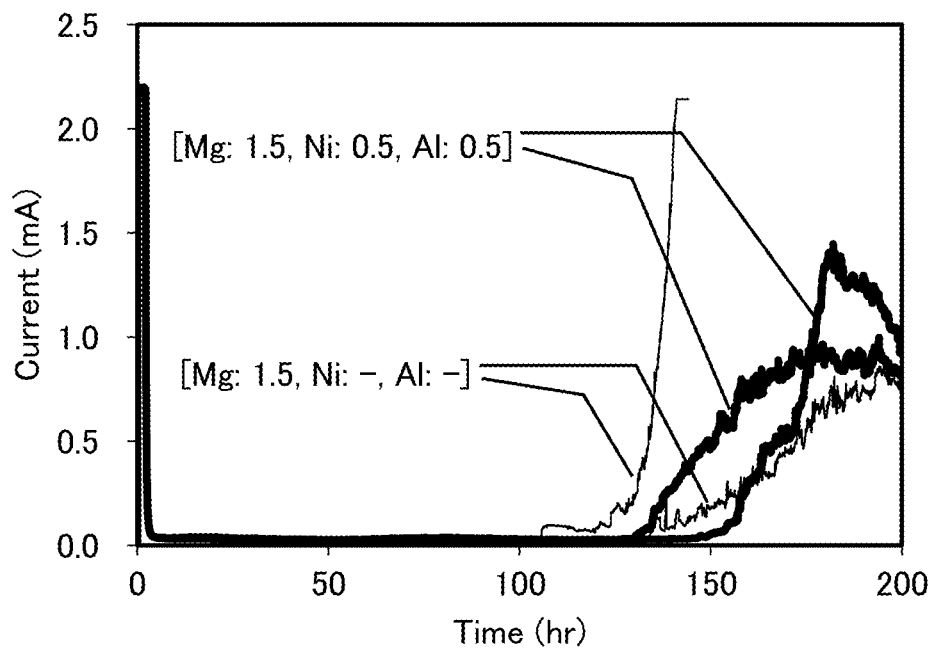

FIG. 38A shows the results of the case where the number of magnesium atoms is 1.0 and FIG. 38B shows the results of the case where the number is 1.5, when the number of cobalt atoms is 100.

Excellent continuous tolerance was obtained under the conditions where nickel and aluminum were added.

<XPS>

Positive electrode active materials were formed with reference to the above-described method so that when the number of cobalt atoms is 100, the amounts of magnesium, nickel, and aluminum satisfy four conditions listed in Table 4 (XPS-1 to XPS-4), and XPS analysis was performed.

TABLE 4

|  | Mg | Ni | Al |
|---|---|---|---|
| XPS-1 | 2 | — | — |
| XPS-2 |  | 0.5 | — |
| XPS-3 |  | — | 0.5 |
| XPS-4 |  | 0.5 | 0.5 |

Table 5 lists the concentrations of the elements obtained by XPS.

TABLE 5

| | [atomic %] | | | | | | | | | |
|---|---|---|---|---|---|---|---|---|---|---|
| | Li | Co | Ni | O | Mg | F | C | Al | Ca | Na | S |
| XPS-1 | 10.1 | 12.9 | — | 43.2 | 8.6 | 8.7 | 13.0 | — | — | 2.1 | 1.5 |
| XPS-2 | 10.3 | 13.0 | — | 43.0 | 9.4 | 8.0 | 12.3 | — | — | 2.8 | 1.3 |
| XPS-3 | 10.0 | 12.7 | — | 42.6 | 9.1 | 8.1 | 12.7 | 0.9 | — | 2.5 | 1.5 |
| XPS-4 | 8.7 | 11.6 | — | 43.3 | 9.5 | 9.3 | 12.4 | 0.5 | — | 3.6 | 1.1 |

Even under the condition where nickel was added, the amount of nickel was less than or equal to the detection lower limit in the XPS analysis. Under the condition where aluminum was added, aluminum was detected. Also the amount of aluminum was smaller than one fourth of the amount of magnesium. This indicates that aluminum may be more easily diffused in a particle than magnesium, and nickel may be more easily diffused in a particle than aluminum, for example.

<XRD Performed on Positive Electrode>

An electrode was fabricated using the positive electrode active material formed under the condition where the numbers of magnesium atoms, nickel atoms, and aluminum atoms are 1, 0.5, and 0.5, respectively, among the obtained positive electrode active materials.

The positive electrode was charged and discharged once to check the capacity, charged at 4.5 V, 4.55 V, or 4.6 V, and then subjected to XRD analysis.

As the charge to check the capacity, CCCV charge (0.2 C, 4.5 V, a termination current of 0.05 C) was performed and a 20-minute break was taken after the charge. As the discharge, CC discharge (0.2 C, 3 V) was performed and a 20-minute break was taken after the discharge. The temperature was 25° C. and 1 C was 191 mA/g.

Figure 39:
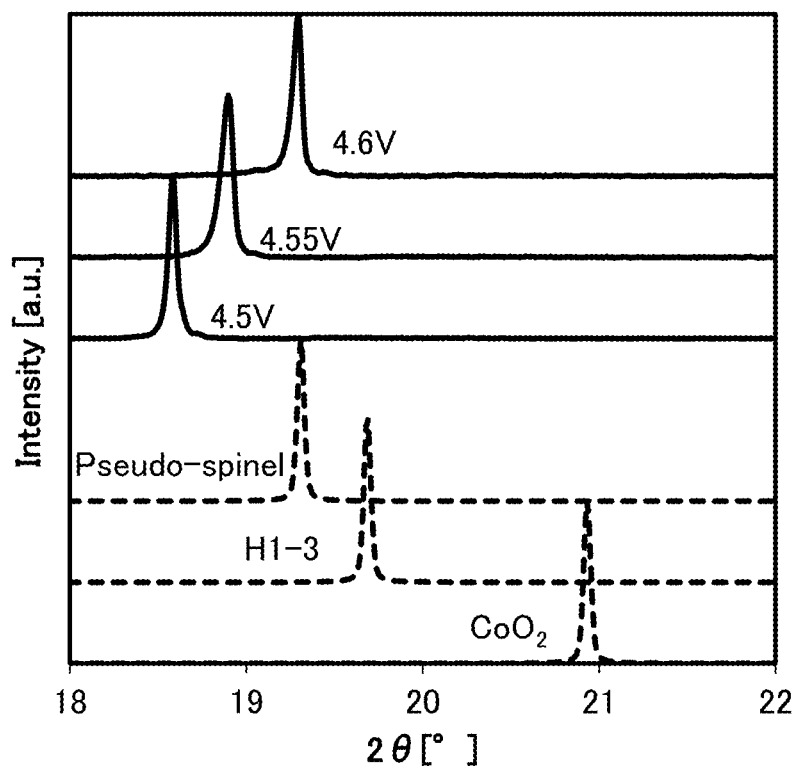
FIG. 39 shows XRD evaluation results.
Figure 40:
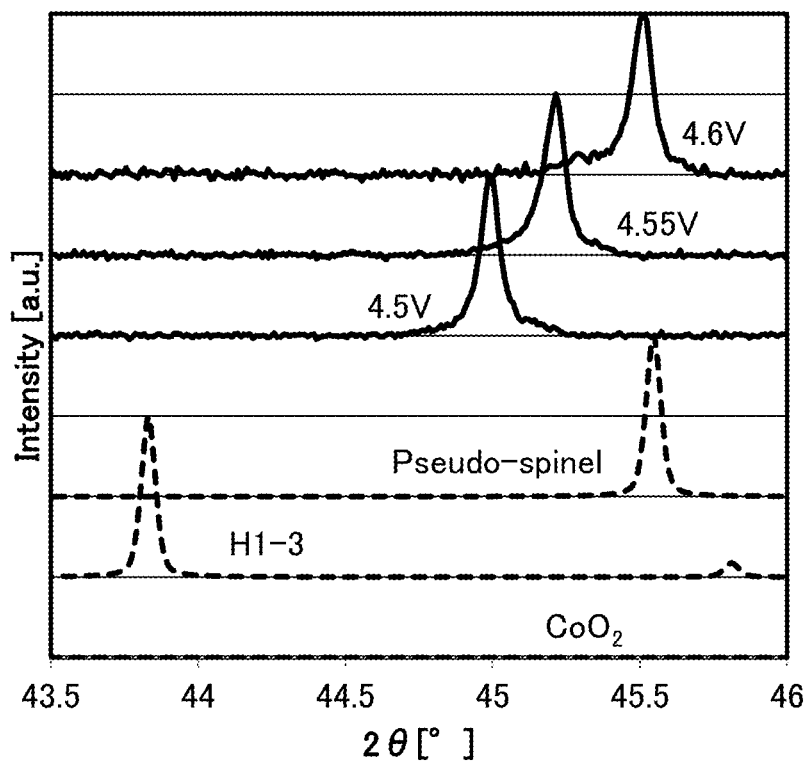
FIG. 40 shows XRD evaluation results.

After that, as the charge at 4.5 V, 4.55 V, or 4.6 V, CCCV charge (0.2 C, each of the voltages, a termination current of 0.02 C) was performed. After the charge, the secondary battery was disassembled in a glove box with an argon atmosphere to take out the positive electrode, and the positive electrode was washed with DMC. Then, the positive electrode was enclosed in airtight containers with an argon atmosphere and analyzed by XRD. FIG. 39 and FIG. 40 show the XRD results. FIG. 39 and FIG. 40 are different from each other in the range of 2θ represented by the horizontal axis.

Lattice constants were calculated from the obtained XRD results, and the lattice constants of an a-axis were 2.812, 2.814, and 2.818 [×10$^{-10}$ m] and the lattice constants of a c-axis were 14.28, 14.04, and 13.79 [×10$^{-10}$ m] at charging voltages of 4.5 V, 4.55 V, and 4.6 V, respectively.

Example 2

Next, secondary batteries were fabricated using composite oxide materials different from those in Example 1.

<Fabrication of Secondary Battery 2>

Positive electrode active materials were formed using EQ-Lib-LCO manufactured by MTI Corporation as the composite oxide used in Step S24.

The formation conditions are the following five conditions. The first condition is a condition where Step S11 to Step S13 and Step S21 to Step S24 are not performed and magnesium, nickel, and aluminum are not added (denoted as "Mg: -, Ni: -, Al: -" in FIG. 42). The second condition is a condition where the number of magnesium atoms is 1.0 when the number of cobalt atoms is 100 and nickel and aluminum are not added (Mg: 1, Ni: -, Al: -). The third condition is a condition where the number of magnesium atoms is 1.0 and the numbers of nickel atoms and aluminum atoms are each 0.25 when the number of cobalt atoms is 100 (Mg: 1, Ni: 0.25, Al: 0.25). The fourth condition is a condition where the number of magnesium atoms is 1.0 and the numbers of nickel atoms and aluminum atoms are each 0.5 when the number of cobalt atoms is 100 (Mg: 1, Ni: 0.5, Al: 0.5). The fifth condition is a condition where the numbers of magnesium atoms, nickel atoms, and aluminum atoms are each 1.0 when the number of cobalt atoms is 100 (Mg: 1, Ni: 1, Al: 1). Secondary batteries using the positive electrode active materials formed under the above conditions were fabricated with reference to the method in Example 1, and the cycle performance was evaluated. A positive electrode with a carried amount of approximately 7 mg/cm² and a positive electrode with a carried amount of approximately 20 mg/cm² were prepared. The temperature of a cycle test was 45° C., and the upper limit voltage of charge was 4.6 V.

<Cycle Performance>

Figure 41:
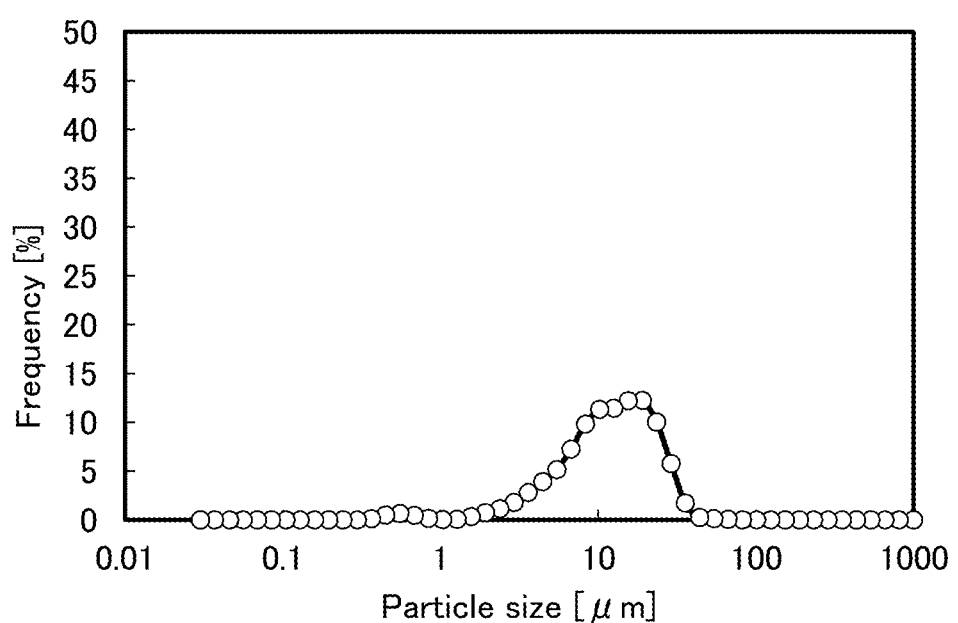
FIG. 41 shows evaluation results of a particle size distribution.
Figure 42:
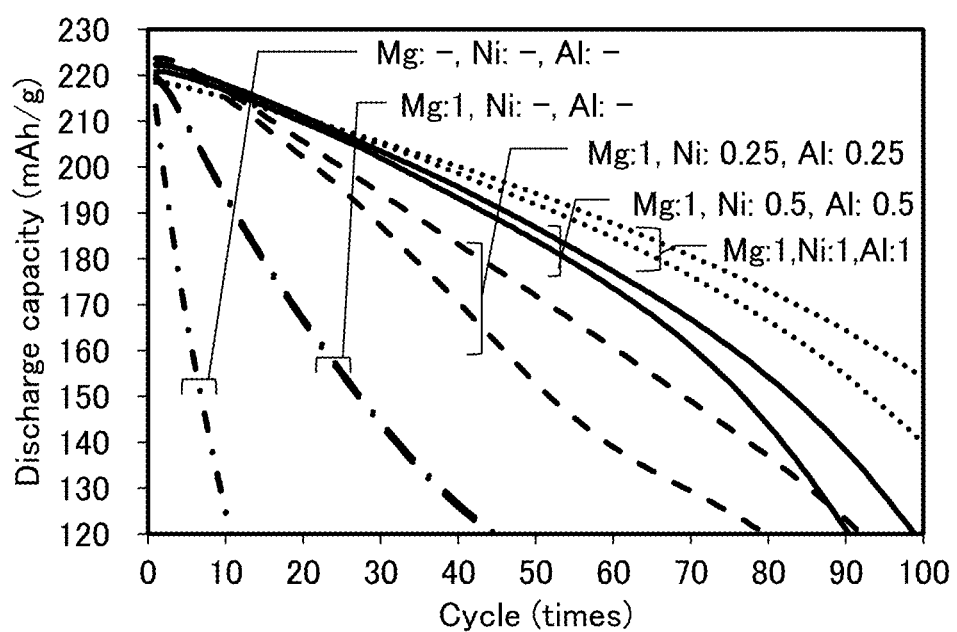
FIG. 42 shows cycle performance results.
Figure 43:
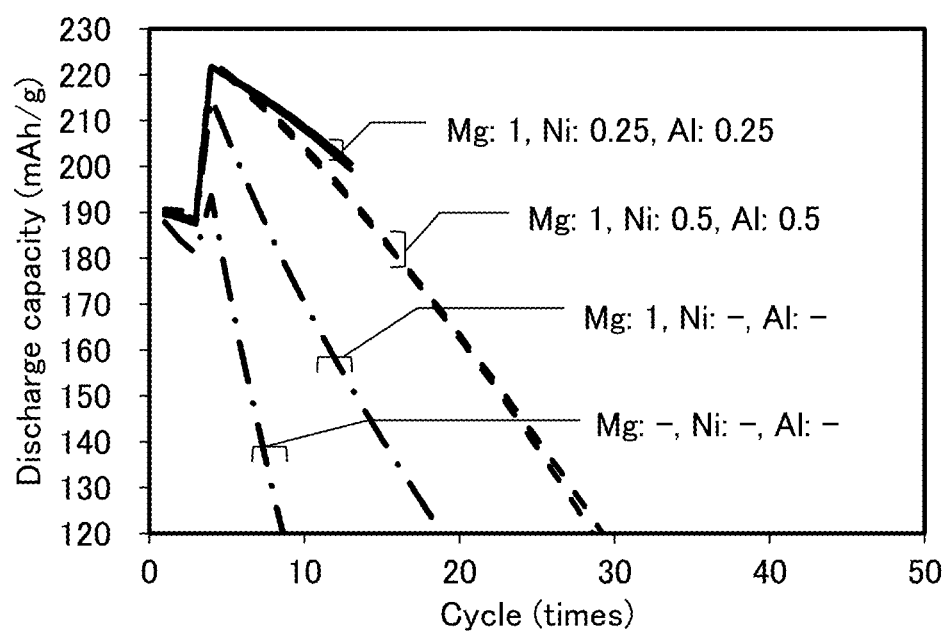
FIG. 43 shows cycle performance results.

FIG. 41 shows the measurement results of the particle size distribution of the composite oxide manufactured by MTI Corporation that was used. FIG. 42 shows the results of the cycle performance of the positive electrode with a carried amount of approximately 7 mg/cm² and FIG. 43 shows the cycle performance of the positive electrode with a carried amount of approximately 20 mg/cm². Addition of magnesium increased the cycle performance, and addition of nickel and aluminum further increased the cycle performance.

<Fabrication of Secondary Battery 3>

Positive electrode active materials were formed using lithium cobalt oxide manufactured by Sigma-Aldrich Co. as the composite oxide used in Step S24. The formation conditions are the following two conditions. The first condition is a condition where Step S11 to Step S13 and Step S21 to Step S24 are not performed and magnesium, nickel, and aluminum are not added. The second condition is a condition where the number of magnesium atoms is 0.5 when the number of cobalt atoms is 100 and nickel and aluminum are not added. Secondary batteries using the positive electrode active materials formed under the conditions were fabricated with reference to the method in Example 1, and the cycle performance was evaluated. The temperature of a cycle test was 45° C., and the upper limit voltage of charge was 4.55 V.

<Cycle Performance>

Figure 44:
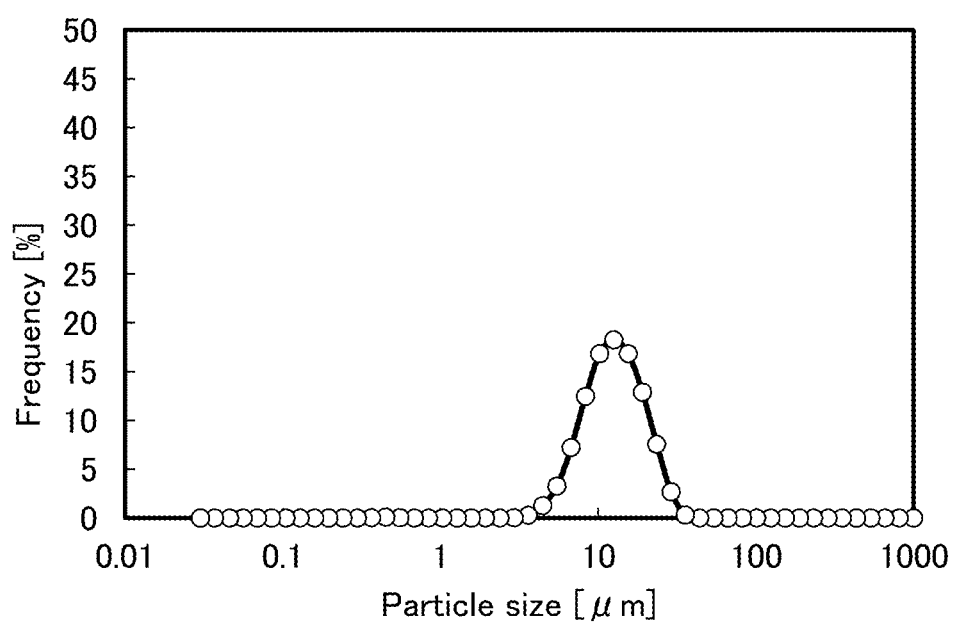
FIG. 44 shows evaluation results of a particle size distribution.
Figure 45:
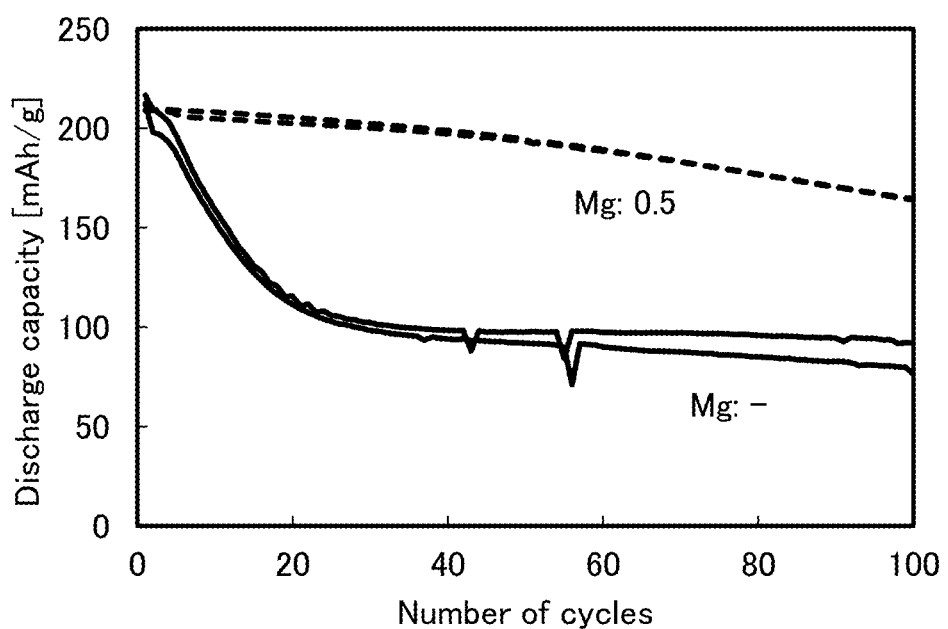
FIG. 45 shows cycle performance results.

FIG. 44 shows the measurement results of the particle size distribution of the composite oxide manufactured by Sigma-Aldrich Co. that was used. FIG. 45 shows the results of the cycle performance. Addition of magnesium increased the cycle performance.

Example 3

In this example, characteristics of secondary batteries using the positive electrode active materials of embodiments of the present invention were evaluated.

<Formation of Positive Electrode Active Material>

The positive electrode active materials were formed with reference to the flowchart in FIG. 10.

First, through Step S11 to Step S13, the mixture 902 containing magnesium and fluorine was formed. Note that LiF and MgF₂ were weighted so that the molar ratio of LiF to MgF₂ was LiF:MgF₂=1:3. The weighted LiF and MgF₂ were ground and mixed by a dry method. The grinding and the mixing were performed in a ball mill using a zirconia ball at 150 rpm for 1 hour. The material that has been subjected to the treatment was collected to be the mixture 902.

Figure 47:
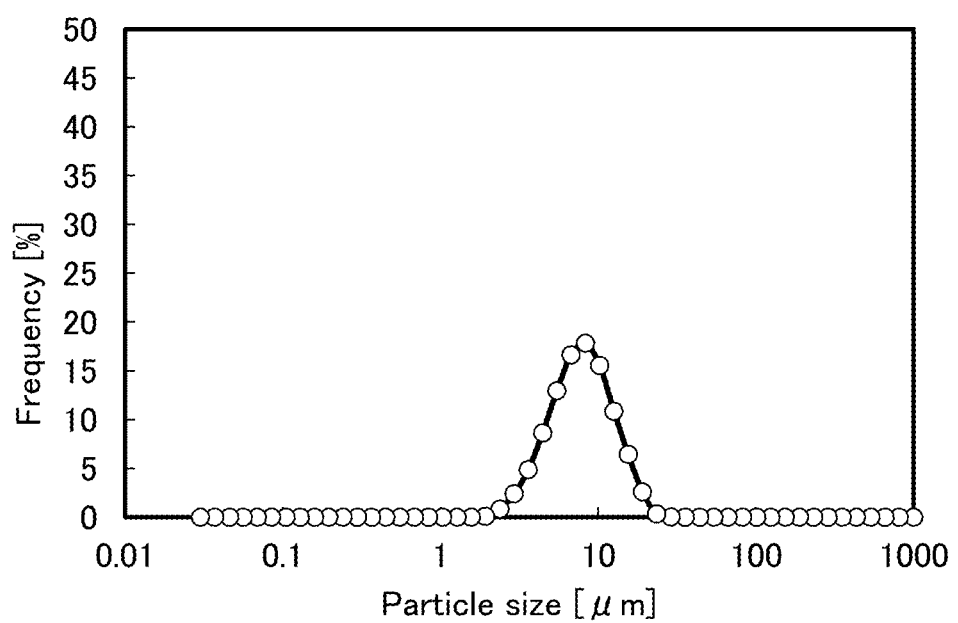
FIG. 47 shows evaluation results of a particle size distribution.

Next, CELLSEED 5H manufactured by NIPPON CHEMICAL INDUSTRIAL CO., LTD. was prepared as a composite oxide (Step S24). FIG. 47 shows the result of the particle size distribution of 5H.

Then, the mixture 902 and the composite oxide were mixed (Step S31). Weighting was performed so that when the number of cobalt atoms included in the composite oxide is 100, the number of magnesium atoms included in the mixture 902 is 0.5 or 2. The mixing was performed by a dry method. The mixing was performed in a ball mill using a zirconia ball at 150 rpm for 1 hour. Note that as a comparative example, fabrication was performed also under a condition where magnesium is not added.

Subsequently, the material that has been subjected to the treatment was collected to obtain the mixture 903 (Step S32).

Next, the mixture 903 was put in an alumina crucible and annealed at 850° C. using a muffle furnace in an oxygen atmosphere for 60 hours (Step S33). At the time of annealing, the alumina crucible was covered with a lid. The flow rate of oxygen was 10 L/min. The temperature rise was 200° C./hr, and it took longer than or equal to 10 hours to lower the temperature. The material that has been subjected to the heat treatment was collected and then made to pass through a sieve, so that a second composite oxide was obtained (Step S34).

Next, nickel hydroxide that is a metal source and the second composite oxide were mixed in a ball mill. Mixing was performed so that when the number of cobalt atoms is 100, the number of nickel atoms is 0.5. The mixing was performed in a ball mill using a zirconia ball at 150 rpm for 1 hour. After the mixing, the mixture was made to pass through a sieve with 300 μmφ. After that, the obtained mixture was put in an alumina crucible, the alumina crucible was covered with a lid, and annealing was performed at 850° C. for 2 hours in an oxygen atmosphere.

Next, a coating layer containing aluminum was formed by a sol-gel method. Al isopropoxide was used as a metal source, and 2-propanol was used as a solvent. Mixing was performed so that when the number of cobalt atoms is 100, the number of aluminum atoms is 0.5. After that, the obtained mixture was put in an alumina crucible, the alumina crucible was covered with a lid, and annealing was performed at 850° C. for 2 hours in an oxygen atmosphere. After that, the mixture was made to pass through a sieve with 53 μmφ and powder was collected, so that positive electrode active materials were obtained.

<Fabrication of Secondary Battery>

Positive electrodes were fabricated using the positive electrode active materials obtained above. As a comparative example, a positive electrode using CELLSEED 5H as a positive electrode active material (denoted as Mg: -, Ni: -, Al: - in FIG. 48) was also fabricated. A current collector that was coated with slurry in which the positive electrode active material, AB, and PVDF were mixed at the active material: AB:PVDF=95:3:2 (weight ratio) was used. As a solvent of the slurry, NMP was used.

After the current collector was coated with the slurry, the solvent was evaporated. Then, pressure was applied at 210 kN/m, and then pressure was applied at 1467 kN/m. Through the above process, the positive electrode was obtained. The carried amount of the positive electrode was approximately 7 mg/cm².

Using the fabricated positive electrodes, CR2032 type coin secondary batteries (a diameter of 20 mm, a height of 3.2 mm) were fabricated.

A lithium metal was used for a counter electrode.

As an electrolyte contained in the electrolyte solution, 1 mol/L lithium hexafluorophosphate (LiPF₆) was used. As the electrolyte solution, an electrolyte solution in which ethylene carbonate (EC) and diethyl carbonate (DEC) were mixed at EC:DEC=3:7 (volume ratio) was used. Note that for secondary batteries used for evaluating the cycle performance, 2 wt % of vinylene carbonate (VC) was added to the electrolytic solution.

As a separator, 25-μm-thick polypropylene was used.

A positive electrode can and a negative electrode can that are formed using stainless steel (SUS) were used.

<Cycle Performance>

Next, the cycle performance of each of the fabricated secondary batteries was evaluated at 45° C. First, charge and discharge were performed three times to check the capacity, and then charge and discharge were performed 50 times as a cycle test.

As the charge to check the capacity, CCCV charge (0.2 C, 4.5 V, a termination current of 0.02 C) was performed and a 20-minute break was taken after the charge. As the discharge, CV discharge (0.2 C, 3 V) was performed and a 20-minute break was taken after the discharge.

As the charge of the cycle test, CCCV charge (0.76 C, 4.6 V, a termination current of 0.02 C) was performed and a 20-minute break was taken after the charge. As the discharge, CV discharge (0.76 C, 3 V) was performed and a 20-minute break was taken after the discharge. In addition, 1 C was 177.5 mA/g.

Figure 48:
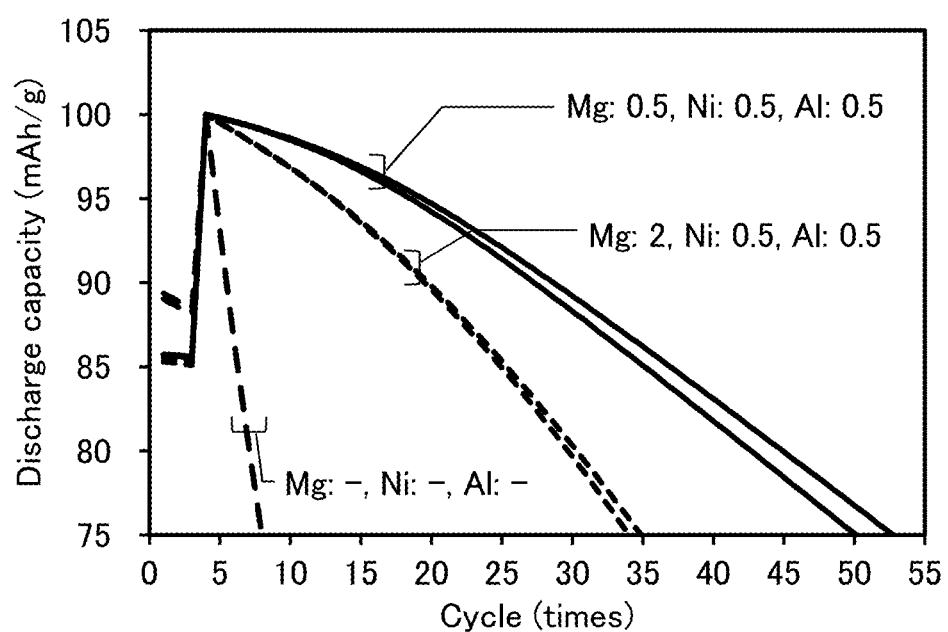
FIG. 48 shows cycle performance of a secondary battery.

FIG. 48 shows the results of the cycle performance. Addition of nickel and aluminum significantly increased the cycle performance. The value of the discharge capacity varied depending on the addition amount of magnesium, and excellent discharge capacity was obtained under the condition where the amount of magnesium was 0.5.

REFERENCE NUMERALS

100: positive electrode active material, 101: particle, 102: particle, 103: coating film, 108: current collector, 109: positive electrode active material layer, 111: region, 112: region

The invention claimed is:

1. A positive electrode active material comprising:
   a first particle group and a second particle group,
   wherein the positive electrode active material has a crystal structure belonging to a space group R-3m,
   wherein the crystal structure is estimated by Rietveld analysis of a pattern obtained by powder X-ray diffraction using a CuKα1 ray,
   wherein the positive electrode active material comprises lithium cobalt oxide, magnesium, aluminum, and nickel,
   wherein, in X-ray photoelectron spectroscopy of the positive electrode active material, a number of aluminum atoms is less than a number of magnesium atoms and greater than a number of nickel atoms,
   wherein a particle size distribution of the first particle group has a first local maximum peak and a particle size distribution of the second particle group has a second local maximum peak,
   wherein the first local maximum peak has a local maximum value at greater than or equal to 9 μm and less than or equal to 25 μm,
   wherein the second local maximum peak has a local maximum value at greater than or equal to 0.1 μm and less than 9 μm,
   wherein the first particle group comprises a first positive electrode active material particle comprising lithium cobalt oxide, magnesium, aluminum, and nickel,
   wherein the second particle group comprises a second positive electrode active material particle comprising lithium cobalt oxide, aluminum, and nickel,
   wherein, in any one of ICP-MS, GD-MS, and elementary analysis of atomic absorption, an atomic ratio of magnesium to cobalt in the first particle group is greater than or equal to 0.001 and less than or equal to 0.06, and
   wherein the atomic ratio of magnesium to cobalt in the first particle group is higher than an atomic ratio of magnesium to cobalt in the second particle group.

2. The positive electrode active material according to claim 1,
   wherein the particle size distribution is measured with a laser diffraction particle size distribution measurement tool.

3. The positive electrode active material according to claim 1, wherein in the X-ray photoelectron spectroscopy of the positive electrode active material, the number of magnesium atoms is greater than or equal to 0.4 times and less than or equal to 1.5 times a number of cobalt atoms.

4. The positive electrode active material according to claim 3,
   wherein in the X-ray photoelectron spectroscopy of the positive electrode active material, an extraction angle is greater than or equal to 40° and less than or equal to 50°.

5. A positive electrode comprising:
   a current collector; and
   a positive electrode active material layer over the current collector,
   wherein the positive electrode active material layer comprises the positive electrode active material according to claim 1, and
   wherein a density of the positive electrode active material layer is greater than or equal to 3.8 g/cm$^3$ and less than or equal to 4.5 g/cm$^3$.

6. A secondary battery comprising:
   a positive electrode comprising the positive electrode active material according to claim 1;
   a negative electrode; and
   an electrolyte solution,
   wherein, when charge and discharge are repeatedly performed from a first cycle to a 50th cycle, a second discharge capacity obtained by the discharge in the 50th cycle is greater than or equal to 90% of a first discharge capacity obtained by the discharge in the first cycle.

7. The secondary battery according to claim 6,
   wherein the charge is performed under CCCV condition,
   wherein current of a CC charge is higher than or equal to 0.01 C and lower than or equal to 1.0 C,
   wherein upper limit voltage of the CC charge is higher than or equal to 4.55 V with reference to Li/Li$^+$,
   wherein a termination current of a CV charge is higher than or equal to 0.001 C,
   wherein the discharge is performed under CC condition,
   wherein current of a CC discharge is higher than or equal to 0.05 C and lower than or equal to 2.0 C, and
   wherein measurement temperature is higher than or equal to 15° C. and lower than or equal to 55° C.

8. A secondary battery comprising:
   a positive electrode comprising the positive electrode active material according to claim 1,
   wherein a lithium metal is used for a counter electrode,
   wherein, when charge and discharge are repeatedly performed from a first cycle to a 50th cycle, a second discharge capacity obtained by the discharge in the 50th cycle is greater than or equal to 90% of a first discharge capacity obtained by the discharge in the first cycle,
   wherein the charge is performed under CCCV condition,
   wherein current of a CC charge is higher than or equal to 0.01 C and lower than or equal to 1.0 C,
   wherein upper limit voltage of the CC charge is higher than or equal to 4.55 V with reference to Li/Li$^+$, wherein a termination current of a CV charge is higher than or equal to 0.001 C,
wherein the discharge is performed under CC condition,
wherein current of a CC discharge is higher than or equal to 0.05 C and lower than or equal to 2.0 C, and
wherein measurement temperature is higher than or equal to 15° C. and lower than or equal to 55° C.

* * * * *